(12) United States Patent
Fukuda

(10) Patent No.: US 8,902,194 B2
(45) Date of Patent: Dec. 2, 2014

(54) ELECTRONIC APPARATUS, DISPLAY CONTROL METHOD, AND PROGRAM

(75) Inventor: Kenichiro Fukuda, Chiba (JP)

(73) Assignee: Sony Corporation, Tokyo (JP)

(*) Notice: Subject to any disclaimer, the term of this patent is extended or adjusted under 35 U.S.C. 154(b) by 826 days.

(21) Appl. No.: 12/724,997

(22) Filed: Mar. 16, 2010

(65) Prior Publication Data

US 2010/0245274 A1 Sep. 30, 2010

(30) Foreign Application Priority Data

Mar. 25, 2009 (JP) ................................. 2009-073266

(51) Int. Cl.
*G06F 3/033* (2013.01)
*G06F 3/14* (2006.01)
*G06F 3/041* (2006.01)
*G06F 3/042* (2006.01)
*G06F 3/0488* (2013.01)

(52) U.S. Cl.
CPC .. *G06F 3/04886* (2013.01); *G06F 2203/04808* (2013.01); *G06F 3/0488* (2013.01)
USPC ........... 345/175; 345/173; 715/810; 715/863; 715/864

(58) Field of Classification Search
CPC .................... G06F 2203/04808; G06F 3/0488; G06F 3/04886
USPC .......... 345/156, 168–169, 173–179; 715/810, 715/815, 821–823, 845–846, 863–864
See application file for complete search history.

(56) References Cited

U.S. PATENT DOCUMENTS

| | | | | |
|---|---|---|---|---|
| 5,825,352 | A * | 10/1998 | Bisset et al. ................... | 345/173 |
| 7,663,609 | B2 * | 2/2010 | Miyata et al. ................. | 345/173 |
| 8,130,208 | B2 * | 3/2012 | Arimoto ........................ | 345/173 |
| 2006/0017709 | A1 * | 1/2006 | Okano ........................... | 345/173 |
| 2007/0229471 | A1 * | 10/2007 | Kim et al. ..................... | 345/173 |
| 2008/0284756 | A1 * | 11/2008 | Hsu et al. ...................... | 345/178 |
| 2008/0297482 | A1 * | 12/2008 | Weiss ............................ | 345/173 |
| 2009/0231291 | A1 * | 9/2009 | Ko et al. ........................ | 345/173 |
| 2009/0289911 | A1 * | 11/2009 | Nagai ............................ | 345/173 |
| 2010/0265185 | A1 * | 10/2010 | Oksanen ....................... | 345/173 |

FOREIGN PATENT DOCUMENTS

| | | |
|---|---|---|
| JP | 06-348808 A | 12/1994 |
| JP | 2006-209684 A | 8/2006 |
| JP | 2007-066258 A | 3/2007 |
| JP | 2007-272904 A | 10/2007 |

* cited by examiner

*Primary Examiner* — Kenneth Bukowski
(74) *Attorney, Agent, or Firm* — Wolf, Greenfield & Sacks, P.C.

(57) ABSTRACT

An electronic apparatus includes: an input/output unit that displays operation markers, used for performing an operation input, on a display surface and detects an object in proximity to or brought into contact with the display surface; a selection mode determining unit that determines, based on a detection state of the object on the display surface, either a multiple selection mode in which selection targets are set to be plural operation markers or a single selection mode in which the selection target is set to be one operation marker, as a selection mode; a selection unit that selects one or plural operation markers among the operation markers based on the selection mode and the detection state; and a display control unit that changes display forms of the operation markers selected among the operation markers into a display form indicating a selected state and displays the selected operation markers on the display surface.

20 Claims, 32 Drawing Sheets

FIG.3A

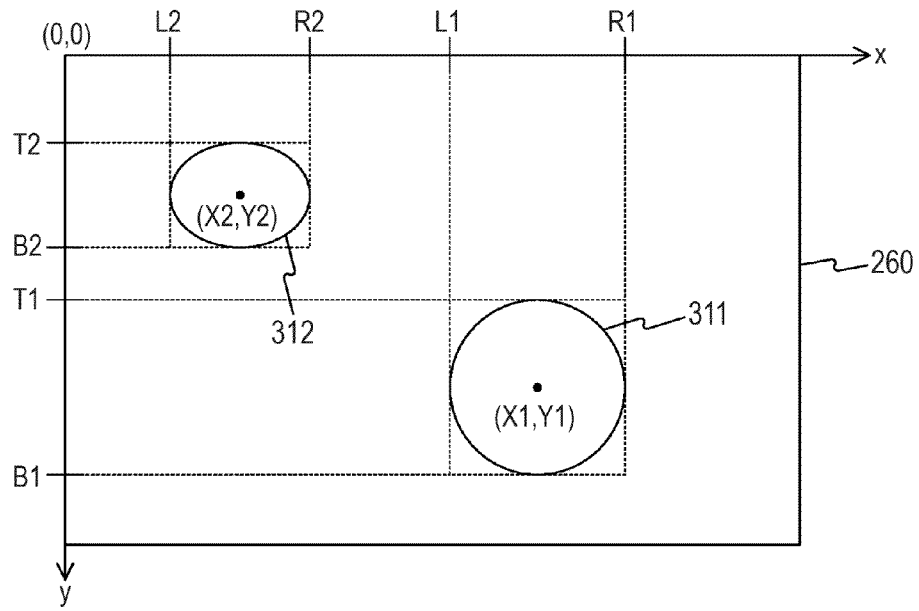

FIG.3B

| NUMBER OF DETECTED OBJECTS | DETECTED OBJECT IDENTIFICATION INFORMATION | DATA TYPE | DATA CONTENT |
|---|---|---|---|
| 2 | OBJECT 1 | X1,Y1 | CENTER COORDINATES OF DETECTION AREA OF OBJECT 1 |
| | | A1 | DETECTION AREA OF OBJECT 1 |
| | | T1 | UPPER-END COORDINATES OF OBJECT 1 |
| | | L1 | LEFT-END COORDINATES OF OBJECT 1 |
| | | R1 | RIGHT-END COORDINATES OF OBJECT 1 |
| | | B1 | LOWER-END COORDINATES OF OBJECT 1 |
| | OBJECT 2 | X2,Y2 | CENTER COORDINATES OF DETECTION AREA OF OBJECT 2 |
| | | A2 | DETECTION AREA OF OBJECT 2 |
| | | T2 | UPPER-END COORDINATES OF OBJECT 2 |
| | | L2 | LEFT-END COORDINATES OF OBJECT 2 |
| | | R2 | RIGHT-END COORDINATES OF OBJECT 2 |
| | | B2 | LOWER-END COORDINATES OF OBJECT 2 |

SCROLL TO THE LOWER SIDE BY ONE PAGE

↓ PRESS DOWN PLAY BUTTON

FIG.11A
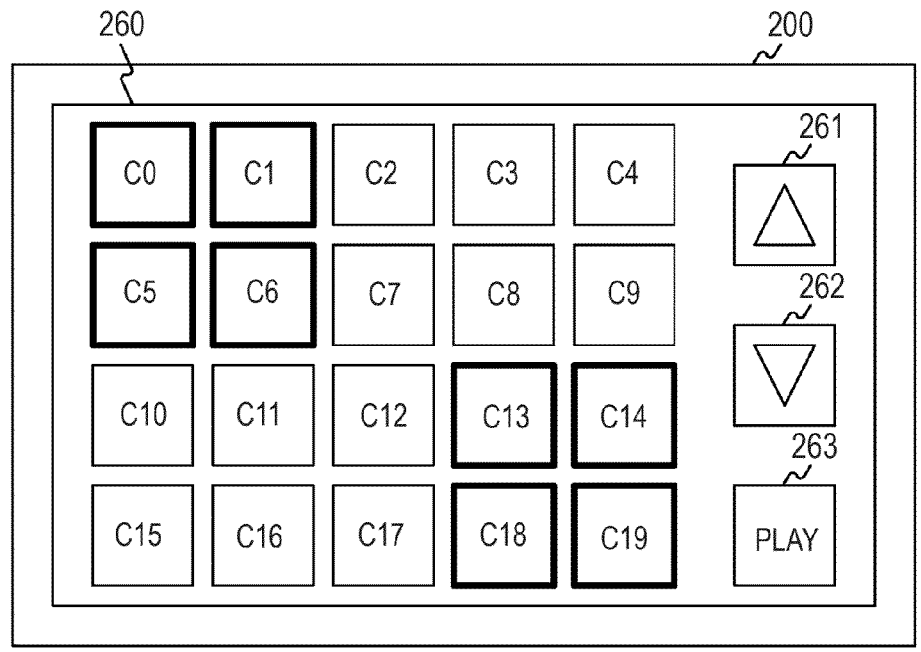
  PRESS DOWN PLAY BUTTON
FIG.11B
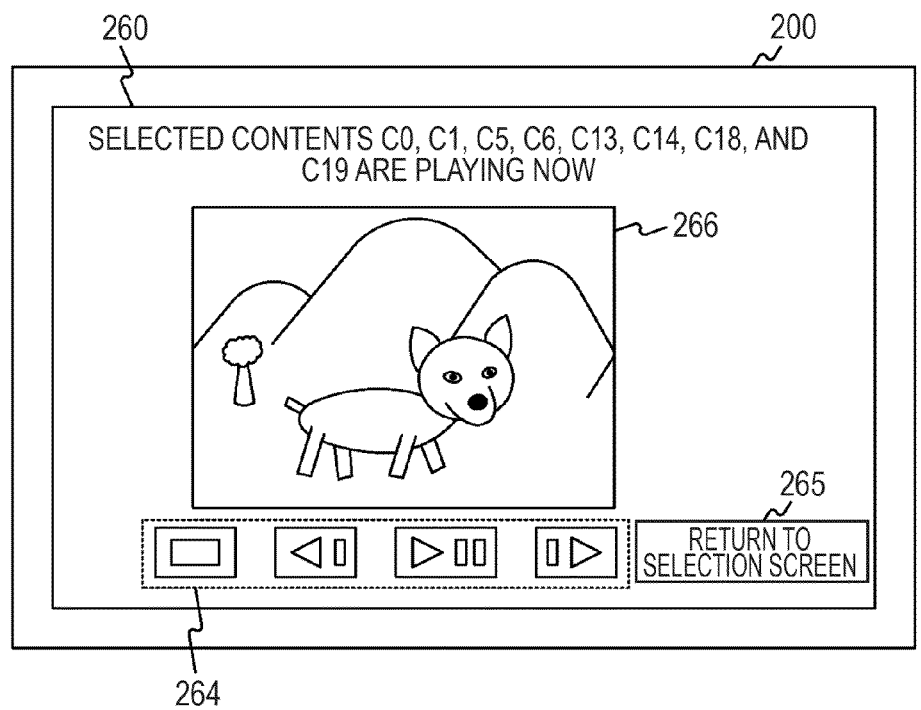

SEPARATE HAND FROM DISPLAY PANEL

C0 TO C39 ARE TO BE IN SELECTED-STATE

SEPARATE HAND FROM DISPLAY PANEL AFTER PERFORMING SCROLL OPERATION CORRESPONDING TO TWO LINES

C1 TO C4, C6 TO C9, C11 TO C14, C16 TO C19, C21 TO C24, C26 TO C29 ARE TO BE IN SELECTED STATE

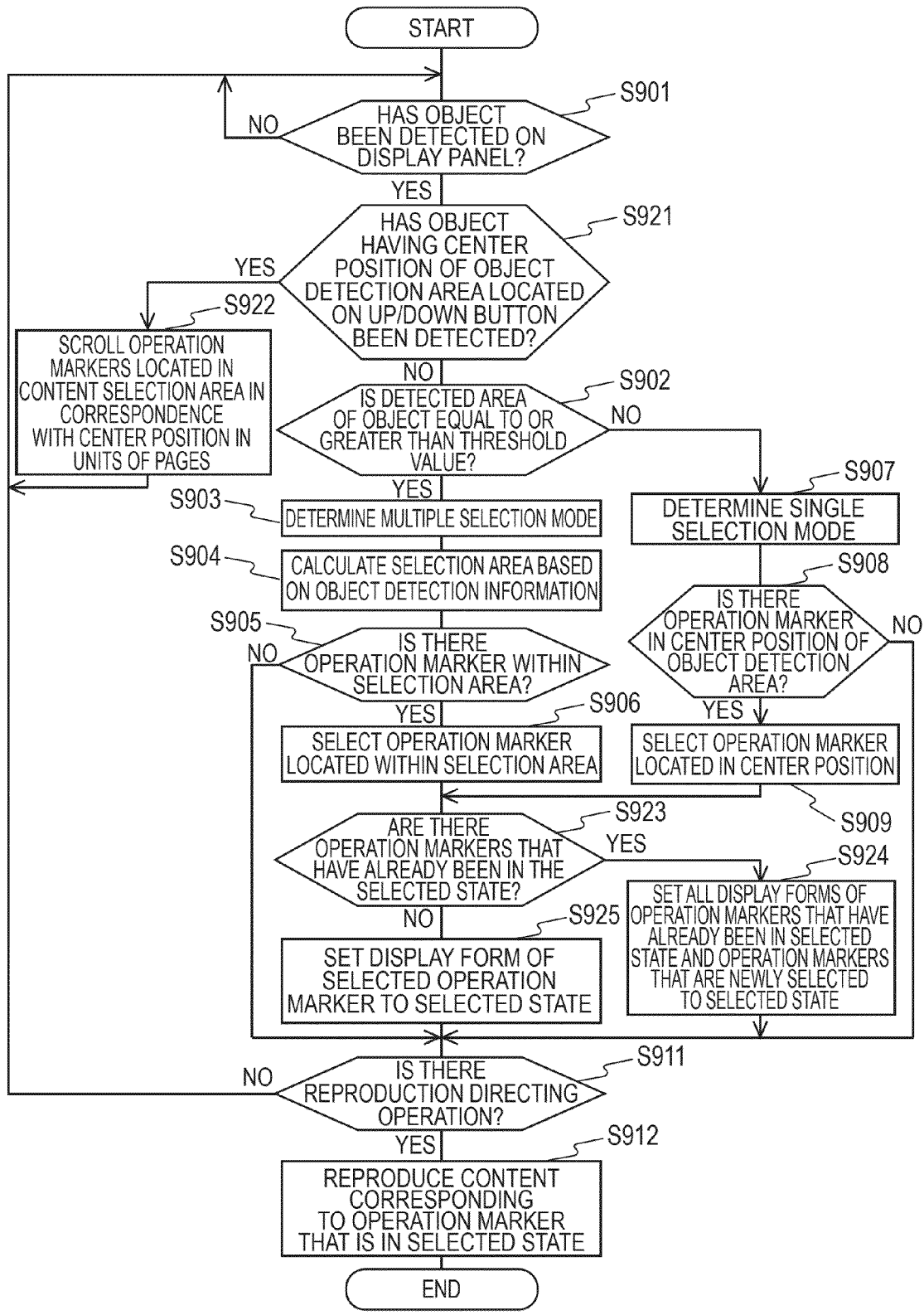

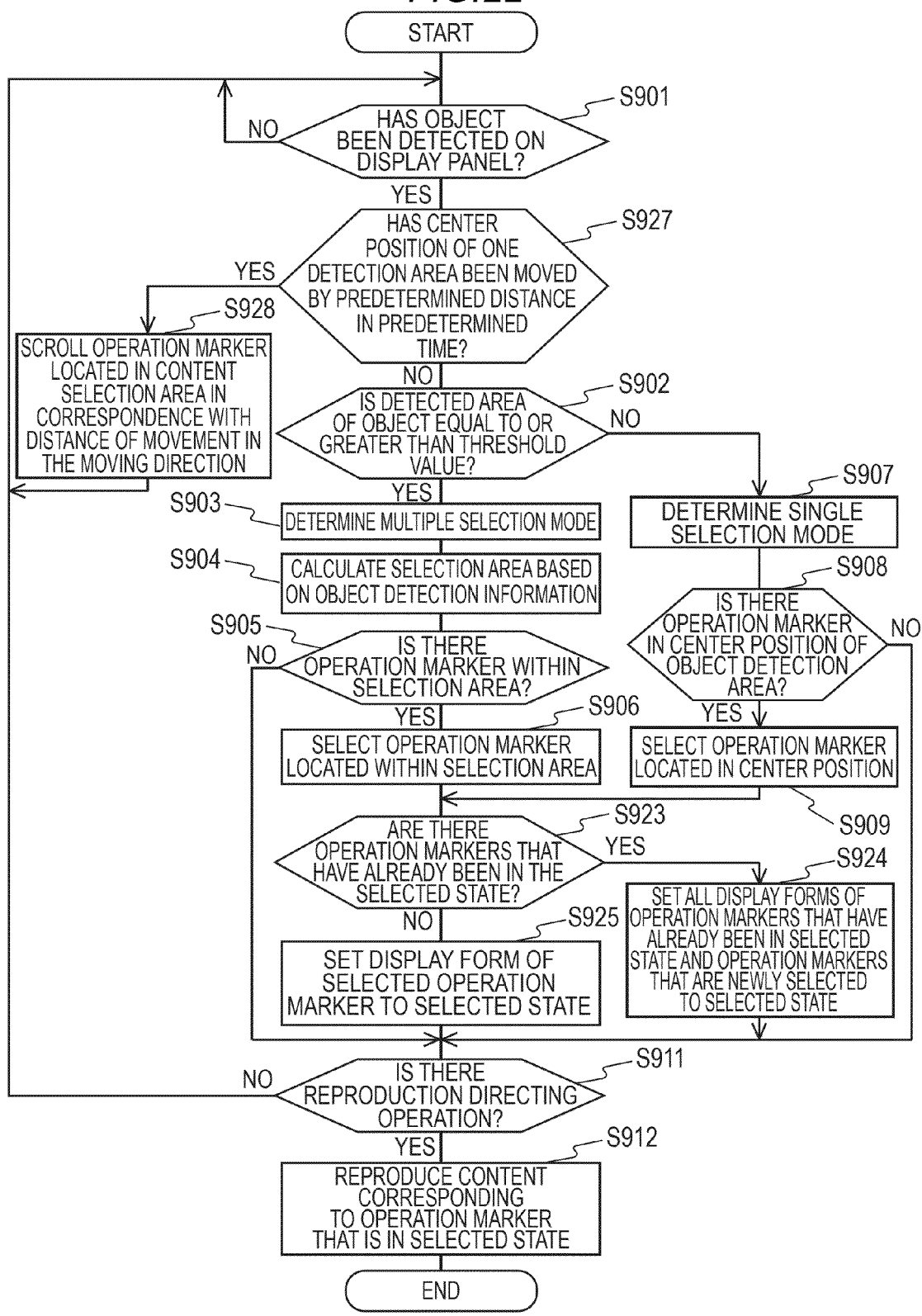

C10 TO C24 ARE TO BE IN SELECTED STATE

SELECTION OPERATION AT TIME t11

SELECTION OPERATION AT TIME t12

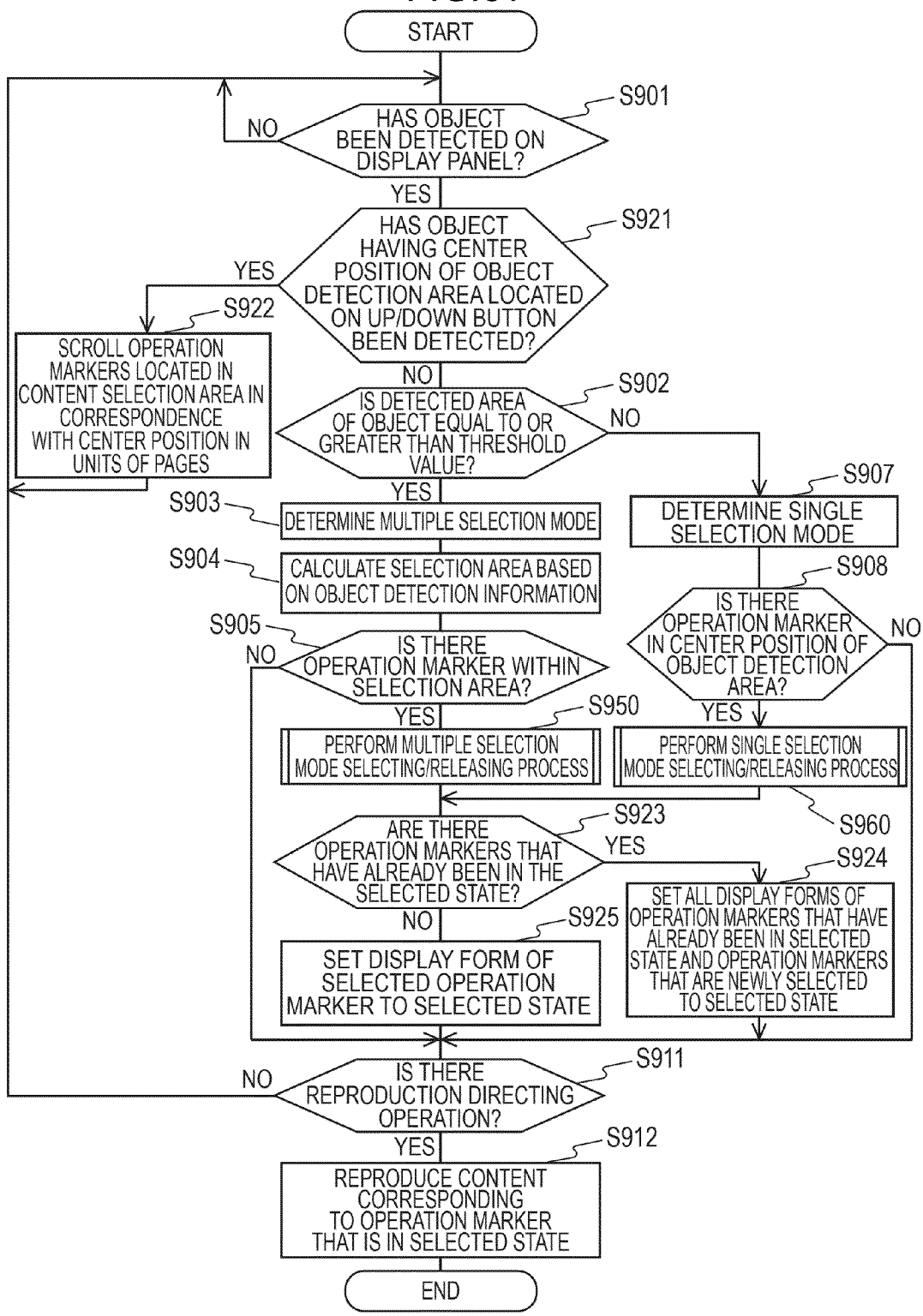

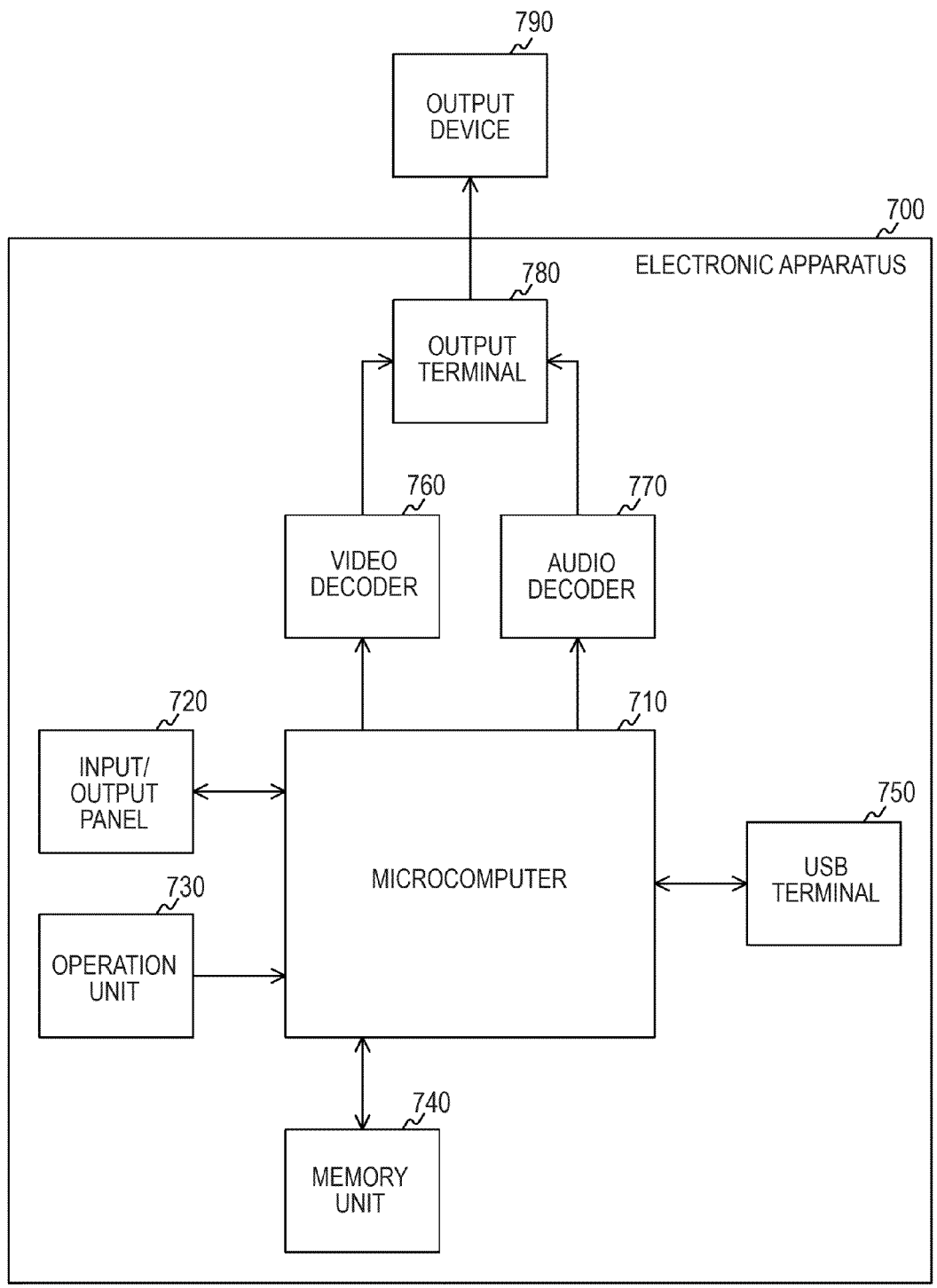

ELECTRONIC APPARATUS, DISPLAY CONTROL METHOD, AND PROGRAM

BACKGROUND OF THE INVENTION

1. Field of the Invention

The present invention relates to an electronic apparatus, and more particularly, to an electronic apparatus that displays a plurality of operation markers and accepts a selection operation thereof, a display control method, and a program that allows a computer to perform the method.

2. Description of the Related Art

Recently, imaging apparatuses such as digital cameras that generate an image by imaging a subject such as a person and record the image are widely used. In a case where each image recorded as described above is reproduced in the imaging apparatus, for example, thumbnail images corresponding to recorded images are aligned in a matrix shape so as to be displayed as a list, and a desired image can be reproduced by selecting the image from among the thumbnail images. In addition, imaging apparatuses in which a list of such thumbnail images is displayed on a touch panel, and a desired image can be selected and reproduced by pressing down a display area of the desired image are proposed.

Here, a case where a plurality of images are reproduced by selecting the plurality of images from among the thumbnail images that are, for example, displayed on the touch panel as a list will be considered. For example, for selecting a plurality of images, a case where a selection operation of pressing down an image to be selected is repeatedly performed may be considered. However, when there are many images to be selected, the selection operation may need to be repeated as many times as the number of the images to be selected. Accordingly, there is a problem in that the selection operation becomes complicated.

In addition, an information processing apparatus that can select a plurality of images by surrounding an area corresponding to a plurality of images with a trajectory (closed curve) of a touch pen, for example, from among thumbnail images displayed on a touch panel is proposed (for example, see JP-A-2007-66285 (FIG. 12)).

SUMMARY OF THE INVENTION

According to the above-described technology, by surrounding an area corresponding to a plurality of images with a closed curve, images located within the closed curve can be set to be in a selected state. Accordingly, the plurality of images can be selected by performing a selection operation of tracing with the touch pen.

However, the space of the touch panel is limited in many portable electronic apparatuses. Thus, it may be difficult to perform the tracing operation by using the touch pen. Thus, it is convenient to simultaneously select a plurality of images by performing a simple operation such as one touch operation.

Thus, it is desirable that a selection operation for operation markers can be performed in an easy manner.

According to an embodiment of the present invention, there are provided an electronic apparatus including: an input/output unit that displays a plurality of operation markers, which are used for performing an operation input, on a display surface and detects an object that is in proximity to or brought into contact with the display surface; a selection mode determining unit that determines, based on a detection state of the object on the display surface, either a multiple selection mode in which selection targets selected through detection of the object are set to be a plurality of the operation markers or a single selection mode in which the selection target selected through detection of the object is set to be one operation marker, as a selection mode; a selection unit that selects one or a plurality of operation markers from among the plurality of operation markers displayed on the display surface based on the determined selection mode and the detection state; and a display control unit that changes display forms of the operation markers that are selected from among the plurality of operation markers displayed on the display surface into a display form indicating a selected state and displays the selected operation markers on the display surface, a display control method thereof, and a program that allows a computer to perform the method. Accordingly, the selection mode is determined based on the detection state of the object on the display surface, one or more operation markers are selected from among the plurality of the operation markers displayed on the display surface based on the determined selection mode and the detection state, the display forms of the selected operation markers are changed into the display form indicating the selected state, and the selected operation markers are displayed.

In the above-described embodiment, it may be configured that the input-output unit detects a size of the object, which is in proximity to or brought into contact with the display surface, on the display surface, and the selection mode determining unit compares the detected size of the object on the display surface with a reference value and determines the selection mode based on the result of the comparison. In such a case, the size of the object, which is in proximity to or brought into contact with the display surface, on the display surface is detected, the detected size of the object on the display surface is compared with a reference value, and the selection mode is determined based on the result of the comparison.

In the above-described embodiment, the selection mode determining unit may be configured to compare an added value of the detected sizes of objects on the display surface with a reference value and determine the selection mode based on the result of the comparison in a case where a plurality of the objects that is in proximity to or brought into contact with the display surface is detected. In such a case, an added value of the detected sizes of objects on the display surface is compared with a reference value, and the selection mode is determined based on the result of the comparison, in a case where a plurality of the objects that is in proximity to or brought into contact with the display surface is detected.

In the above-described embodiment, it may be configured that the selection mode determining unit determines the multiple selection mode in a case where the size of the detected object on the display surface exceeds the reference value, and the selection mode determining unit determines the single selection mode in a case where the size of the detected object on the display surface does not exceed the reference value. In such a case, the multiple selection mode is determined in a case where the size of the detected object on the display surface exceeds the reference value, and the single selection mode is determined in a case where the size of the detected object on the display surface does not exceed the reference value.

In the above-described embodiment, it may be configured that the input/output unit detects the number of the objects that are in proximity to or brought into contact with the display surface, and the selection mode determining unit compares the detected number of the objects with a reference value and determines the selection mode based on the result of the comparison. In such a case, the number of the objects that are in proximity to or brought into contact with the display surface is detected, the detected number of the objects is compared with a reference value, and the selection mode is determined based on the result of the comparison.

In the above-described embodiment, it may be configured that the object detecting unit detects a position and a size of the object, which is in proximity to or brought into contact with the display surface, on the display surface, the selection unit selects the operation markers based on a selection area that is specified by the position and the size of the object on the display surface, which have been detected, from among the plurality of the operation markers displayed on the display surface in a case where the multiple selection mode is determined, and the selection unit selects the operation marker that is specified by the position of the detected object on the display surface from among the plurality of the operation markers displayed on the display surface in a case where the single selection mode is determined. In such a case, a position and a size of the object, which is in proximity to or brought into contact with the display surface, on the display surface are detected, the operation markers are selected based on a selection area that is specified by the position and the size of the object on the display surface, which have been detected, from among the plurality of the operation markers displayed on the display surface in a case where the multiple selection mode is determined, and the operation marker that is specified by the position of the detected object on the display surface is selected from among the plurality of the operation markers displayed on the display surface in a case where the single selection mode is determined.

In the above-described embodiment, the selection unit may be configured to select the operation markers based on a selection area that is specified by the position and the size of the detected objects on the display surface in a case where a plurality of the objects, which are in proximity to or brought into contact with the display surface, are detected, and the multiple selection mode is determined. In such a case, the operation markers are selected based on a selection area that is specified by the position and the size of the detected objects on the display surface in a case where a plurality of the objects, which are in proximity to or brought into contact with the display surface, are detected, and the multiple selection mode is determined.

In the above-described embodiment, it may be configured that the selection unit performs the selection of the operation marker each time when an object that is in proximity to or brought into contact with the display surface is detected, and the display control unit changes all the display forms of the operation markers that are newly selected and the operation markers that have been already selected from among the plurality of operation markers displayed on the display surface into the display form indicating the selected state and displays the operation markers that are in the selected state on the display surface. In such a case, the selection of the operation marker is performed each time when an object that is in proximity to or brought into contact with the display surface is detected, all the display forms of the operation markers that are newly selected and the operation markers that have been already selected from among the plurality of operation markers displayed on the display surface are changed into the display form indicating the selected state, the operation markers that are in the selected state on the display surface are displayed.

In the above-described embodiment, an operation reception unit that receives a movement operation for moving the plurality of the operation markers displayed on the display surface may be included further, wherein the display control unit changes all the display forms of the newly selected operation markers and the operation markers that have been already selected from among the plurality of operation markers displayed on the display surface after movement according to the received movement operation into the display form indicating the selected state and displays the operation markers on the display surface. In such a case, all the display forms of the newly selected operation markers and the operation markers that have been already selected from among the plurality of operation markers displayed on the display surface after movement according to the received movement operation are changed into the display form indicating the selected state, the operation markers are displayed on the display surface.

In the above-described embodiment, the display control unit may be configured to move the plurality of the operation markers displayed on the display surface in accordance with the movement of the detected object, change all the display forms of the operation markers newly selected based on the detection state of the object after the movement and the operation markers that have been already selected from among the plurality of operation markers displayed on the display surface after the movement into the display form indicating the selected state, and display the operation markers on the display surface. In such a case, the plurality of the operation markers displayed on the display surface is moved in accordance with the movement of the detected object, all the display forms of the operation markers newly selected based on the detection state of the object after the movement and the operation markers that have been already selected from among the plurality of operation markers displayed on the display surface after the movement are changed into the display form indicating the selected state, and the operation markers are displayed on the display surface.

In the above-described embodiment, it may be configured that the selection unit releases the selection of the operation markers in a case where the object that is in proximity to or brought into contact with the display surface is detected and the operation markers to be selected have been already in the selected state, and the display control unit changes the display forms, which indicate the selected state, of the operation markers, of which the selection is released, from among the plurality of the operation markers displayed on the display surface into a display form before selection and displays the operation markers of which the display forms are changed on the display surface. In such a case, the selection of the operation markers is released in a case where the object that is in proximity to or brought into contact with the display surface is detected and the operation markers to be selected have been already in the selected state, the display forms, which indicates the selected state, of the operation markers, of which the selection is released, from among the plurality of the operation markers displayed on the display surface are changed into a display form before selection, and the operation markers of which the display forms are changed are displayed on the display surface.

The above-described embodiment may further includes an output control unit that outputs a content, wherein the display control unit displays the operation marker as the operation marker that represents the content, and the output control unit outputs the content corresponding to the selected operation marker. In such a case, the operation marker is displayed as the operation marker that represents the content, and the content corresponding to the selected operation marker is output.

In the above-described embodiment, it may be configured that the content is an image content, and the display control unit displays a representative image of the content as the operation marker representing the content. In such a case, a representative image of the content is displayed as the operation marker representing the content.

According to another embodiment of the present invention, there are provided an electronic apparatus including: an input/output unit that displays a plurality of operation markers, which are used for performing an operation input, on a display surface and detects an object that is in proximity to or brought into contact with the display surface for selecting one or more operation markers from among the plurality of operation markers; and a selection mode determining unit that determines, based on a detection state of the object on the display surface, either a multiple selection mode in which selection targets selected through detection of the object are set to be a plurality of the operation markers or a single selection mode in which the selection target selected through detection of the object is set to be one operation marker, as a selection mode, a display control method thereof, and a program that allows a computer to perform the method. Accordingly, the selection mode is determined based on the detection state of the object on the display surface, and one or a plurality of operation markers is selected from among the plurality of the operation markers displayed on the display surface based on the determined selection mode and the detection state of the object.

According to still another embodiment of the present invention, there are provided an electronic apparatus including: an input/output unit that displays a plurality of operation markers, which are used for performing an operation input, on a display surface and detects an object that is in proximity to or brought into contact with the display surface; a selection unit that sets selection targets selected through detection of the object to a plurality of operation markers in a case where the detection state of the object on the display surface exceeds a predetermined reference, sets a selection target selected through detection of the object to one operation marker in a case where the detection state does not exceed the predetermined reference, and selects one or more operation markers from among the plurality of operation markers displayed on the display surface based on the detection state; and a display control unit that changes the display forms of the operation markers selected from among the plurality of operation markers displayed on the display surface into a display form indicating a selected state and displays the selected operation marker on the display surface, a display control method thereof, and a program that allows a computer to perform the method. Accordingly, the selection targets selected through detection of the object is set to a plurality of operation markers in a case where the detection state of the object on the display surface exceeds a predetermined reference, the selection target selected through detection of the object are set to one operation marker in a case where the detection state does not exceed the predetermined reference, and one or more operation markers are selected from among the plurality of operation markers displayed on the display surface based on the detection state.

According to the embodiments of the present invention, there is a superior advantage in that the selection operation for the operation markers can be performed in an easy manner.

BRIEF DESCRIPTION OF THE DRAWINGS

FIGS. 3A and 3B are schematic diagrams representing a relationship between an object detection area detected on the input-output panel according to the first embodiment of the present invention and object detection information corresponding to the object detection area.

FIGS. 11A and 11B are diagrams showing an example of an operation method and a display in a case where a selection operation is performed for a plurality of operation markers displayed on the display panel according to the first embodiment of the present invention.

FIG. 20 is a flowchart showing the procedure of an operation marker selecting process performed by the imaging device according to the first embodiment of the present invention.

FIG. 22 is a flowchart showing the procedure of the operation marker selecting process performed by the imaging device according to the first embodiment of the present invention.

FIG. 31 is a flowchart showing the procedure of the operation marker selecting process performed by the imaging device according to the second embodiment of the present invention.

FIG. 32 is a block diagram showing an example of the functional configuration of an electronic apparatus according to a third embodiment of the present invention.

DESCRIPTION OF THE PREFERRED EMBODIMENTS

Hereinafter, modes for embodying the present invention (hereinafter referred to as embodiments) will be described. The description will be made in the following order.

1. First Embodiment (control of operation marker selection: an example in which a plurality of operation markers are simultaneously selected by one selection operation)

2. Second Embodiment (control of operation marker selection: an example in which a plurality of selection states of operation markers are simultaneously released)

3. Third Embodiment (control of operation marker selection: an example in which a plurality of operation markers are simultaneously selected by one selection operation for another electronic apparatus)

1. First Embodiment

Example of Internal Configuration of Imaging Device

Figure 1:
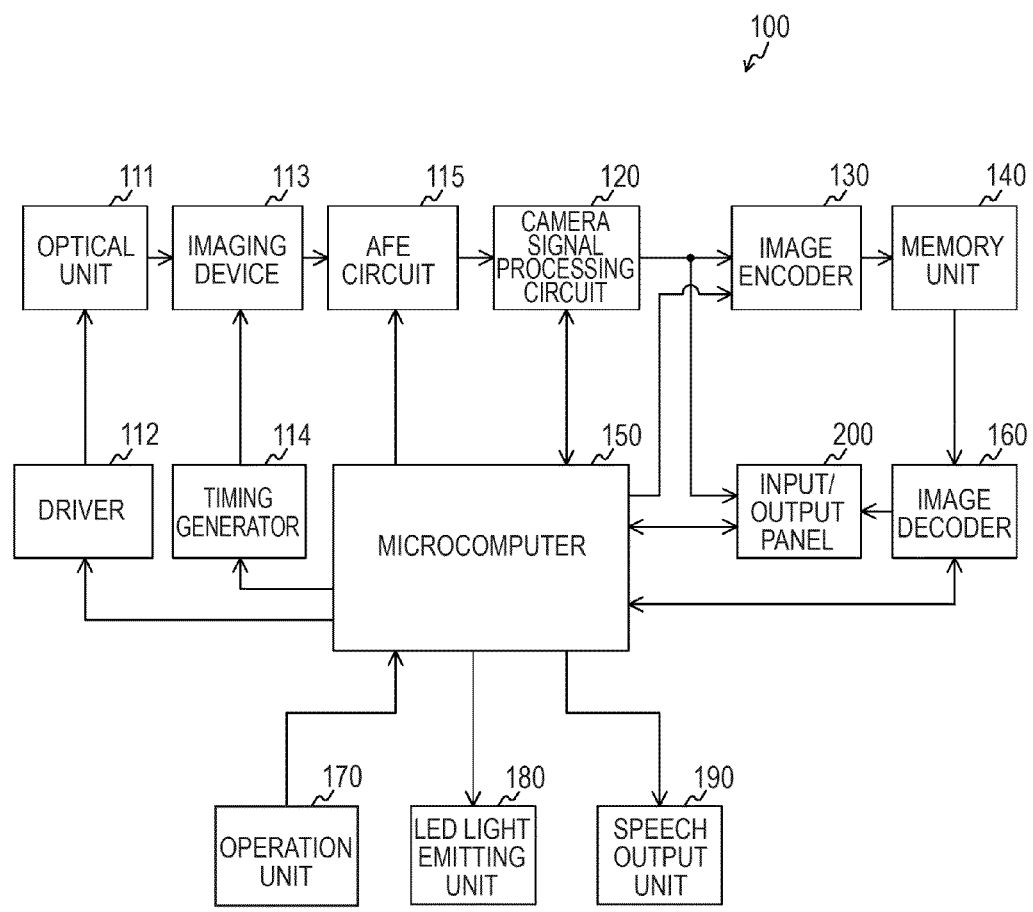
FIG. 1 is a block diagram showing an example of the internal configuration of an imaging device according to a first embodiment of the present invention.

FIG. 1 is a block diagram showing an example of the internal configuration of an imaging device 100 according to a first embodiment of the present invention. The imaging device 100 includes an optical unit 111, a driver 112, an imaging device 113, a timing generator 114, and an AFE (Analog Front End) circuit 115. In addition, the imaging device 100 includes a camera signal processing circuit 120, an image encoder 130, a recording unit 140, a microcomputer 150, and an image decoder 160. Furthermore, the imaging device 100 includes an operation unit 170, an LED (Light Emitting Diode) light emitting unit 180, a speech output unit 190, and an input/output panel 200. The imaging device 100, for example, is implemented by an imaging device such as a digital still camera or a digital video camera (for example, a camera integrated recorder) that generates image data by imaging a subject and records the image data as a content.

The optical unit 111 includes a plurality of lenses that is used for collecting light transmitted from a subject in the imaging device 113, a driving mechanism that is used for focusing or zooming by moving the lenses, a shutter mechanism, an iris mechanism, and the like.

The driver 112 controls driving of each mechanism disposed inside the optical unit 111 based on a control signal transmitted from the microcomputer 150.

The imaging device 113 is a solid-state imaging device that is driven in accordance with a timing signal output from the timing generator 114. The imaging device 113 converts light incident from a subject into an electrical signal and supplies the converted electrical signal (image signal) to the AFE circuit 115. As the imaging device 113, for example, a solid-state imaging device of a CCD (Charge Coupled Device) type, a CMOS (Complementary Metal Oxide Semiconductor) type, or the like can be used.

The timing generator 114 generates a timing signal based on a control signal transmitted from the microcomputer 150 and outputs the generated timing signal to the imaging device 113.

The AFE circuit 115 generates digital image data by performing various signal processes for an image signal output from the imaging device 113 based on a control signal transmitted from the microcomputer 150 and outputs the digital image data to the camera signal processing circuit 120. In other words, the AFE circuit 115 performs sample-and-hold for the image signal output from the imaging device 113 by performing a CDS (Correlated Double Sampling) process so as to maintain an excellent S/N (Signal-to-Noise) ratio. Then, AFE circuit 115 controls the gain by an AGC (Auto Gain Control) process and performs an A/D (Analog/Digital) conversion process, whereby generating the digital image data.

The camera signal processing circuit 120 performs a detection process or an image correction process for the digital image data output from the AFE circuit 115 based on a control signal transmitted from the microcomputer 150. Then, the camera signal processing circuit 120 outputs the image data for which the above-described process has been performed to the image encoder 130 and the input/output panel 200.

The image encoder 130 performs compression coding for the image data output from the camera signal processing circuit 120 in accordance with a control signal transmitted from the microcomputer 150 and outputs the encoded data for which the compression coding is performed to the recording unit 140. For example, when it is directed to record a still screen, image data corresponding to one frame that is processed by the camera signal processing circuit 120 is supplied to the image encoder 130, and a compression coding process is performed for the image data by the image encoder 130 by using a predetermined coding method. On the other hand, when it is directed to record a moving picture, image data processed by the camera signal processing circuit 120 is consecutively supplied to the image encoder 130, and a compression coding process is performed for the image data by the image encoder 130 by using a predetermined coding method.

The recording unit 140 is a recording device that records the encoded data output from the image encoder 130 as a still-screen file or a moving picture file. As the recording unit 140, for example, a drive device for a portable recording medium such as a magnetic tape or an optical disc, an HDD (Hard Disk Drive), or the like can be used.

The microcomputer 150 includes a CPU (Central Processing Unit) and a memory and executes a control program that is stored in the memory. In other words, the microcomputer 150 controls the overall operation of the imaging device 100. The memory that is included in the microcomputer 150 is a ROM (Read Only Memory), a RAM (Random Access Memory), or the like. An example of the functional configuration that is implemented by the microcomputer 150 will be described in detail with reference to FIG. 4.

The image decoder 160 decodes the image data recorded in the recording unit 140 by using a predetermined decoding method in accordance with a control signal transmitted from the microcomputer 150. Then, the decoded image data is output to the input/output panel 200 and the microcomputer 150.

The operation unit 170 is an operation reception unit that receives an operation performed by a user and outputs a control signal corresponding to the content of the received operation to the microcomputer 150. The operation unit 170, for example, may be configured to include a content reproduction mode setting/releasing button, a reproduction instruction button, and the like. The content reproduction mode setting/releasing button is a button that is used for setting or releasing the content reproduction mode for reproducing the content recorded in the recording unit 140. For example, when the content reproduction mode is set, a contents selection screen that is used for selecting a content to be reproduced is displayed in the input-output panel 200. In addition, the reproduction directing button is a button that is used for directing start of reproduction of the content selected in the input/output panel 200.

The LED light emitting unit 180 turns on an LED that is disposed on the exterior face of the imaging device 100 in accordance with a control signal transmitted from the microcomputer 150.

The speech output unit 190 outputs a variety of speech in accordance with a control signal transmitted from the microcomputer 150.

The input/output panel 200 receives an operation input from a user by displaying various images in accordance with a control signal transmitted from the microcomputer 150 and detecting an object that is in proximity to or brought into contact with the input-output panel 200. Then, the input/output panel 200 outputs a control signal corresponding to the received operation input to the microcomputer 150. In the input-output panel 200, for example, an image (so-called a camera through image) corresponding to image data output from the camera signal processing circuit 120 is displayed. In addition, in the input-output panel 200, for example, a content (for example, a moving picture or a still screen) recorded in the recording unit 140 is displayed. In addition, a contents selection screen for selecting a content to be displayed is displayed in the input-output panel 200. By detecting an object that is in proximity to or brought into contact with the contents selection screen, the input-output panel 200 receives a content selecting operation from a user. This contents selection screen and the selection operation will be described in detail with reference to FIGS. 5A to 14B and the like. The internal configuration of the input-output panel 200 will be described in detail with reference to FIG. 2.

Figure 2:
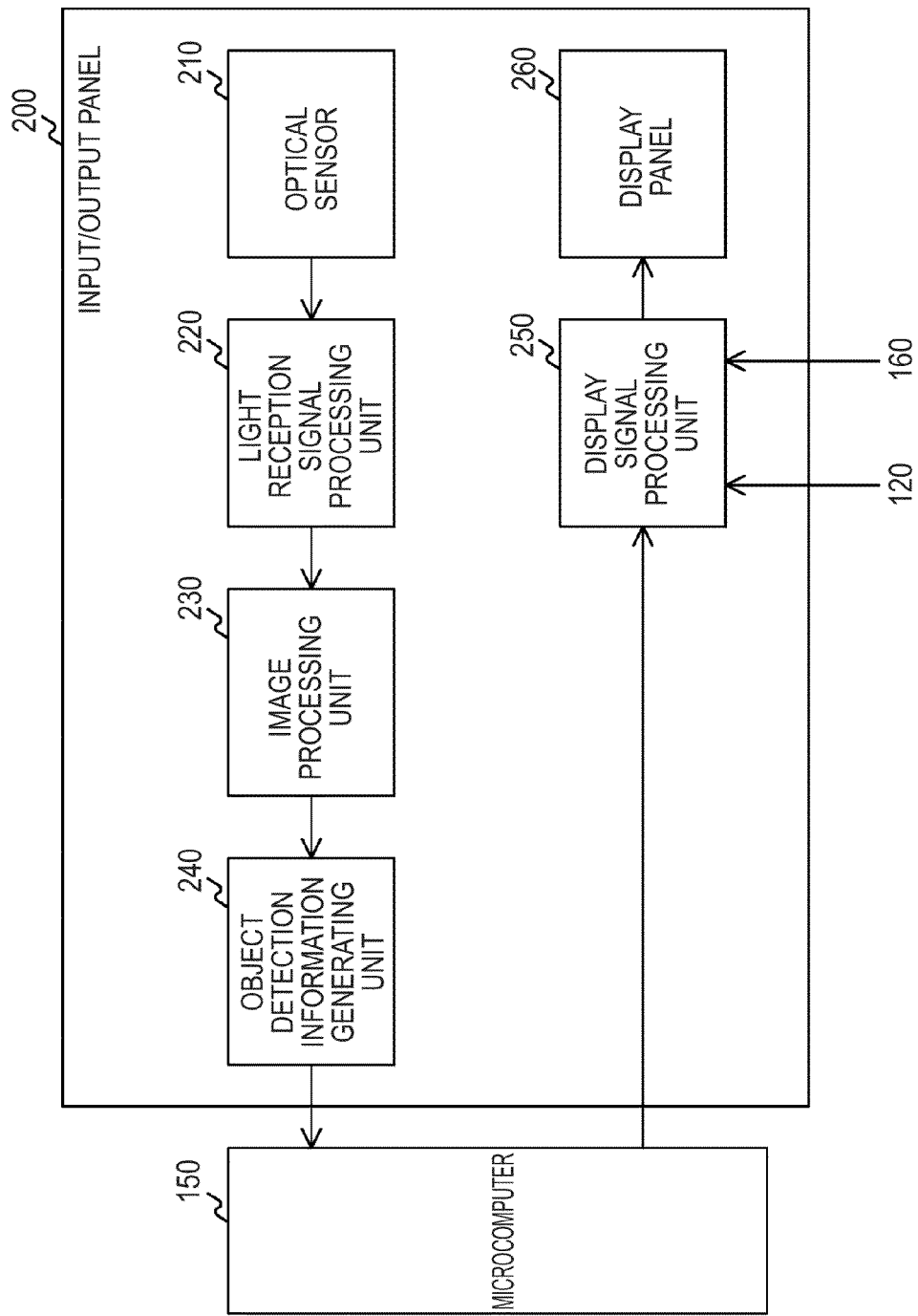
FIG. 2 is a block diagram showing an example of the internal configuration of the input/output panel according to the first embodiment of the present invention.

FIG. 2 is a block diagram showing an example of the internal configuration of the input/output panel 200 according to the first embodiment of the present invention. The input/output panel 200 includes an optical sensor 210, a light reception signal processing unit 220, an image processing unit 230, an object detection information generating unit 240, a display signal processing unit 250, and a display panel 260. The input-output 200, for example, is implemented by an optical sensor-type touch panel.

The optical sensor 210 is a sensor that receives light incident from the outside and generates a light reception signal corresponding to the light reception amount of the light and supplies the generated light reception signal to the light reception signal processing unit 220. The optical sensor 210, for example, is disposed to be built in the display panel 260 so as to be distributed on the entire display surface of the display panel 260. For example, liquid crystal elements that are display elements (light emitting devices) of the display panel 260 and the light receiving elements (imaging devices) of the optical sensor 210 are respectively disposed in a matrix shape. When the display elements and the light reception elements are respectively disposed in a matrix shape as described above, for example, the number of the light receiving elements and the number of the display elements may be different from each other. For example, the light receiving elements may be configured so as to be intermittently disposed with respect to the display elements.

The light reception signal processing unit 220 sequentially generates images (frames) having different luminance in a portion in which an object is in proximity to or brought into contact with the display surface of the display panel 260 and in other portions by applying a predetermined signal process for a light reception signal supplied from the optical sensor 210. Then, the light reception signal processing unit 220 sequentially supplies the generated images to the image processing unit 230. The generation of such images, for example, is performed with a constant frame rate. Here, the object to be detected, for example, is a user's finger or a stylus (a pen-type input device used for designating coordinates). The portion to which the object is in proximity, for example, is a portion in which the object is located in a position spaced apart by a short distance from the display surface of the display panel 260 and the portion with which the object is brought into contact, for example, is a portion in which the object is brought into physical contact with the display surface of the display panel 260. In other words, for example, the input/output panel 200 can receive an operation input in a case where a user's finger is in proximity to the display surface of the display panel 260 without the user's finger being brought into contact with the display surface of the display panel 260.

The image processing unit 230 detects a portion (object detection area) of the display surface of the display panel 260, which an object is in proximity to or brought into contact with, based on each image supplied from the light reception signal processing unit 220 and generates point information corresponding to the object detection area. Then, the image processing unit 230 supplies the generated point information to the object detection information generating unit 240. In particular, the image processing unit 230 specifies an object detection area by performing image processes such as binarization, noise elimination, and labeling for each image supplied from the light reception signal processing unit 220. Then, the image processing unit 230 generates the area (coordinate area) of the display surface of the display panel 260 corresponding to the object detection area as point information.

The object detection information generating unit 240 generates object detection information for specifying the operation input on the display surface of the display panel 260 based on the point information supplied from the image processing unit 230 and outputs the generated object detection information to the microcomputer 150. This object detection information will be described in detail with reference to FIGS. 3A and 3B.

The display signal processing unit 250 performs a process for displaying the image data supplied from the microcomputer 150 on the display panel 260 and outputs the image data (display signal) for which the process has been processed to the display panel 260. In addition, the display signal processing unit 250 performs a process for displaying the image data output from the camera signal processing circuit 120 or the image decoder 160 on the display panel 260 and outputs the image data for which the process has been performed to the display panel 260. A display example on the display panel 260 will be described in detail with reference to FIGS. 5A, 5B and 8A to 14B, and the like.

The display panel 260 displays an image corresponding to the image data supplied from the display signal processing unit 250. For example, the display panel 260 is configured by a liquid crystal panel (LCD). As described above, the optical sensor 210 is disposed to be built in the display panel 260.

Example of Detection of Object on Display Panel

FIGS. 3A and 3B are schematic diagrams representing a relationship between an object detection area detected on the input-output panel 200 according to the first embodiment of the present invention and object detection information corresponding to the object detection area. FIG. 3A represents the object detection area that is detected on the display panel 260. In the example shown in FIG. 3A, an example in which an object that is in proximity to or brought into contact with the display surface on the xy coordinates in which the horizontal axis is the x axis, the vertical axis is the y axis, and an upper left corner of the display panel 260 of which the display surface is a rectangle is set as the origin point will be described.

In this example, a case where two objects (for example, two fingers) are in proximity to or brought into contact with the display surface of the display panel 260 will be described. In such a case, the light reception signal processing unit 220 generates an image in which the luminance of portions that two objects are in proximity to or brought into contact with the display surface of the display panel 260 is different from that of the other portions based on the light reception signal supplied from the optical sensor 210. Here, the portions that the two objects are in proximity to or brought into contact with are assumed to be in correspondence with the object detection areas 311 and 312 represented in FIG. 3A.

Subsequently, the image processing unit 230 detects portions (object detection areas 311 and 312) of the display surface of the display panel 260 that the two objects are in proximity to or brought into contact with, based on the image supplied from the light reception signal processing unit 220. Then, the image processing unit 230 generates point information corresponding to the object detection areas 311 and 312. Such point information is information that represents coordinates on the display surface of the display panel 260 corresponding to the object detection areas 311 and 312.

Subsequently, the object detection information generating unit 240 generates the object detection information, which is represented in FIG. 3B, based on the point information supplied from the image processing unit 230.

FIG. 3B represents the object detection information 300 generated for the object detection areas 311 and 312 of the display panel 260. As the object detection information 300, the number of detected objects 301 and data for each detected object are generated. In FIG. 3B, the type of data generated for each object is represented as a data type 303, and the content of the data is represented as a data content 304. Based on the object detection information 300, detection states of objects detected on the display panel 260 are specified.

The number of detected objects 301 is data that represents the number of objects detected on the display panel 260. In this example, as represented in FIG. 3A, two objects are detected on the display panel 260. Accordingly, "two" is generated as the number of detected objects 301.

Detected-object identification information 302 is identification information that is used for identifying each object detected on the display panel 260. In FIG. 3B, the two objects detected on the display panel 260 are represented as Object 1 and Object 2.

The data type 303 represents the type of data generated for each object detected on the display panel 260, and the data content 304 represents the content of the data type 303. For example, as the types of data generated for each object detected on the display panel 260, center coordinates (Xn, Yn) of the object detection area, the detected area An of the object, upper-end coordinates Tn of the object, left-end coordinates Ln of the object, right-end coordinates Rn of the object, and lower-end coordinates Bn of the object are generated. Here, n corresponds to the value of the identification information represented by the detected-object identification information 302.

For example, as represented in FIG. 3A, in a case where two object detection areas 311 and 312 are detected on the display panel 260, an object corresponding to the object detection area 311 is denoted by Object 1, and an object corresponding to the object detection area 312 is denoted Object 2. In such a case, as the object detection information corresponding to the object detection area 311, the center coordinates (X1, Y1) of the detected area of Object 1, the detection area A1 of Object 1, the upper-end coordinates T1 of Object 1, the left-end coordinates L1 of Object 1, the right-end coordinates R1 of Object 1, and the lower-end coordinates B1 of Object 1 are generated. In addition, as the object detection information corresponding to the object detection area 312, the center coordinates (X2, Y2) of the detected area of Object 2, the detection area A2 of Object 2, the upper-end coordinates T2 of Object 2, the left-end coordinates L2 of Object 2, the right-end coordinates R2 of Object 2, and the lower-end coordinates B2 of Object 2 are generated. Although a case where the center coordinates of the object detection area are used as the position of the detected object is described in this example, for example, the center position of the object detection area may be used.

Example of Functional Configuration of Imaging Device

Figure 4:
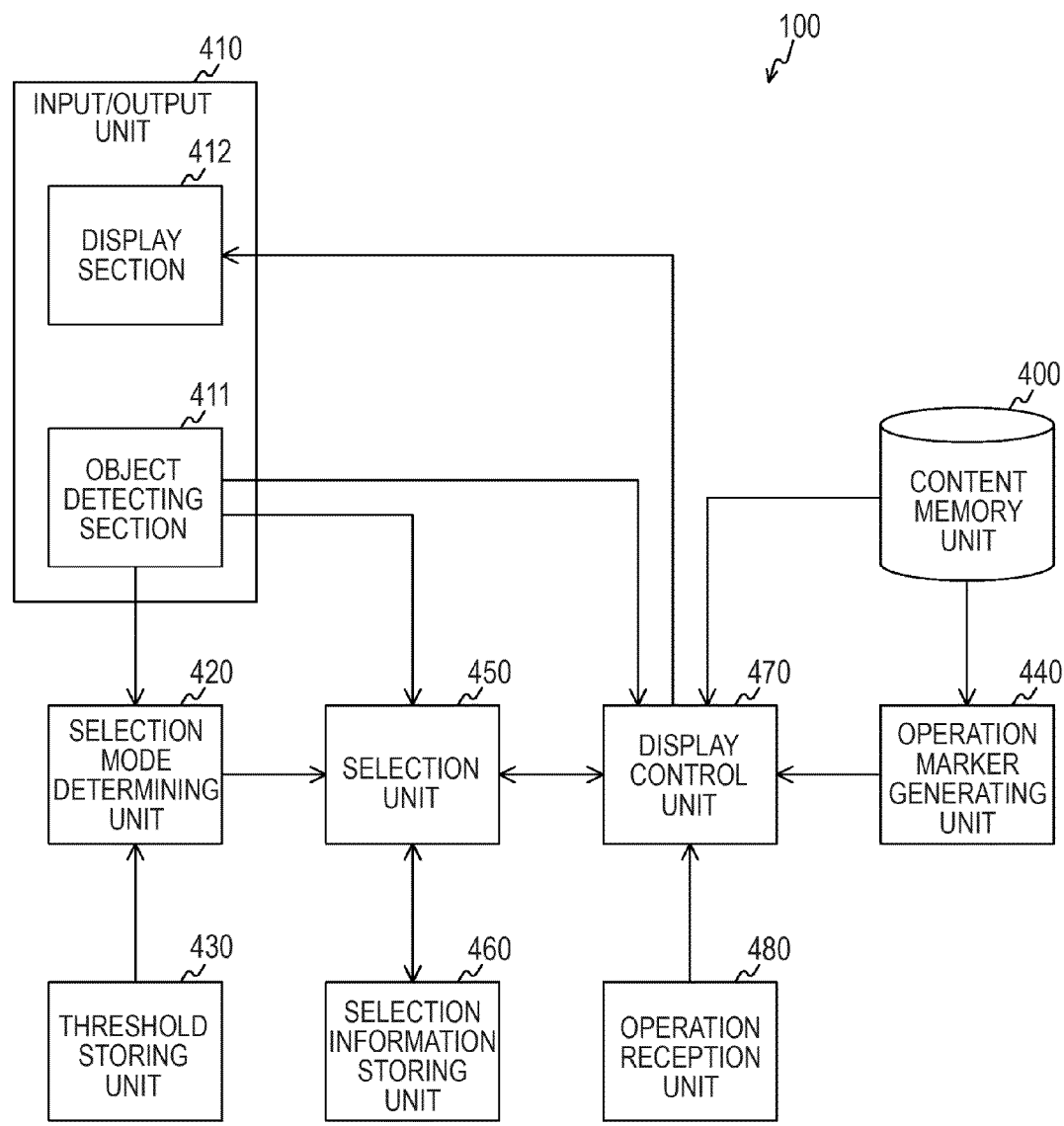
FIG. 4 is a block diagram showing an example of the functional configuration of the imaging device according to the first embodiment of the present invention.

FIG. 4 is a block diagram showing an example of the functional configuration of the imaging device 100 according to the first embodiment of the present invention. The imaging device 100 includes a content memory unit 400, an input/output unit 410, a threshold storing unit 430, a selection mode determining unit 420, an operation marker generating unit 440, a selection unit 450, a selection information storing unit 460, a display control unit 470, and an operation reception unit 480. In addition, the input-output unit 410 includes an object detecting section 411 and a display section 412. Here, the input/output unit 410 corresponds to the input/output panel 200 shown in FIG. 1.

The content memory unit 400 stores contents such as a moving picture (video data) and a still screen. The content memory unit 400 supplies the stored contents to the operation marker generating unit 440 and the display control unit 470. Here, the content memory unit 400 corresponds to the recording unit 140 shown in FIG. 1.

The object detecting section 411 detects an object that is in proximity to or brought into contact with the display surface of the display panel 260 and outputs object detection information on the detected object to the selection mode determining unit 420, the selection unit 450, and the display control unit 470. In particular, the object detecting section 411 outputs the detection area of the detected object to the selection mode determining unit 420 and outputs the center coordinates, the detection area, the upper-end coordinates, the left-end coordinates, the right-end coordinates, and the lower-end coordinates of the detection area of the detected object to the selection unit 450 and the display control unit 470. Here, the object detecting section 411 corresponds to the optical sensor 210, the light reception signal processing unit 220, the image processing unit 230, and the object detection information generating unit 240 that are shown in FIG. 2. In addition, the object detecting section 411 is an example of an operation reception unit according to the embodiment of the present invention.

The display section 412 displays a contents selection screen, a contents reproduction screen, or the like under the control of the display control unit 470. Here, the display section 412 corresponds to the display panel 260 shown in FIG. 2.

The selection mode determining unit 420 determines a selection mode in a case where a plurality of operation markers displayed on the contents selection screen are selected and outputs the determined selection mode to the selection unit 450. This selection mode sets the number of operation markers that can be selected by one selection operation in a case where the plurality of the operation markers displayed on the contents selection screen of the display section 412 are selected. For example, either a multiple selection mode in which a plurality of the operation markers become selection targets according to detection of the object or a single selection mode in which one operation marker becomes a selection target according to detection of the object is selected, based on the detection state of objects that are in proximity to or brought into contact with the display surface of the display panel 260. In particular, the selection mode determining unit 420 compares the value of the detection area of the object that is output from the object detecting section 411 with a threshold value that is stored in the threshold storing unit 430 and determines the selection mode based on the result of the comparison. For example, the selection mode determining unit 420 determines the multiple section mode in a case where the value of the detection area of the object is equal to or greater than the threshold value. On the other hand, the selection mode determining unit 420 determines the single selection mode in a case where the value of the detection area of the object is less than the threshold value. The operation marker, for example, is an image (for example, C0 to C39 shown in FIGS. 5A and 5B) representing the contents stored in the content memory unit 400. For example, when the content stored in the content memory unit 400 is a moving picture, a thumbnail image of a representative frame (for example, a leading frame) of the moving picture is used as an operation marker. On the other hand, when the content stored in the content memory unit 400 is a still screen, the thumbnail image of the still screen is used as an operation marker. The determining of the selection mode will be described with reference to FIGS. 6A and 6B. Here, the selection mode determining unit 420 corresponds to the microcomputer 150 shown in FIG. 1.

The threshold storing unit 430 stores a threshold value that is used for determining a selection mode in a case where a plurality of operation markers displayed on the contents selection screen are selected and supplies the stored threshold value to the selection mode determining unit 420. In the first embodiment of the present invention, an example in which a threshold value for the detection area of a detected object is used as the threshold value is described. Here, the threshold storing unit 430 corresponds to the microcomputer 150 shown in FIG. 1.

The operation marker generating unit 440 generates the operation markers representing the contents based on the contents stored in the contents memory unit 400 and outputs the generated operation markers to the display control unit 470. In addition, in the first embodiment of the present invention, an example in which the operation markers generated based on the contents are displayed on the contents selection screen is represented. However, for example, different operation markers relating to the contents may be configured to be displayed on the contents selection screen. For example, it may be configured that operation markers (for example, thumb nail images, icons, or the like relating to the contents) are stored, and the operation markers are displayed on the contents selection screen. Here, the operation marker generating unit 440 corresponds to the microcomputer 150 shown in FIG. 1.

The selection unit 450 selects one or a plurality of operation markers from among a plurality of operation markers displayed on the content selection screen and outputs selection information on the selected operation markers to the display control unit 470. In addition, the selection unit 450 sequentially updates the contents stored in the selection information storing unit 460 based on the selection. In particular, the selection unit 450 selects one or a plurality of operation markers based on the selection mode determined by the selection mode determining unit 420 and the detection state (for example, the detection area of an object or the number of detected objects) specified by the object detection information output from the object detecting section 411. In such a case, disposition of the operation markers displayed on the contents selection screen is specified by operation marker disposition information output from the display control unit 470. A method of selecting the operation markers will be described in detail with reference to FIGS. 6A, 6B, 7A, and 7B and the like. Here, the selection unit 450 corresponds to the microcomputer 150 shown in FIG. 1.

The selection information storing unit 460 stores the selection information on the operation markers that are selected by the selection unit 450, and supplies the stored selection information to the selection information storing unit 460. Here, the selection information storing unit 460 corresponds to the microcomputer 150 shown in FIG. 1.

The display control unit 470 controls the display state of the display section 412 based on the object detection information output from the object detecting section 411, the selection information output from the selection unit 450, and the content of the operation output from the operation reception unit 480. For example, the display control unit 470 displays the contents selection screen including the plurality of operation markers output from the operation marker generating unit 440 in the display section 412 based on the object detection information output from the object detecting section 411 or the content of the operation output from the operation reception unit 480. In addition, the display control unit 470 changes the display form of the operation marker in the selected state from among the operation markers displayed on the contents selection screen based on the selection information output from the selection unit 450. The display control unit 470 performs a scroll process for the operation markers displayed on the contents selection screen based on the object detection information output from the object detecting section 411 or the content of the operation that is output from the operation reception unit 480 and displays the operation markers after the scroll process. In addition, the display control unit 470 performs a reproduction process for the content stored in the content memory unit 400 based on the object detection information output from the object detecting section 411 or the content of the operation that is output from the operation reception unit 480. Furthermore, the display control unit 470 outputs disposition information relating to the disposition of the operation markers displayed on the contents selection screen to the selection unit 450. Here, the display control unit 470 corresponds to the microcomputer 150 shown in FIG. 1 and the display signal processing unit 250 shown in FIG. 2. In addition, the display control unit 470 is an example of an output control unit according to the embodiment of the invention.

The operation reception unit 480 receives an operation performed by a user and outputs the content of the received operation to the display control unit 470. For example, the operation reception unit 480 can receive an operation such an operation for a reproduction direction or a scroll operation. Such an operation input may be configured to be received by the object detecting section 411. Here, the operation reception unit 480 corresponds to the operation unit 170 shown in FIG. 1.

Example of Display of Contents Selection Screen

Figure 5A:
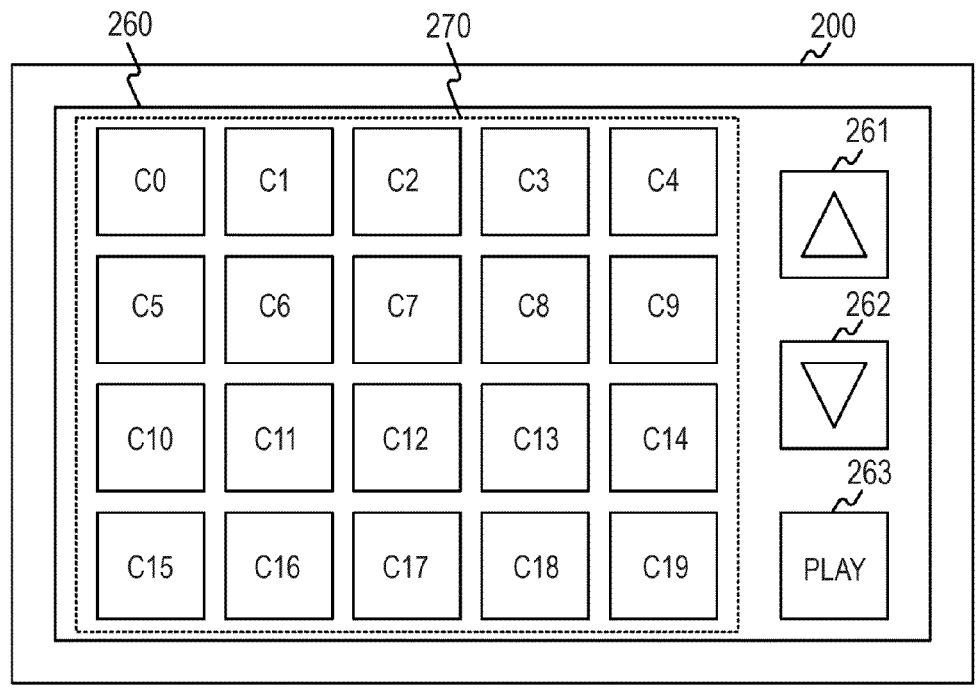
FIGS. 5A and 5B are diagrams showing examples of display of the contents selection screen on the display panel according to the first embodiment of the present invention.
Figure 5B:
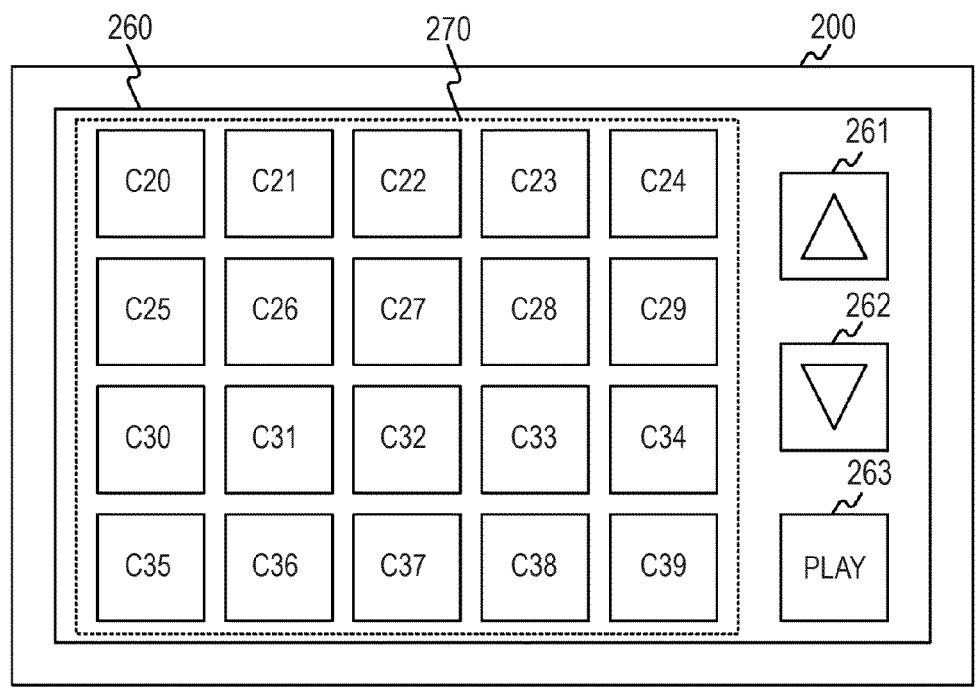

FIGS. 5A and 5B are diagrams showing examples of display of the contents selection screen on the display panel 260 according to the first embodiment of the present invention. This contents selection screen, for example, is a screen for selecting a content to be reproduced from among contents stored in the content memory unit 400.

In the contents selection screen shown in FIG. 5A, a plurality of operation markers C0 to C19, an up button 261, a down button 262, and a reproduction directing button (play button) 263 are displayed. In addition, on the contents selection screen, an area in which the plurality of operation markers (for example, C0 to C19) are displayed is set as a contents selection area 270. The contents selection screen, for example, is disposed in accordance with an operation for a direction by using the operation unit 170 or the input/output panel 200. In each embodiment of the present invention, the operation markers are simplified, and the identification information (for example, C0 to C19) is represented so as to be included in rectangles.

The up button 261 is an operation button that is used in a case where the operation marker, which is currently displayed, is to scroll to the upper side. The up button 261 can move the operation marker in units of one page or one row by being pressed down.

The down button 262 is an operation button that is used in a case where the operation marker, which is currently displayed, is to be scrolled down to the lower side. The down button 262 can move the operation marker in units of one page or one row by being pressed down. FIG. 5B illustrates the contents selection screen for a case where the operation markers located in the contents selection area 270 are moved by one page by pressing down the down button 262. On the contents selection screen illustrated in FIG. 5B, a plurality of operation markers C20 to C39, the up button 261, the down button 262, and the reproduction directing button 263 are displayed.

The reproduction directing button 263 is an operation button that is used for reproducing contents corresponding to one or a plurality of the operation markers that is in the selected state. In each embodiment of the present invention, the operation markers that are in the selected state are denoted by a large frame (for example, C13, C14, C18 and C19 illustrated in FIG. 9A). For example, in a case where one or a plurality of the operation marks are in the selected state, when an operation for pressing down the reproduction directing button 263 is performed, contents corresponding to operation markers that are in the selected state at the time of the operation for pressing down the reproduction directing button 263 are reproduced. Examples of the reproduction are illustrated in FIGS. 9A, 9B, 11A, and 11B.

Example of Calculating Selection Area

Figure 6A:
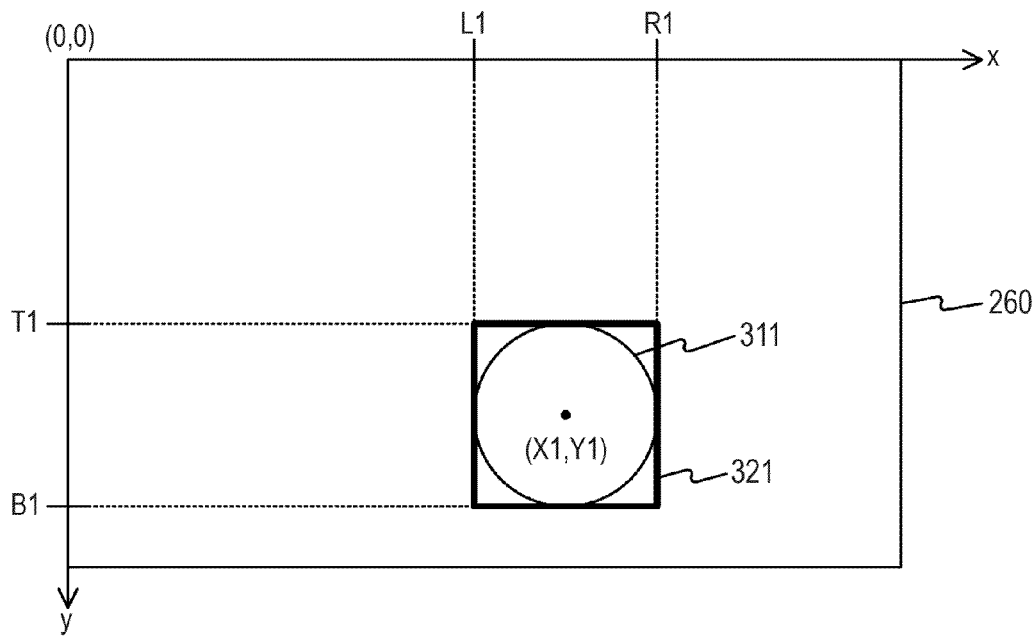
FIGS. 6A and 6B are diagrams illustrating relationships between the object detection area of the display panel according to the first embodiment of the present invention and a selection area that is calculated based on the object detection area.
Figure 6B:
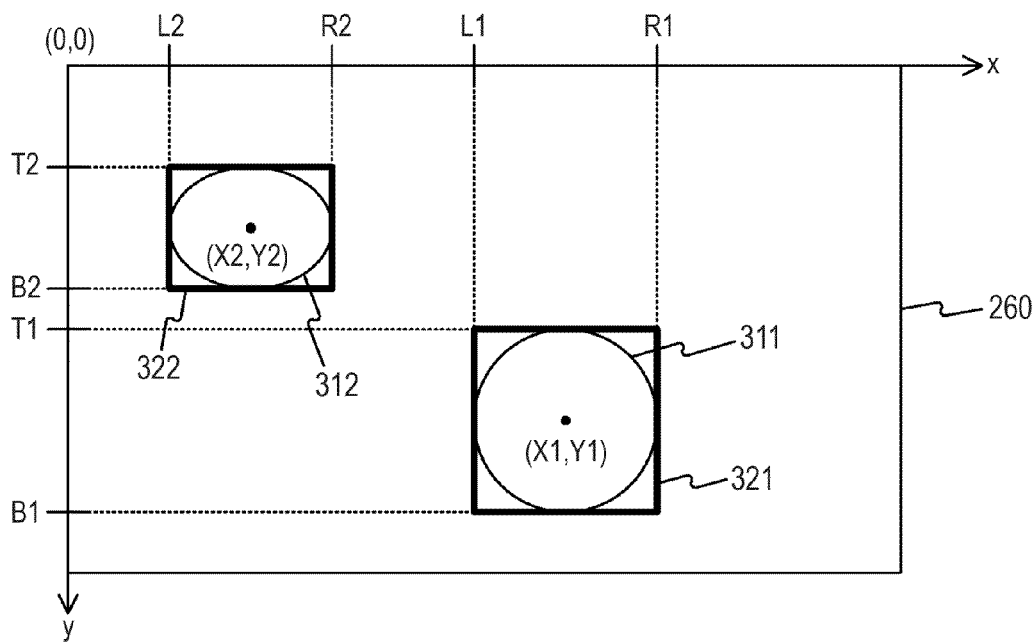
Figure 7A:
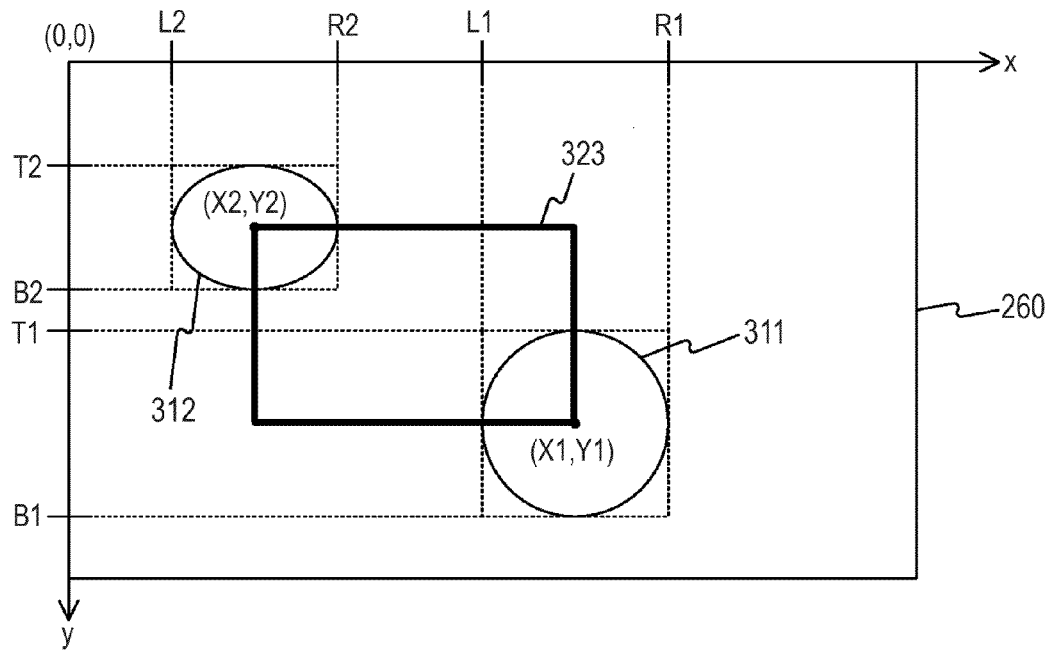
FIGS. 7A and 7B are diagrams illustrating relationships between the object detection area of the display panel according to the first embodiment of the present invention and a selection area that is calculated based on the object detection area.
Figure 7B:
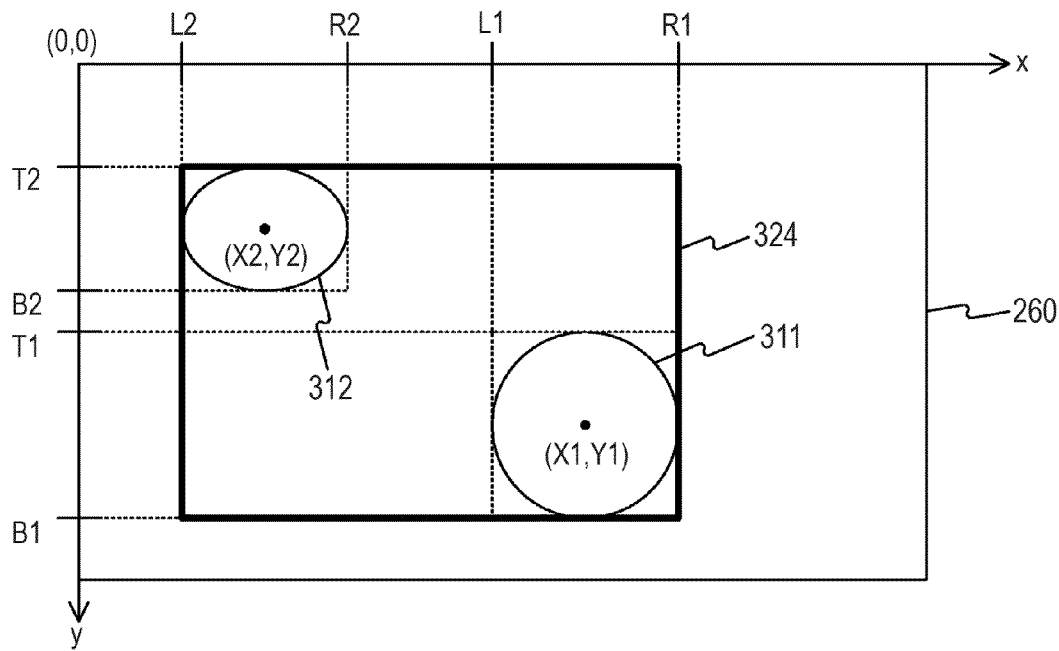

FIGS. 6A, 6B, 7A and 7B are diagrams illustrating relationships between the object detection area of the display panel 260 according to the first embodiment of the present invention and a selection area that is calculated based on the object detection area. FIG. 6A illustrates an example of a relationship between the object detection area and the selection area in a case where one object is detected. FIGS. 6B, 7A, and 7B illustrate examples of relationships between the object detection area and the selection area in a case where two objects are detected. The object detection areas 311 and 312, which are illustrated in FIGS. 6A, 6B, 7A, and 7B, and the object detection information that is specified by the object detection areas 311 and 312 are the same as those of the example illustrated in FIG. 3A, and thus description thereof is omitted here.

As illustrated in FIG. 6A, when one object (for example, a finger 1) is detected, the selection mode is determined based on the detection area (the area of the object detection area 311) of the detected finger 1. In particular, the selection mode determining unit 420 compares the value of the detection area of the finger 1 with the threshold value stored in the threshold storing unit 430. Then, in a case where the value of the detection area of the finger 1 is equal to or greater than the threshold value, the selection mode determining unit 420 determines the multiple selection mode. On the other hand, in a case where the value of the detection area of the finger 1 is less than the threshold value, the selection mode determining unit 420 determines the single selection mode.

Here, a case where the finger 1 is detected, and the multiple selection mode is determined by the selection mode determining unit 420 will be described. In such a case, the selection unit 450 selects one or a plurality of operation markers based on the object detection information that is generated for the finger 1. For example, the selection unit 450 calculates a rectangular selection area 321 that is specified by the upper-end coordinates, the left-end coordinates, the right-end coordinates, and the lower-end coordinates of the finger 1 as a selection area specified by the object detection information that is generated for the finger 1. Subsequently, the selection unit 450 selects one or a plurality of operation markers that are at least partially included in the selection area 321, outputs the selection information for the one of the plurality of selected operation markers to the display control unit 470, and updates the stored contents of the selection information storing unit 460 based on the selection. The display control unit 470 changes the display state of the one or the plurality of operation markers, which are selected by the selection unit 450, to the selected state based on the selection information. On the other hand, in a case where there is not any operation marker that is at least partially included in the selection area 321, the selection of an operation marker is not performed by the selection unit 450.

Next, a case where the finger 1 is detected, and the single selection mode is determined by the selection mode determining unit 420 will be described. In such a case, the selection unit 450 selects one operation marker based on the object detection information that is generated for the finger 1. For example, the selection unit 450 selects one operation marker that is located in a position of the center coordinates (X1, Y1) included in the object detection information that is generated for the finger 1. Then, the selection unit 450 outputs the selection information on the selected operation marker to the display control unit 470 and updates the stored contents of the selection information storing unit 460 based on the selection. Thereafter, the display control unit 470 changes the display state of the operation marker, which is selected by the selection unit 450 to the selected state, based on the selection information. On the other hand, in a case where there is not any operation marker that is located in the position of the center coordinates (X1, Y1), the selection of an operation marker is not performed by the selection unit 450.

As shown in FIG. 6B, for example, in a case where two objects (for examples, fingers 1 and 2) are detected, the selection mode is determined based on the detection area (the area of the object detection areas 311 and 312) of the detected fingers 1 and 2. In particular, the selection mode determining unit 420 adds the value of the detection area of the finger 1 and the value of the detection area of the finger 2 together and compares the added value with the threshold value that is stored in the threshold storing unit 430. Then, in a case where the added value is equal to or greater than the threshold value, the selection mode determining unit 420 determines the multiple selection mode. On the other hand, when the added value is less than the threshold value, the selection mode determining unit 420 determines the single selection mode.

Here, a case where the fingers 1 and 2 are detected, and the multiple selection mode is determined by the selection mode determining unit 420 will be described. In such a case, the selection unit 450 selects one or a plurality of operation markers based on the object detection information that is generated for the fingers 1 and 2. For example, the selection unit 450 calculates a rectangular selection area 321 as a selection area specified by the object detection information that is generated for the finger 1. In addition, the selection unit 450 calculates a rectangular selection area 322 that is specified by the upper-end coordinates, the left-end coordinates, the right-end coordinates, and the lower-end coordinates of the finger 2 as the selection area specified by the object detection information generated for the finger 2. Subsequently, the selection unit 450 selects one or a plurality of operation markers that are at least partially included in the selection area 321 or 322. In addition, the changing of the display state and the like are the same as those illustrated in FIG. 6A, and thus description thereof is omitted here.

Next, a case where the fingers 1 and 2 are detected, and the single selection mode is determined by the selection mode determining unit 420 will be described. In such a case, the selection unit 450 selects one operation marker based on the object detection information that is generated for the fingers 1 and 2. For example, the selection unit 450 selects one operation marker that is located in a position of the center coordinates (X1, Y1) included in the object detection information that is generated for a finger having a larger object detection area (for example, finger 1 corresponding to the object detection area 311). In addition, the changing of the display state and the like are the same as those illustrated in FIG. 6A, and thus description thereof is omitted here.

FIG. 6B illustrates an example in which the selection areas 321 and 322 are used as the selection areas calculated based on the object detection information that is generated for the detected fingers 1 and 2. However, as the selection areas calculated based on the object detection information generated for the one or plurality of objects, for example as illustrated in FIGS. 7A and 7B, a different selection area may be used.

FIG. 7A illustrates an example in which a rectangle having one set of opposing corners located in the positions of center coordinates of the objection detection areas of the fingers 1 and 2 is used as the selection area calculated based on the object detection information generated for the fingers 1 and 2 in a case where the multiple section mode is determined. In particular, the selection unit 450 calculates a selection area 323 corresponding to a rectangle having its opposing corners located at the center coordinates (X1, Y1) of the object detection area 311 of the finger 1 and the center coordinates (X2, Y2) of the object detection area 312 of the finger 2. Then, the selection unit 450 selects an operation marker by using the selection area 323. In addition, the selecting of an operation marker is the same as those of the examples illustrated in FIGS. 6A and 6B, and thus description thereof is omitted here.

FIG. 7B illustrates an example in which a rectangle including the object detection areas of the fingers 1 and 2 is used as the selection area specified by the object detection information that is generated for the fingers 1 and 2. In particular, the selection unit 450 calculates the selection area 324 by using the upper-end coordinates T1, the left-end coordinates L1, the right-end coordinates R1, and the lower-end coordinates B1 of the finger 1 and the upper-end coordinates T2, the left-end coordinates L2, the right-end coordinates R2, and the lower-end coordinates B2 of the finger 2. In other words, the upper side and the lower side of the rectangle corresponding to the selection area 324 are specified by one T2 of the upper-end coordinates of the fingers 1 and 2 that has a lower y-axis value and one B1 of the lower-end coordinates of the fingers 1 and 2 that has a higher y-axis value. In addition, the left side and the right side of the rectangle corresponding to the selection area 324 are specified by one L2 of the left-end coordinates of the fingers 1 and 2 that has a lower x-axis value and one R1 of the right-end coordinates of the fingers 1 and 2 that has a higher x-axis value. Accordingly, the selection unit 450 calculates the selection area 324 and selects the operation markers by using the selection area 324. In addition, the process for selecting the operation marks is the same as those illustrated in FIGS. 6A and 6B, and thus description thereof is omitted here.

As illustrated in FIGS. 7A and 7B, in a case where a plurality of objects is detected, operation markers that are located relatively extensively can be simultaneously selected by performing one operation by using a selection area that includes the object detection areas of each object. For example, even when a plurality of operation markers are selected by using two fingers, operation markers that are located relatively extensively can be simultaneously selected by performing one operation.

In addition, the threshold value that is used for determining the selection mode, for example, may be set by a user's manual operation performed in accordance with user's taste. In this example, a case where the selection mode is determined by using the detected area of the object is represented. However, for example, the selection mode may be determined by using different information (for example, the number of detected objects or the selection area) specified by the object detection information on the detected objects. For example, the selection mode may be determined in accordance with a signal tap or a multiple tap.

The method of calculating the selection area illustrated in FIGS. 6B, 7A, and 7B, for example, may be set by a user's manual operation performed in accordance with a user's taste. In addition, the selection area may be calculated by using a different calculation method by using object detection information on the detected objects. In addition, in this example, a case where operation markers at least partially included in the selection area are selected is represented. However, for example, only operation markers that are fully included in the selection area may be configured to be selected.

Example of Selection of Operation Markers

Figure 8A:
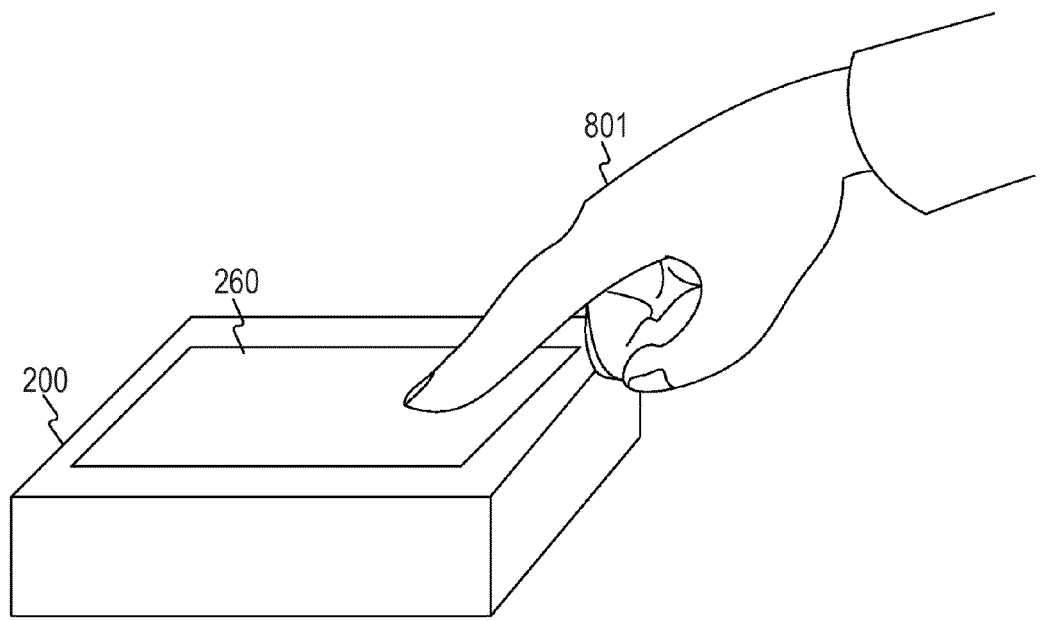
FIGS. 8A and 8B are diagrams illustrating examples of an operation method and a display for a case where a selection operation is performed for a plurality of operation markers displayed on the display panel according to the first embodiment of the present invention.
Figure 8B:
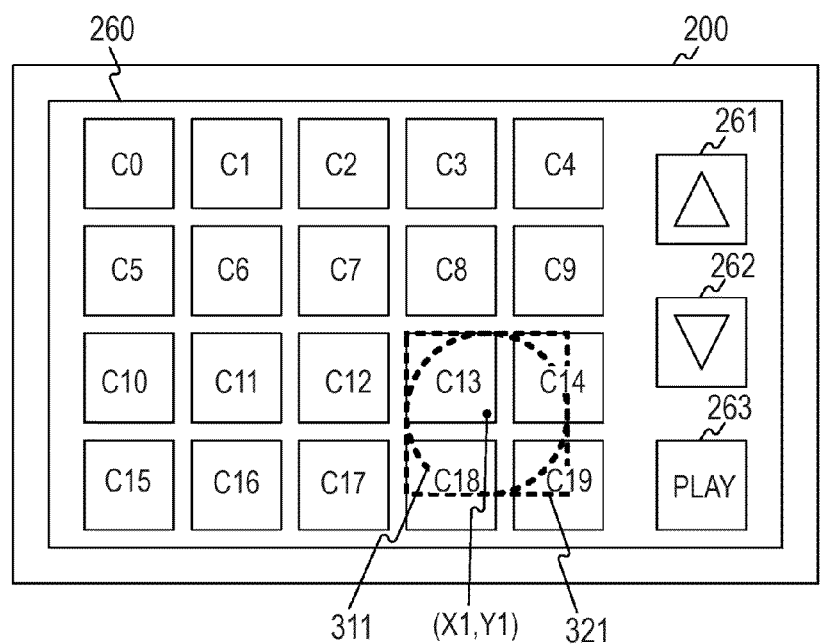
Figure 9A:
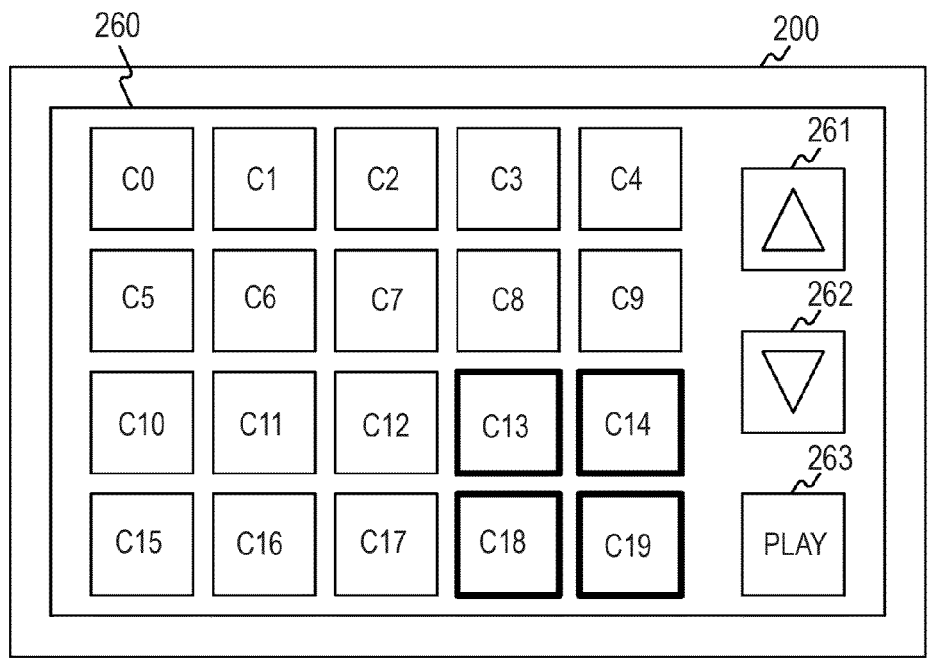
FIGS. 9A and 9B are diagrams illustrating examples of an operation method and a display for a case where a selection operation is performed for a plurality of operation markers displayed on the display panel according to the first embodiment of the present invention.
Figure 9B:
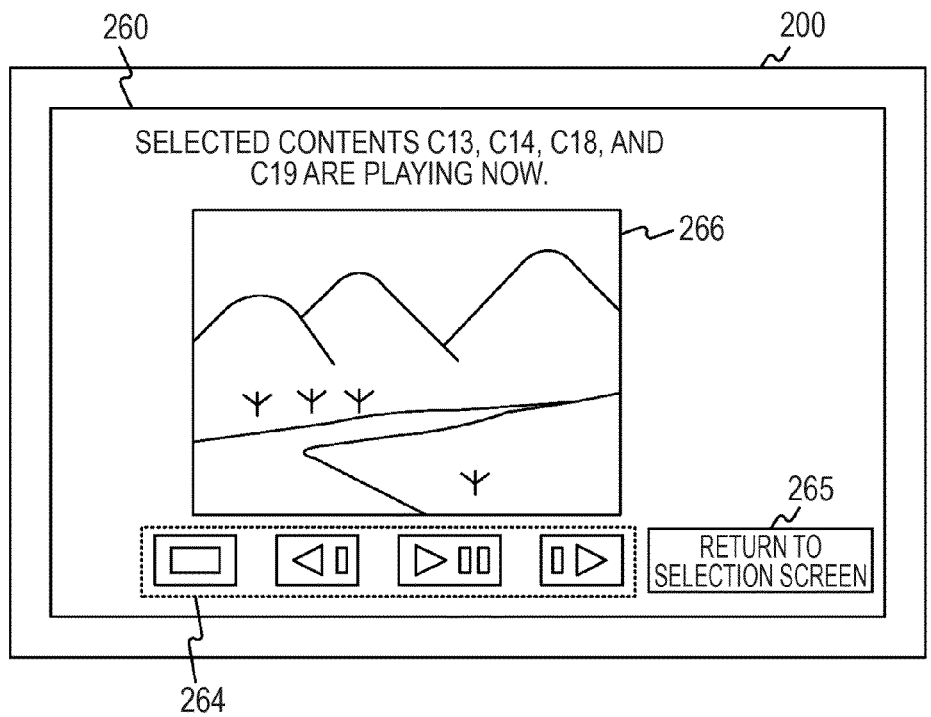

FIGS. 8A, 8B, 9A, and 9B are diagrams illustrating examples of an operation method and a display for a case where a selection operation is performed for a plurality of operation markers displayed on the display panel 260 according to the first embodiment of the present invention. FIG. 8A illustrates an example of the selection operation performed by a user for the plurality of operation markers displayed on the display panel 260. FIGS. 8B, 9A, and 9B illustrate a transition in a display screen displayed on the display panel 260 in accordance with the selection operation illustrated in FIG. 8A. In this example, a case where the selection operation is performed by using user's one finger will be exemplified. In each embodiment of the present invention, for the convenience of description, the external appearance of the input-output panel 200 included in the imaging device 100 is represented to be a simplified planar shape.

As an example, it is assumed that the contents selection screen illustrated in FIG. 5A is displayed on the display panel 260. In such a case, as illustrated in FIG. 8A, a user performs a selection operation by bringing a finger of the right hand 801 into contact with (in proximity to) a display portion of the operation maker corresponding to a desired content on the display panel 260. For example, when the number of the desired content is one, the user performs a selection operation by brining a finger into contact with a display portion of the operation marker corresponding to the desired content such that the object detection area of the display panel 260 is relatively small.

On the other hand, when the number of desired contents is two or more, the user performs a selection operation by brining a finger into contact with display portions of a plurality of operation markers corresponding to the desired contents such that the object detection area of the display panel 260 is relatively large. By performing only the selection operation by brining a finger into contact with the display portions such that the object detection area is relatively large, as described above, a plurality of contents can be simultaneously selected in one selection operation.

For example, in a case where the selection operation illustrated in FIG. 8A is performed, as shown in FIG. 8B, the object detection area detected in accordance with the selection operation is set as the object detection area 311, and an ellipse corresponding to the object detection area 311 is denoted by a dotted line. Here, the object detection area 311 is the same as the object detection area 311 illustrated in FIG. 3A, and thus description thereof is omitted here.

As described above, in a case where the object is detected on the display panel 260, the selection mode is determined based on the detected area (the area of the object detection area 311) of the detected object as described above. For example, in a case where the multiple selection mode is determined by the selection mode determining unit 420, one or a plurality of operation markers are selected based on the object detection information corresponding to the object detection area 311. For example, since at least parts of the operation markers C13, C14, C18, and C19 are included in the selection area 321 calculated based on the object detection information corresponding to the object detection area 311, the operation markers C13, C14, C18, and C19 are selected. As described above, the display forms of the operation markers C13, C14, C18, and C19, for example as illustrated in FIG. 9A, are changed into a display form different from those of other operation markers, so that the user can recognize that the operation markers are in the selected state in an easy manner. In each embodiment of the present invention, a case where the rectangular frame of an operation marker is represented in bold face as the display form indicating that the operation marker is in the selected state is illustrated as an example. However, for example, the selected state may be indicated by changing a display form such as the color, the size, or the like.

For example, in a case where the reproduction directing button 263 is pressed down by the user in the state in which the operation markers in the selected state are displayed on the display panel 260, the contents corresponding to the operation markers that are in the selected state at the time of the pressing-down operation are reproduced. As an example, as illustrated in FIG. 9A, a case where the reproduction directing button 263 is pressed down by the user in the state in which the operation markers C13, C14, C18, and C19, which are in the selected state, are displayed on the display panel 260 will be described. In such a case, as illustrated in FIG. 9B, the contents (for example, referred to as contents C13, C14, C18, and C19) corresponding to the operation markers C13, C14, C18, and C19 are reproduced. The order of the reproduction of the contents, for example, may be set in the order or recording times. Alternatively, a plurality of contents may be configured to be reproduced simultaneously. In addition, on a reproduction screen displayed by pressing down the reproduction directing button 263, for example, as illustrated in FIG. 9B, various operation buttons 264 relating to a reproduction operation, a button 265 for "returning to the selection screen", and a contents reproduction area 266 are displayed. This button 265 for "returning to the selection screen" is pressed down for returning to the contents selection screen.

As described above, even in a case where a plurality of contents are reproduced, only two touch operations including one selection operation by using one finger and a reproduction directing operation performed thereafter are performed. Accordingly, a process of reproducing the plurality of contents can be started in a speedy manner.

On the other hand, when the single selection mode is determined by the selection mode determining unit 420 in the state illustrated in FIG. 8B, one operation marker is selected based on the object detection information corresponding to the object detection area 311. For example, one operation marker C13 that is located in the position of the center coordinates (X1, Y1) included in the object detection information corresponding to the object detection area 311 is selected.

In addition, in this example, a case where the plurality of operation markers and the reproduction directing button 263 are displayed on the contents selection screen is illustrated. However, for example, it may be configured that only the plurality of operation markers are displayed on the contents selection screen, and another operation member is used for performing a reproduction directing operation.

Figure 10A:
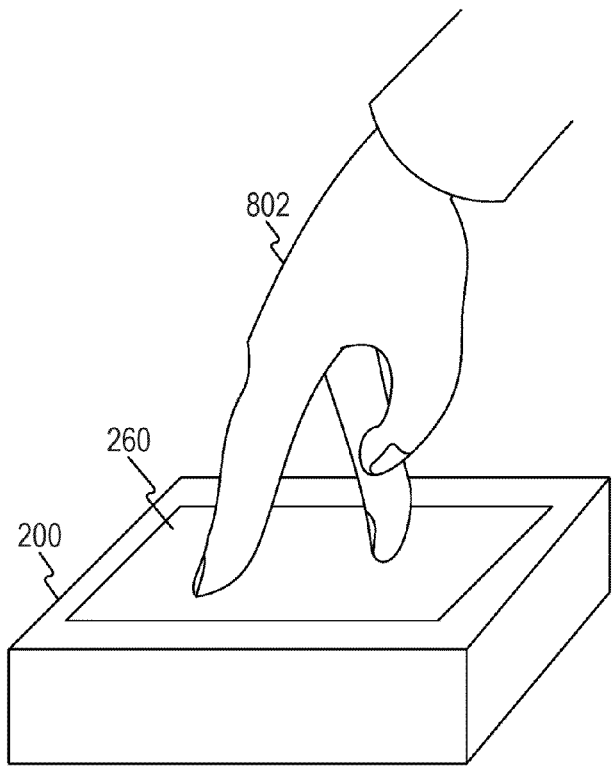
FIGS. 10A and 10B are diagrams showing examples of an operation method and a display in a case where a selection operation is performed for a plurality of operation markers displayed on the display panel according to the first embodiment of the present invention.
Figure 10B:
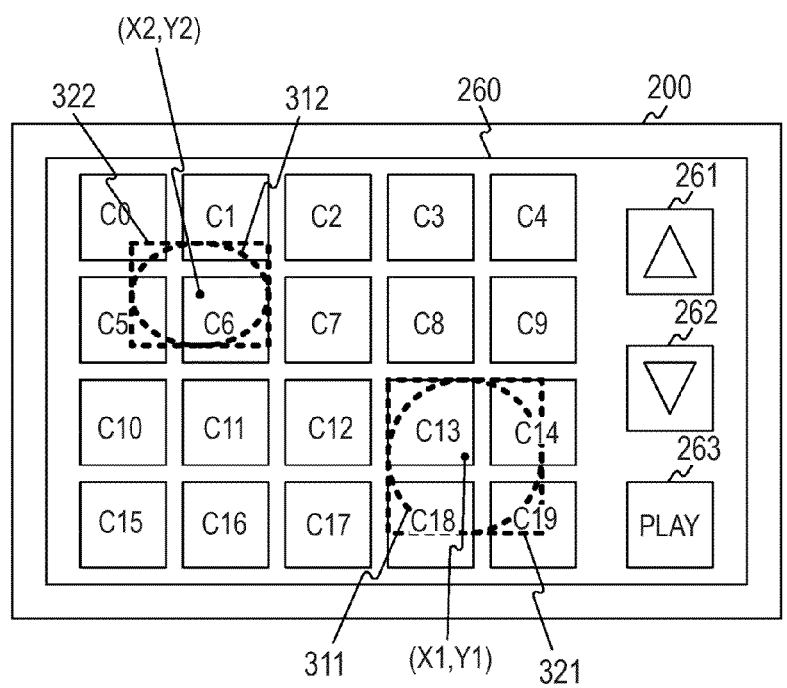

FIGS. 10A, 10B, 11A, and 11B are diagrams showing examples of an operation method and a display in a case where a selection operation is performed for a plurality of operation markers displayed on the display panel 260 according to the first embodiment of the present invention. FIG. 10A illustrates an example of the selection operation that is performed by a user for the plurality of operation markers displayed on the display panel 260. FIGS. 10B, 11A, and 11B show transitions in the display screen displayed on the display panel 260 in accordance with the selection operation illustrated in FIG. 10A. The example illustrated in FIGS. 10A, 10B, 11A, and 11B is a modified example of the example illustrated in FIGS. 8A, 8B, 9A, and 9B, and the selection operation is performed by using two fingers of the user's right hand 802, which is different from the example illustrated in FIGS. 8A, 8B, 9A, and 9B. Thus, hereinafter, features that are different from those illustrated in FIGS. 8A, 8B, 9A, and 9B will be primarily focused, and descriptions of features that are common to the examples illustrated in FIGS. 8A, 8B, 9A, and 9B will be omitted here.

For example, in FIG. 10B, the object detection areas detected by the selection operation are object detection areas 311 and 312 in a case where the selection operation illustrated in FIG. 10A is performed, and an ellipse corresponding to the object detection areas 311 and 312 are denoted by dotted lines. The object detection area 312 is the same as the object detection area 312 illustrated in FIG. 3A, and thus the description thereof will be omitted here.

As described above, in a case where a plurality of objects are detected on the display panel 260, as described above, the selection mode is determined based on the added value of the detection areas (the area of the object detection areas 311 and 312) of the plurality of detected objects. For example, in a case where the multiple selection mode is determined by the selection mode determining unit 420, one or a plurality of operation markers are selected based on the object detection information corresponding to the object detection areas 311 and 312. For example, at least parts of the operation markers C0, C1, C5, and C6 are included in the selection area 322 that is calculated based on the object detection information corresponding to the object detection area 312. Accordingly, the operation markers C0, C1, C5, and C6 are selected together with the operation markers C13, C14, C18, and C19 corresponding to the object detection area 311. The example of the display for a case where the above-described markers are selected is illustrated in FIG. 11A.

For example, in a case where the reproduction directing button 263 is pressed down by the user in the selected state illustrated in FIG. 11A, as illustrated in FIG. 11B, contents corresponding to eight operation markers that are in the selected state are sequentially reproduced.

As described above, even in a case where a plurality of operation markers disposed to be relatively spaced apart are selected, the operation markers can be simultaneously selected by only performing one selection operation by using two fingers. Accordingly, a process for reproducing a plurality of contents can be started in a speedy manner.

In a case where the single selection mode is selected by the selection mode detecting unit 420 in the state illustrated in FIG. 10B, one operation marker is selected based on the object detection information corresponding to the object detection areas 311 and 312. For example, one operation marker C13 located in the position of the center coordinates (X1, Y1) that is included in the object detection information corresponding to the object detection area 311 having a larger area is selected out of the object detection areas 311 and 312.

Figure 12A:
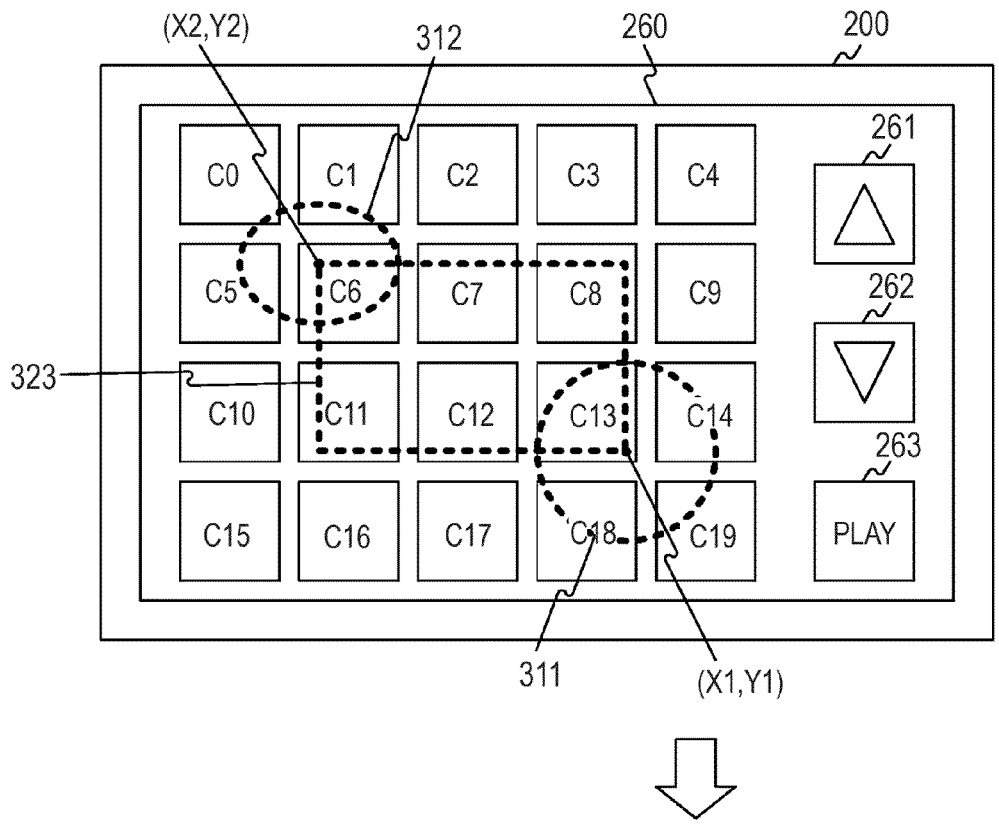
FIGS. 12A and 12B are diagrams showing examples of an operation method and a display in a case where a selection operation is performed for a plurality of operation markers displayed on the display panel according to the first embodiment of the present invention.
Figure 12B:
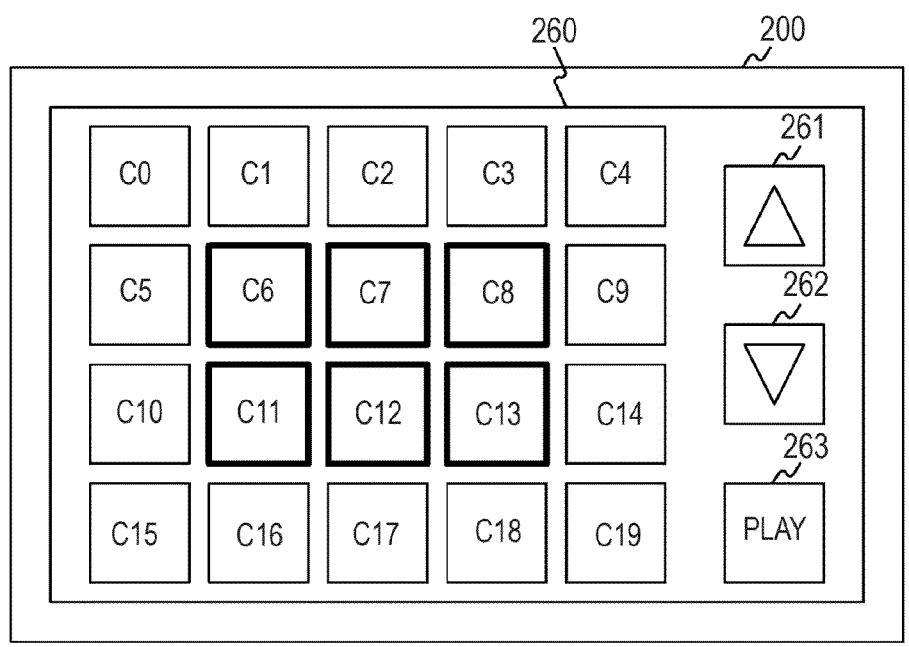
Figure 13A:
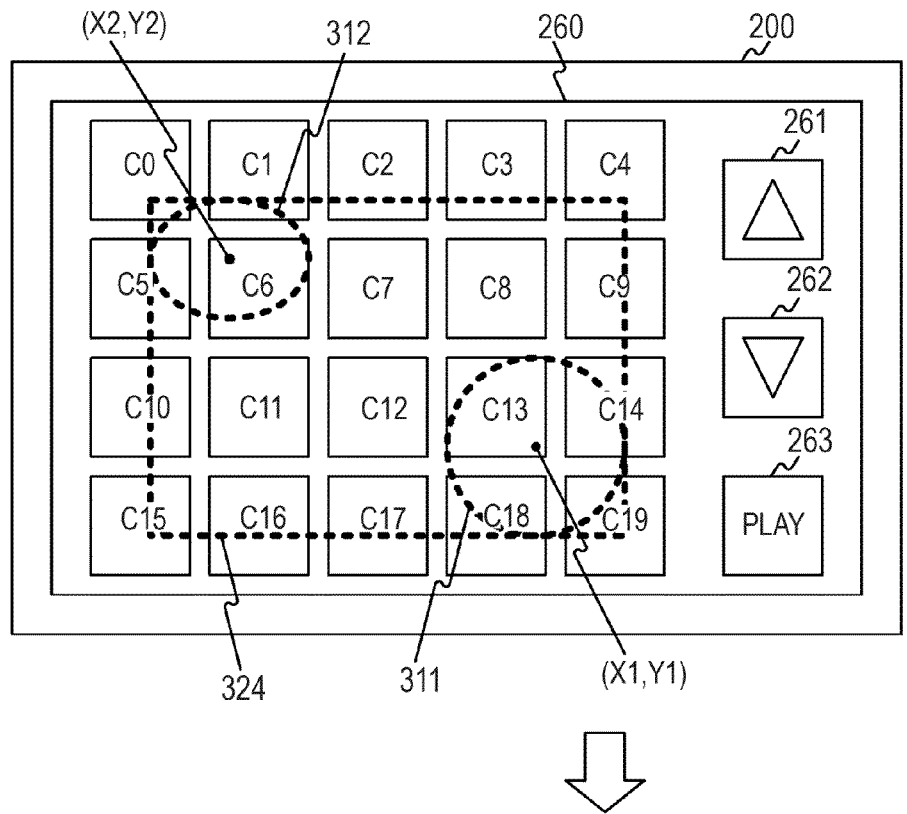
FIGS. 13A and 13B are diagrams showing examples of an operation method and a display in a case where a selection operation is performed for a plurality of operation markers displayed on the display panel according to the first embodiment of the present invention.
Figure 13B:
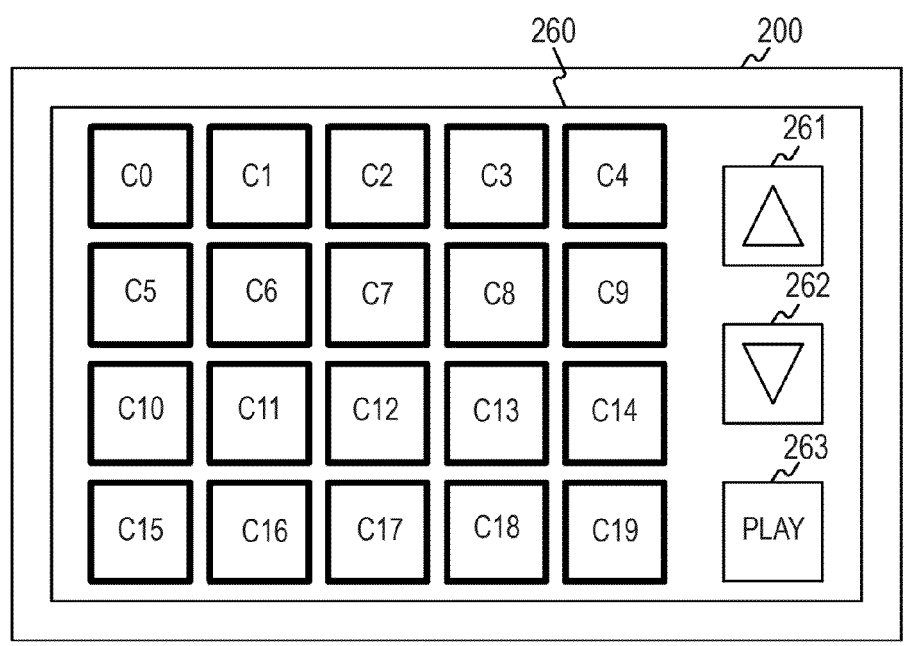

FIGS. 12A, 12B, 13A, and 13B are diagrams showing examples of an operation method and a display in a case where a selection operation is performed for a plurality of operation markers displayed on the display panel 260 according to the first embodiment of the present invention. The examples illustrated in FIGS. 12A, 12B, 13A, and 13B are modified examples of the example illustrated in FIGS. 10A, 10B, 11A, and 11B, and the method of calculating the selection area is different from that illustrated in FIGS. 10A, 10B, 11A and 11B. FIGS. 12A and 12B illustrate an example in which the selection area is calculated in the same manner as in the example illustrated in FIG. 7A. In addition, FIGS. 13A and 13B illustrate an example in which the selection area is calculated in the same manner as in the example illustrated in FIG. 7B. Hereinafter, features that are different from those illustrated in FIGS. 7A, 7B, 10A, 10B, 11A, and 11B will be primarily focused, and descriptions of features that are common to the examples illustrated in FIGS. 7A, 7B, 10A, 10B, 11A, and 11B will be omitted.

FIGS. 12A and 12B illustrate a transition in a display screen displayed on the display panel 260 in a case where the selection area is calculated in the same manner as illustrated in FIG. 7A by performing the selection operation illustrated in FIG. 10A. The display screen illustrated in FIG. 12A corresponds to the display screen illustrated in FIG. 10B, and the display screen illustrated in FIG. 12B corresponds to the display screen illustrated in FIG. 11A. Based on the selection area 323 calculated as described above, the operation markers C6 to C8 and C11 to C13 are selected.

FIGS. 13A and 13B illustrate a transition in a display screen displayed on the display panel 260 in a case where the selection area is calculated in the same manner as illustrated in FIG. 7B by performing the selection operation illustrated in FIG. 10A. The display screen illustrated in FIG. 13A corresponds to the display screen illustrated in FIG. 10B, and the display screen illustrated in FIG. 13B corresponds to the display screen illustrated in FIG. 11A. Based on the selection area 324 calculated as described above, all the operation markers C0 to C19 are selected.

As described above, for example, by changing the method of calculating the selection area, an operation for selecting a plurality of operation markers corresponding to a user's taste can be performed in an easy manner.

Figure 14A:
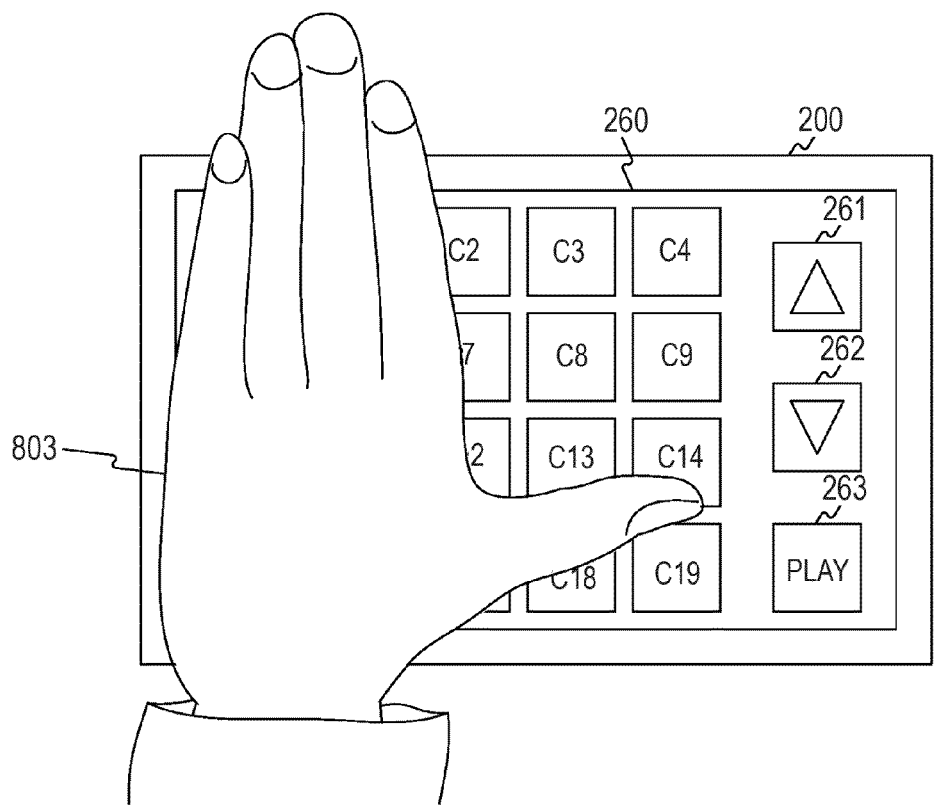
FIGS. 14A and 14B are diagrams showing an example of an operation method and a display for a case where an operation for selecting a plurality of operation markers displayed on the display panel according to the first embodiment of the present invention.
Figure 14B:
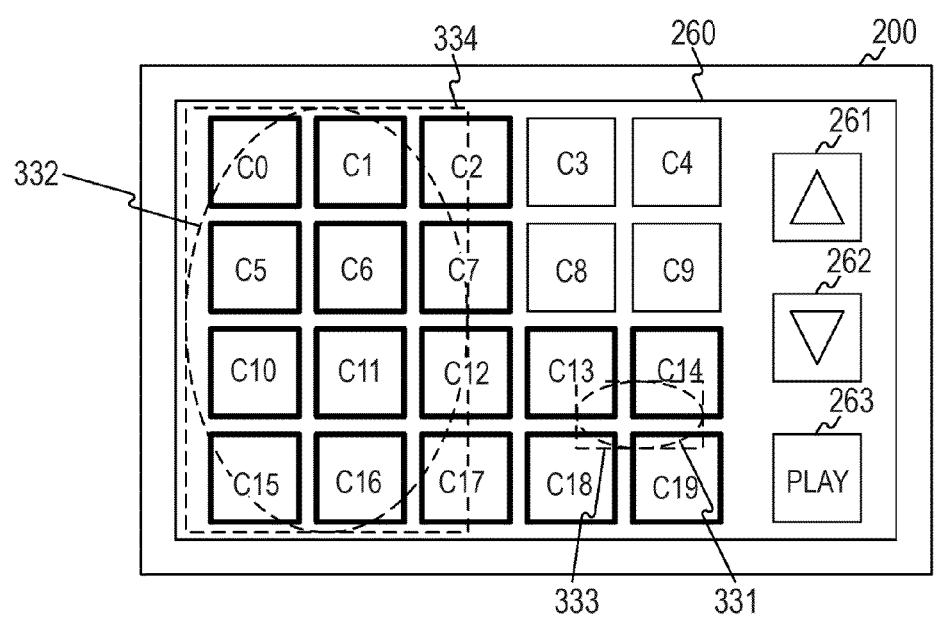

FIGS. 14A and 14B are diagrams showing an example of an operation method and a display for a case where a selection operation is performed for a plurality of operation markers displayed on the display panel 260 according to the first embodiment of the present invention. The example illustrated in FIGS. 14A and 14B is the same as the examples illustrated in FIGS. 8A to 11B except that the selection operation is performed by using the user's entire palm instead of the finger. In this example, a case where the operation markers C0 to C2, C5 to C7, and C10 to C19 are selected by performing one selection operation is illustrated.

As illustrated in FIG. 14A, the user brings the entire palm of the left hand 803 into contact with (or in proximity to) display portions of the operation markers C0 to C2, C5 to C7, and C10 to C12, and C15 to C17 on the display panel 260. Simultaneously with the contact operation, the user brings the thumb of the left hand 803 into contact with (or in proximity to) the display portions of the operation markers C13, C14, C18, and C19 on the display panel 260. In other words, the user brings the entire palm and the thumb of the left hand 803 into contact with (in proximity to) the display surface with a portion of the left hand 803 that is located near the root of the thumb of the left hand 803 being separated from the display surface of the display panel 260 so as not to be detected.

For example, in FIG. 14B, in a case where the selection operation illustrated in FIG. 14A is performed, the object detection areas detected by the selection operation are object detection areas 331 and 332, and an ellipse corresponding to the object detection areas 331 and 332 are denoted by dotted lines. In addition, the selection areas calculated based on the object detection areas 331 and 332 are selection areas 333 and 334, and a rectangle corresponding to the selection areas 333 and 334 are denoted by dotted lines. By performing the selection operation, the operation markers C0 to C2, C5 to C7, and C10 to C19 are selected. Then, as illustrated in FIG. 14B, the operation markers C0 to C2, C5 to C7, and C10 to C19 are in the selected state.

As described above, for example, even in a case where the operation markers are selected in the form of "L" in a relatively broad range, the operation markers can be selected in an easy manner by performing one operation by using a palm, a thumb, or the like.

Example of Operation of Imaging Device

Next, the operation of the imaging device 100 according to the first embodiment of the present invention will be described with reference to the drawings.

Figure 15:
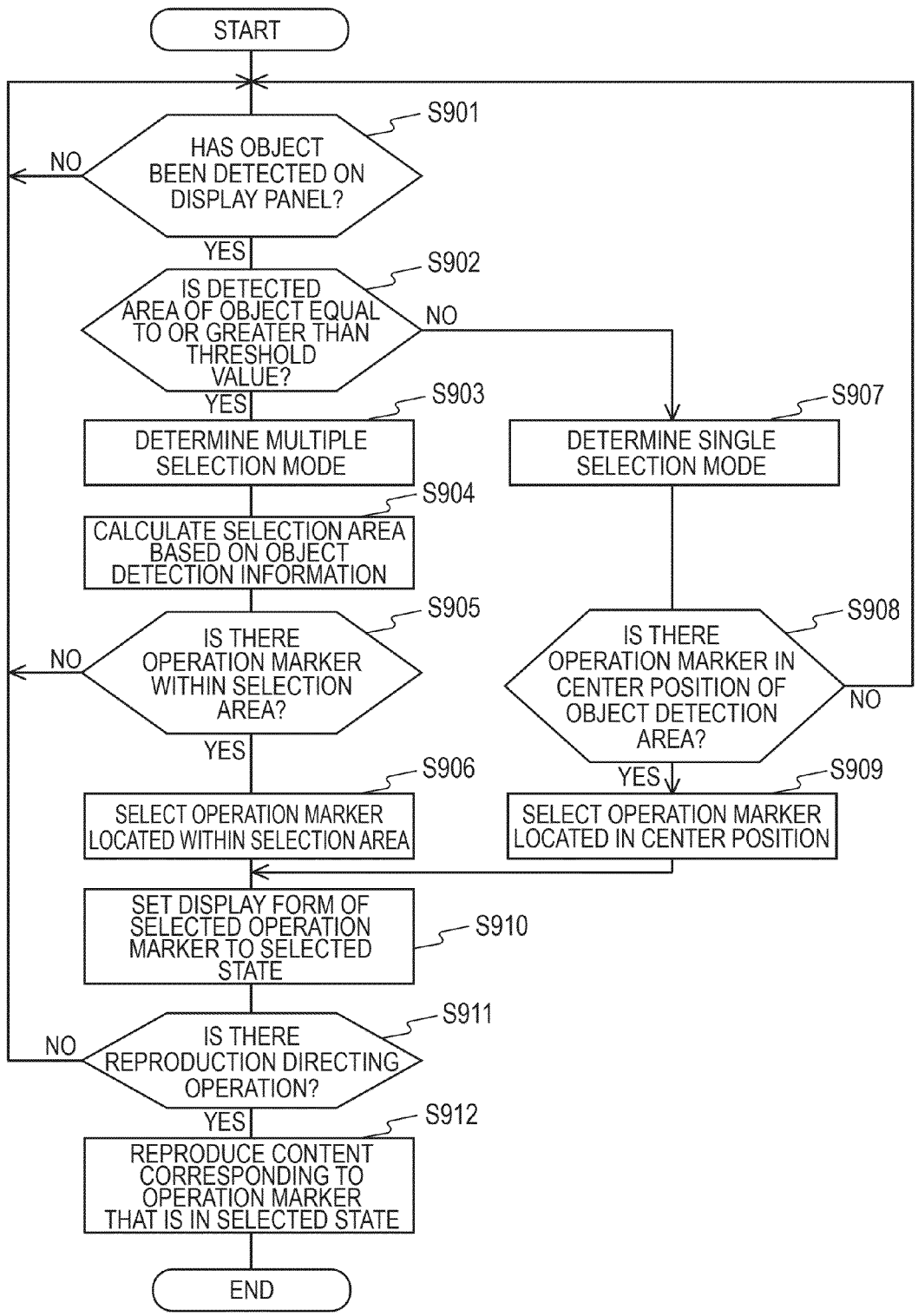
FIG. 15 is a flowchart showing the procedure of an operation marker selecting process performed by the imaging device according to the first embodiment of the present invention.

FIG. 15 is a flowchart showing the procedure of an operation marker selecting process performed by the imaging device 100 according to the first embodiment of the present invention. In this example, in the case of a content reproduction standby state, a case where the operation marker selecting process is performed in the state in which a plurality of operation markers corresponding to contents to be reproduced is displayed on the contents selection screen will be described as an example.

First, it is determined whether an object in proximity to or brought into contact with the display surface of the display panel 260 is detected by the object detecting section 411 (Step S901). In addition, Step S901 is an example of a detection process according to an embodiment of the present invention. Then, in a case where any object in proximity to or brought into contact with the display surface of the display panel 260 is not detected (Step S901), the process for detecting an object that is in proximity to or brought into contact with the display surface of the display panel 260 is repeated. On the other hand, in a case where an object that is in proximity to or brought into contact with the display surface of the display panel 260 is detected (Step S901), the selection mode determining unit 420 determines whether the detection area of the detected object is equal to or greater than the threshold value stored in the threshold storing unit 430 (Step S902). When the detection area of the detected object is equal to or greater than the threshold value (Step S902), the selection mode determining unit 420 determines the multiple selection mode as the selection mode (Step S903).

Subsequently, the selection unit 450 calculates a selection area based on the object detection information that is generated for the detected object (Step S904). Then, the selection unit 450 determines whether an operation marker is located within the calculated selection area (Step S905). When there is an operation marker within the calculated selection area (Step S905), the selection unit 450 selects the operation marker located within the calculated selection area and updates the stored contents of the selection information storing unit 460 based on the selection (Step S906). On the other hand, when any operation marker is not located within the calculated selection area (Step S905), the process returns back to Step S901.

On the other hand, when the detection area of the detected object is less than the threshold value (Step S902), the selection mode determining unit 420 determines the single selection mode as the selection mode (Step S907). Here, Steps S902, S903, and S907 are an example of a selection mode determining process according to the embodiment of the present invention. Subsequently, the selection unit 450 determines whether an operation marker is located in the position of the center coordinates of the object detection area that is included in the object detection information generated for the detected object (Step S908). When the operation marker is located in the position of the center coordinates (Step S908), the selection unit 450 selects the operation marker located in the position of the center coordinates and updates the stored contents of the selection information storing unit 460 based on the selection (Step S909), and the process proceeds to Step S910. On the other hand, when any operation marker is not located in the position of the center coordinates (Step S908), the process returns back to Step S901. Here, Steps S904 to S906, S908, and S909 are an example of a selection process according to the embodiment of the present invention.

Subsequently, the display control unit 470 changes the display form of the operation marker selected by the selection unit 450 to the selected state (Step S910). Accordingly, the display form of the selected operation marker out of the operation markers displayed on the display panel 260 is changed so as to be displayed. Step S910 is an example of the display control process according to the embodiment of the present invention.

Subsequently, it is determined whether a reproduction directing operation is performed (Step S911). When the reproduction directing operation is not performed (Step S911), the process returns back to Step S901. On the other hand, when the reproduction directing operation is performed (Step S911), the display control unit 470 performs a reproduction process for a content corresponding to the operation marker that is in the selected state at the time when the reproduction directing operation is performed (Step S912). In other words, the display control unit 470 extracts a content corresponding to the operation marker that is in the selected state at the time when the reproduction directing operation is performed from the content memory unit 400 and displays the extracted content in the display section 412.

Figure 16:
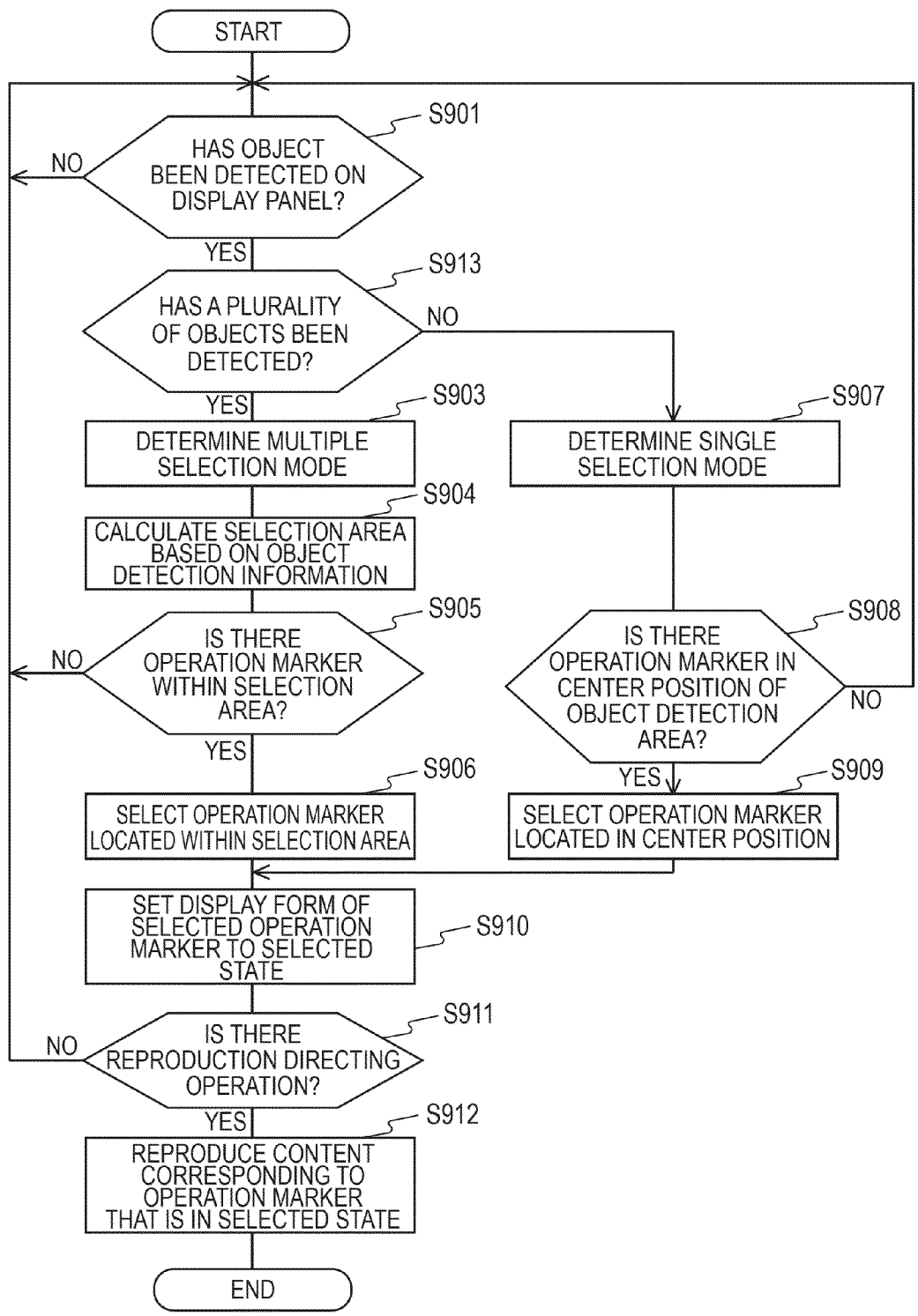
FIG. 16 is a flowchart representing the procedure of an operation marker selecting process performed by the imaging device according to the first embodiment of the present invention.

FIG. 16 is a flowchart representing the procedure of an operation marker selecting process performed by the imaging device 100 according to the first embodiment of the present invention. This example is a modified example of the operation marker selecting process represented in FIG. 15 and is an example in which the selection mode is determined based on the number of the detected objects. Thus, a same reference sign is assigned to each portion that is the same as that of the procedure represented in FIG. 15, and the description thereof is omitted here.

In a case where an object that is in proximity to or brought into contact with the display surface of the display panel 260 (Step S901) is detected, the selection mode determining unit 420 determines whether a plurality of objects (for example, two fingers) are detected (Step S913). When the plurality of objects are detected (Step S913), the selection mode determining unit 420 determines the multiple selection mode as the selection mode (Step S903). On the other hand, when a plurality of objects are not detected (in other words, when only one object is detected) (Step S913), the selection mode determining unit 420 determines the single selection mode as the selection mode (Step S907). Here, Steps S913, S903, and S907 are an example of a selection mode determining process according to the embodiment of the present invention.

First Modified Example of Selection of Operation Marker

In the examples illustrated in FIGS. 8A to 14B, cases where a selection operation for selecting an operation marker is performed on one screen displayed in the contents selection area 270 of the display panel 260 are represented. However, for example, as illustrated in FIGS. 5A and 5B, there are cases where operation markers to be selected are located on a plurality of screens. Hereinafter, in such a case, a method of selecting operation markers located on a plurality of screens will be described in detail with reference to the drawings.

Figure 17A:
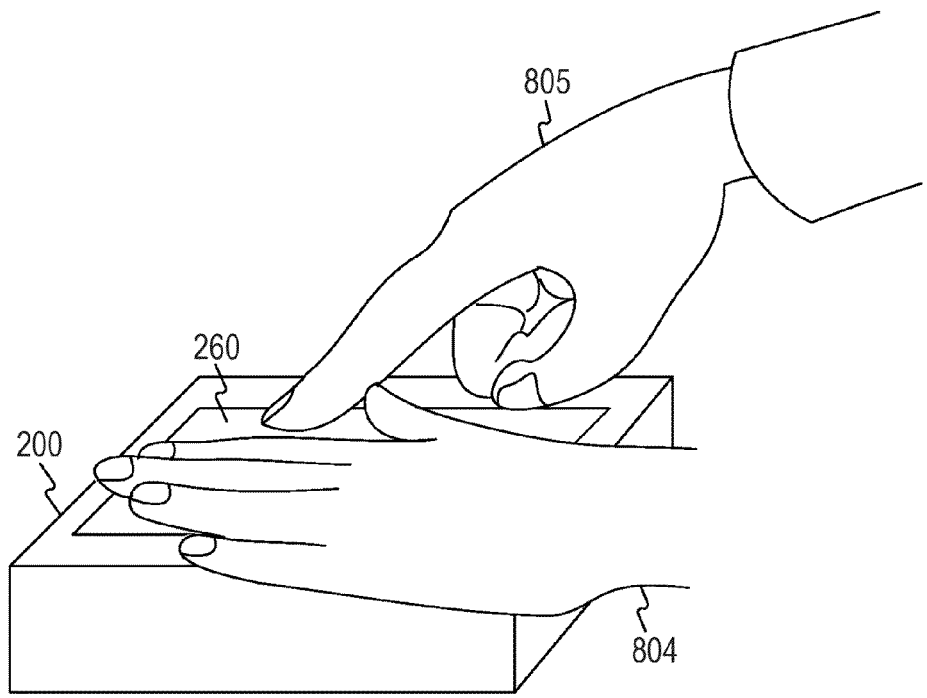
FIGS. 17A and 17B are diagrams representing examples of an operation method and a display in a case where a selection operation is performed for a plurality of operation markers displayed on the display panel according to the first embodiment of the present invention.
Figure 17B:
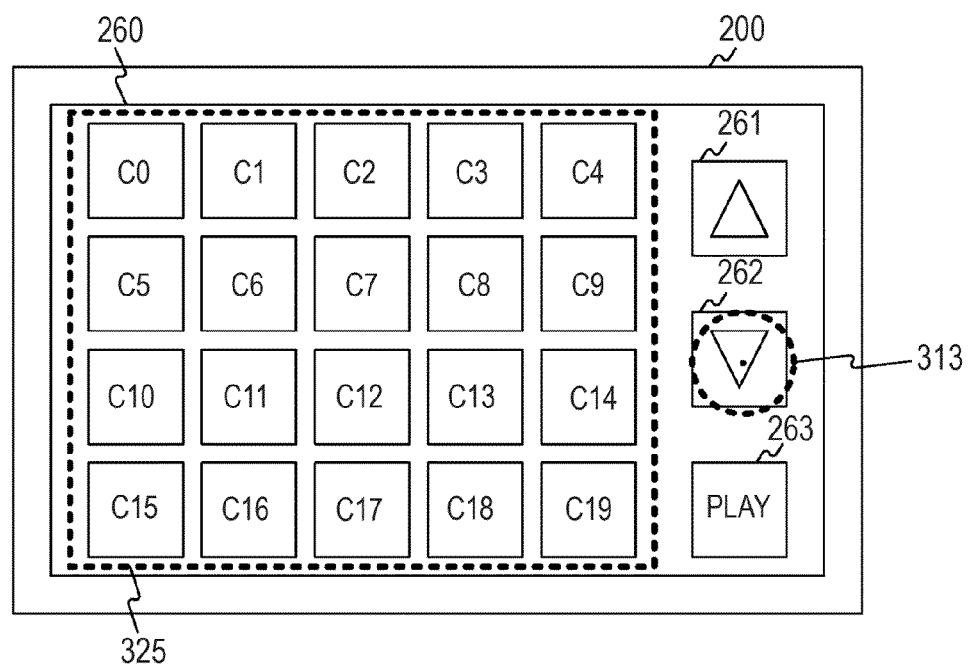
Figure 18A:
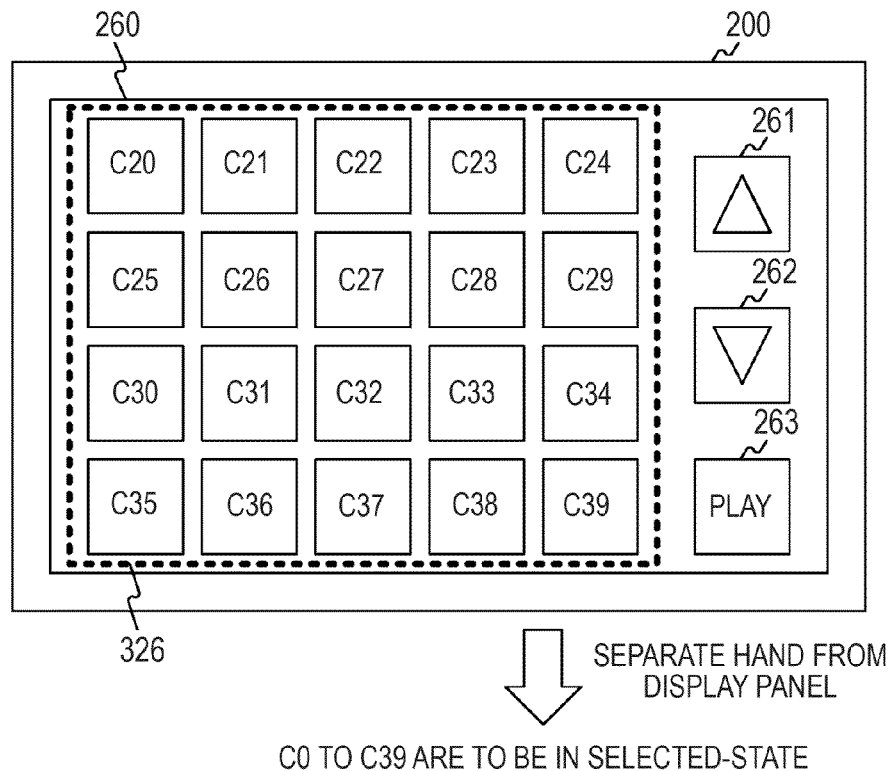
FIGS. 18A and 18B are diagrams representing examples of an operation method and a display in a case where a selection operation is performed for a plurality of operation markers displayed on the display panel according to the first embodiment of the present invention.
Figure 18B:
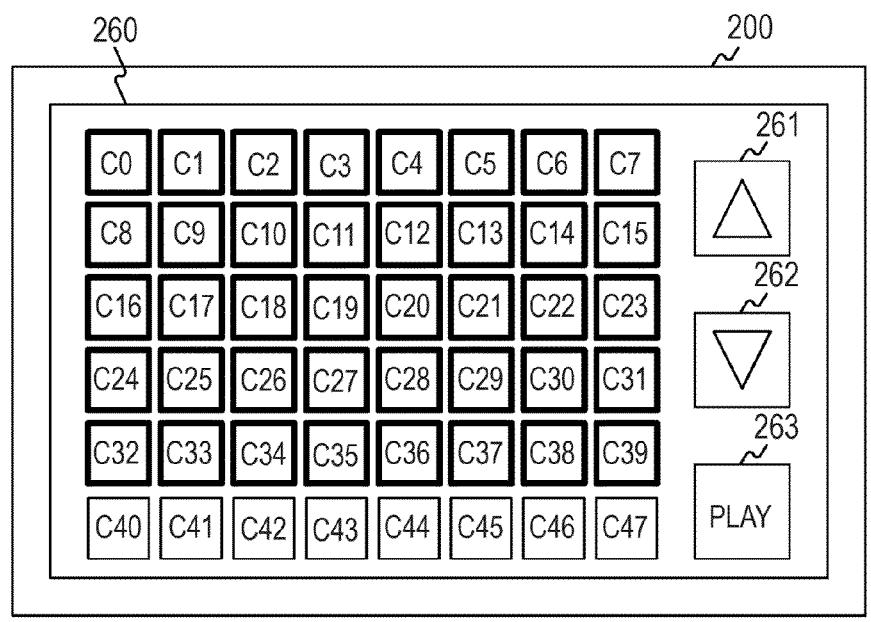

FIGS. 17A, 17B, 18A, and 18B are diagrams representing examples of an operation method and a display in a case where a selection operation is performed for a plurality of operation markers displayed on the display panel 260 according to the first embodiment of the present invention. FIG. 17A illustrates an example of a selection operation performed by a user for the plurality of operation markers displayed on the display panel 260. FIGS. 17B and 18A represent a transition in the display screen displayed on the display panel 260 in accordance with the selection operation illustrated in FIG. 17A. FIG. 18B illustrates a modified example of the display screen displayed on the display panel 260 in accordance with the selection operation illustrated in FIG. 17A. The examples illustrated in FIGS. 17A, 17B, 18A, and 18B are modified examples of FIGS. 8A to 14B, which are different in that a selection operation for selecting operation markers located in the plurality of screens is performed. Thus, hereinafter, features that are different from those illustrated in FIGS. 8A to 14B will be primarily focused, and the features that are common to the features of FIGS. 8A to 14B will be omitted.

FIG. 17A illustrates a case where a user performs a selection operation by bringing the entire palm of the left hand 804 into contact with (in proximity to) the contents selection area 270 (represented in FIGS. 5A and 5B) of the display panel 260. In addition, FIG. 17A illustrates a case where the user presses down the down button 262 by using one finger of the user's right hand 805 after the selection operation. In the example illustrated in FIG. 17A, it is assumed that the selection operation of selecting all the operation markers C0 to C19 included in the contents selection area 270 is performed by using the entire palm of the left hand 804.

For example, in FIG. 17B, in a case where the selection operation illustrated in FIG. 17A is performed, the selection area calculated based on object detection information generated by the selection operation is a selection area 325, and a rectangle corresponding to the selection area 325 is denoted by dotted lines. In addition, in FIG. 17B, the object detection area detected by pressing down the down button 262 performed by using a finger of the right hand 805 is an object detection area 313, and an ellipse corresponding to the object detection area 313 is denoted by a dotted line.

As illustrated in FIG. 17B, all the operation markers C0 to C19 are included in the selection area 325 that is calculated in accordance with the selection operation performed by using the entire palm of the left hand 804. Accordingly, the selection unit 450 selects the operation markers C0 to C19 and stores selection information on the selected operation markers C0 to C19 in the selection information storing unit 460. When the down button 262 is pressed down by using a finger of the right hand 805 as illustrated in FIG. 17B after the selection operation, a scroll process for scrolling the operation markers included in the contents selection area 270 is performed by the display control unit 470. For example, as illustrated in FIG. 5B, the scroll process is performed in units of one page for each operation of pressing down the down button 262.

FIG. 18A illustrates an example of the display after the scroll process is performed in units of one page from the display state illustrated in FIG. 17B. In addition, the display screen illustrated in FIG. 18A is the same as that illustrated in FIG. 5B. After the scroll process is performed, it is assumed that the selection operation illustrated in FIG. 17A is continuously performed. In other word, before and after the scroll process, the state in which the entire palm of the left hand 804 is brought into contact with (in proximity to) the contents selection area 270 of the display panel 260 is assumed to be continued.

As illustrated in FIG. 18A, all the operation markers C20 to C39 are included in the selection area 326 that is calculated in accordance with the selection operation that is continuously performed by using the entire palm of the left hand 804. Accordingly, the selection unit 450 selects the operation markers C20 to C39. In such a case, the selection unit 450 acquires the stored contents of the selection information storing unit 460 before the scroll process and selects all the operation markers C20 to C39 that are new selection targets and the operation markers C0 to C19 corresponding to the stored contents before the scroll process. Then, the selection unit 450 stores the selection information on the selected operation markers C0 to C39 in the selection information storing unit 460. As described above, in a case where the scroll process is performed after the selection operation for selecting the operation markers is performed, and the selection operation is performed for the display screen after the scroll process, all the operation markers selected by the selection operation and the operation markers that have been already in the selected state are allowed to be in the selected state.

As described above, in a case where the selection operation is performed for a plurality of screens, for example, the operations of pressing down the down button 262 by using the right hand 805 is sequentially performed in the state in which the entire palm of the left hand 804 is put on the display panel 260. Alternatively, it may be configured that the left hand 804 is separated from the display panel 260 each time when the down button 262 is pressed down, and the operation marker included in the contents selection area 270 is checked by the user. Then, after the checking operation, by performing a selection operation by bringing the entire palm of the left hand 804 into contact with (in proximity to) the display panel 260 again, the selection operation for the plurality of screens may be performed.

For example, as illustrated in FIGS. 17B and 18A, all the operation markers corresponding to two pages are selected out of the operation markers displayed in the contents selection area 270. In a case where the left hand 804 is separated from the display panel 260 after the selection operation, all the operation markers C0 to C39 corresponding to two pages are in the selected state. In addition, even in a case where the scroll operation and the selection operation are performed again after the state illustrated in FIG. 18A is formed, the operation markers associated with the selection operation are sequentially added and selected. In FIG. 17A, an example in which the selection operation is performed by using both hands is illustrated. However, for example, the selection operation may be performed by using one hand by pressing down the down button 262 by using the thumb of the left hand 804.

As described above, in a case where the operation markers included in a plurality of screens are in the selected state, the selected states can be perceived in an easy manner by displaying a list of all the selected states. For example, as illustrated in FIG. 18B, a list of operation markers that are in the selected state may be configured to be displayed when a predetermined time elapses after the selection operation for the plurality of screens is completed or after a predetermined operation (for example, a reproduction directing operation) is performed. For example, each operation marker is reduced in size, and the reduced operation markers are displayed. In the example illustrated in FIG. 18B, an example of the display for a case where the display forms of all the operation markers C0 to C39 corresponding to two pages, which are in the selected state in accordance with the pressing-down operations illustrated in FIGS. 17B and 18A, are changed, and the display forms of other operation markers C40 to C47 are not changed is illustrated.

As described above, for example, by displaying a list of the selected operation markers after completion of the selection operation for the plurality of screens, the selection states of a plurality of contents' can be recognized in an easy manner.

Figure 19A:
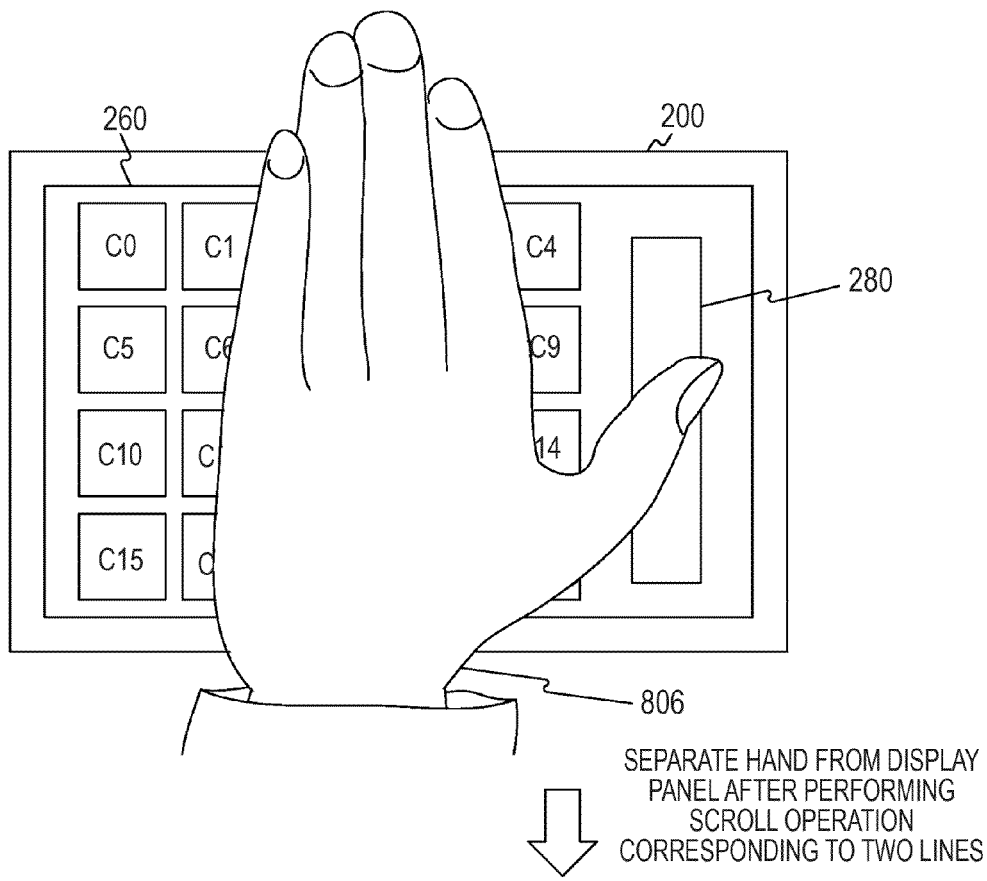
FIGS. 19A and 19B are diagrams illustrating examples of an operation method and a display in a case where a selection operation is performed for a plurality of operation markers displayed on the display panel according to the first embodiment of the present invention.
Figure 19B:
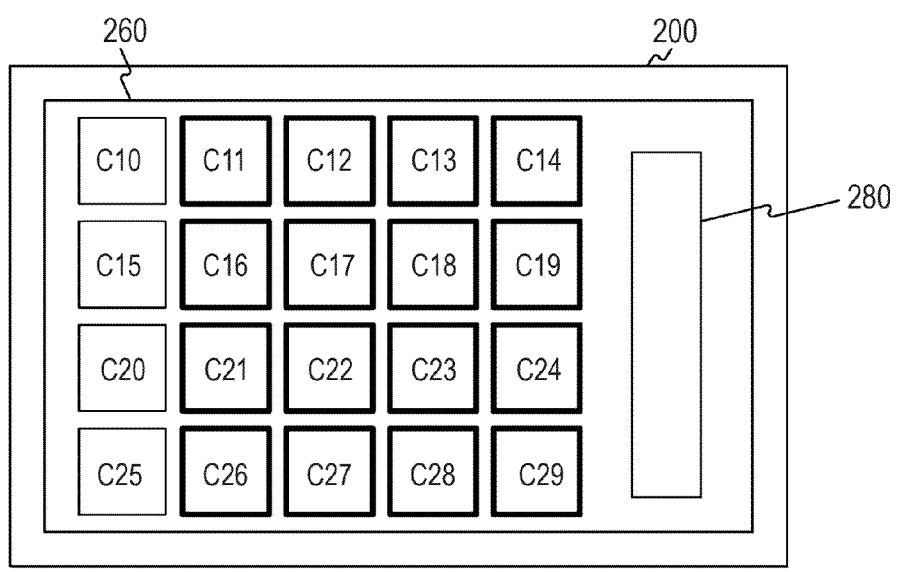

FIGS. 19A and 19B are diagrams illustrating examples of an operation method and a display in a case where a selection operation is performed for a plurality of operation markers displayed on the display panel 260 according to the first embodiment of the present invention. FIG. 19A illustrates an example of the selection operation that is performed by a user for the plurality of operation markers displayed on the display panel 260. FIG. 19B illustrates an example of the display screen displayed on the display panel 260 in accordance with the selection operation illustrated in FIG. 19A. The example illustrated in FIGS. 19A and 19B is a modified example of the example illustrated in FIGS. 17A to 18B, and a scroll operation is performed by using a scroll operation area 280 instead of the up and down buttons, which is different from the example illustrated in FIGS. 17A to 18B. Thus, hereinafter, features that are different from those illustrated in FIGS. 17A to 18B will be primarily focused, and descriptions of features that are common to the example illustrated in FIGS. 17A to 18B will be omitted.

FIG. 19A illustrates a case where a user performs a selection operation by bringing the entire palm of the left hand 806 into contact with (in proximity to) a partial area of the contents selection area 270 (represented in FIGS. 5A and 5B) of the display panel 260. In addition, FIG. 19A illustrates a case where the user performs a scroll operation for the scroll operation area 280 by using the thumb of the left hand 806. In the example illustrated in FIG. 19A, it is assumed that the selection operation of selecting the operation markers C1 to C4, C6 to C9, C11 to C14, and C16 to C19 is performed by using the entire palm of the left hand 806.

After this selection operation, as illustrated in FIG. 19A, a scroll operation is performed by moving the thumb of the left hand 806 on the scroll operation area 280 in the state in which the thumb of the left hand 806 is brought into contact with (in proximity to) the scroll operation area 280. When this scroll operation is performed, a scroll process for scrolling the operation markers included in the contents selection area 270 is performed by the display control unit 470. For example, the scroll process for the operation markers is performed in accordance with the amount of movement of the thumb on the scroll operation area 280.

FIG. 19B illustrates an example of the display after a scroll operation corresponding to two lines is performed in the state of the display state illustrated in FIG. 19A. Before and after the scroll operation, the state in which the palm of the left hand 806 is brought into contact with (or in proximity to) the display panel 260 is assumed to be continued. As illustrated in FIG. 19B, the operation markers C1 to C4, C6 to C9, C11 to C14, C16 to C19, C21 to C24, C26 to C29 that are included in the selection area before or after the scroll operation are selected. In this example, a case where the scroll process is performed in accordance with the amount of movement of an object within the scroll operation area 280 is illustrated. However, the scroll process may be configured to be performed in accordance with the amount of movement of an object in another area. For example, it is detected whether the center coordinates of at least one object is moved by a predetermined distance or more in a predetermined time in any arbitrary area of the display panel 260, and the scroll process may be performed based on the result of detection. In other words, when an object having center coordinates moved by a predetermined distance or more in a predetermined time in any arbitrary area of the display panel 260 is detected, the scroll process may be performed in accordance with the moving direction and the distance of the movement. In such a case, for example, a user can perform a selection operation and a scroll operation in a natural posture of the body.

Example of Operation of Imaging Device

FIG. 20 is a flowchart showing the procedure of an operation marker selecting process performed by the imaging device 100 according to the first embodiment of the present invention. In this example, a case where the operation maker selecting process for selecting a plurality of operation markers included in a plurality of screens is performed by scrolling the operation markers in units of pages by using the up button 261 or the down button 262 will be described as an example. This example is a modified example of the operation marker selecting process shown in FIG. 15. Thus, a same reference sign is assigned to a portion that is the same as that of the procedure shown in FIG. 15, and the description thereof is omitted here.

When an object that is brought into contact with or in proximity to the display surface of the display panel 260 is detected (Step S901), it is determined whether an object having the center coordinates of the object detection area of the detected object that is located in the position of the up button 261 or the down button 262 is detected (Step S921). In a case where the object having the center coordinates to be in the position of the up button or the down button is detected (Step S921), the display control unit 470 performs the scroll process in units of pages in accordance with the up button or the down button corresponding to the position of the center coordinates (Step S922). For example, in a case where an object having the center coordinates of the object detection area to be the position of the up button 261 is detected, the display control unit 470 displays operation markers by scrolling the plurality of operation markers displayed on the contents selection area 270 in units of pages to the upper side. After this scroll process is performed (Step S922), the process returns back to Step S901.

On the other hand, in a case where an object having the center coordinates of the object detection area of the detected object to be the position of the up button 261 or the down button 262 is not detected (Step S921), the process proceeds to Step S902.

In addition, in a case where the operation marker is located within the calculated selection area (Step S905), the selection unit 450 selects operation markers located within the calculated selection area and acquires the stored contents of the selection information storing unit 460 (Step S906). In addition, in a case where the operation marker is located in the position of the center coordinates of the object detection area (Step S908), the selection unit 450 selects the operation marker located in the position of the center coordinates and acquires the stored contents of the selection information storing unit 460 (Step S909). Then, after the selection process for selecting the operation markers is completed (Steps S906 and S909), the selection unit 450 determines whether the operation marker that has been already in the selected state exists based on the stored contents of the selection information storing unit 460 (Step S923). In a case where the operation marker that has been already in the selected state exists (Step S923), the selection unit 450 has the operation marker that has been already in the selected state and the newly selected operation markers to be in the selected state and updates the stored contents of the selection information storing unit 460 based on the selection. Then, the display control unit 470 changes the display forms of all the operation markers selected by the selection unit 450 into the selected state (Step S924). The change in the display form is performed for the operation markers displayed on the display panel 260. In addition, the change in the display form is sequentially performed for the operation marker that is sequentially displayed in accordance with the scroll operation.

On the other hand, in a case where the operation marker that is in the selected state does not exist (Step S923), the selection unit 450 has the newly selected operation markers to be in the selected state and updates the stored contents of the selection information storing unit 460 based on the selection. Then, the display control unit 470 changes the display forms of the operation markers selected by the selection unit 450 into the selected state (Step S925).

Figure 21:
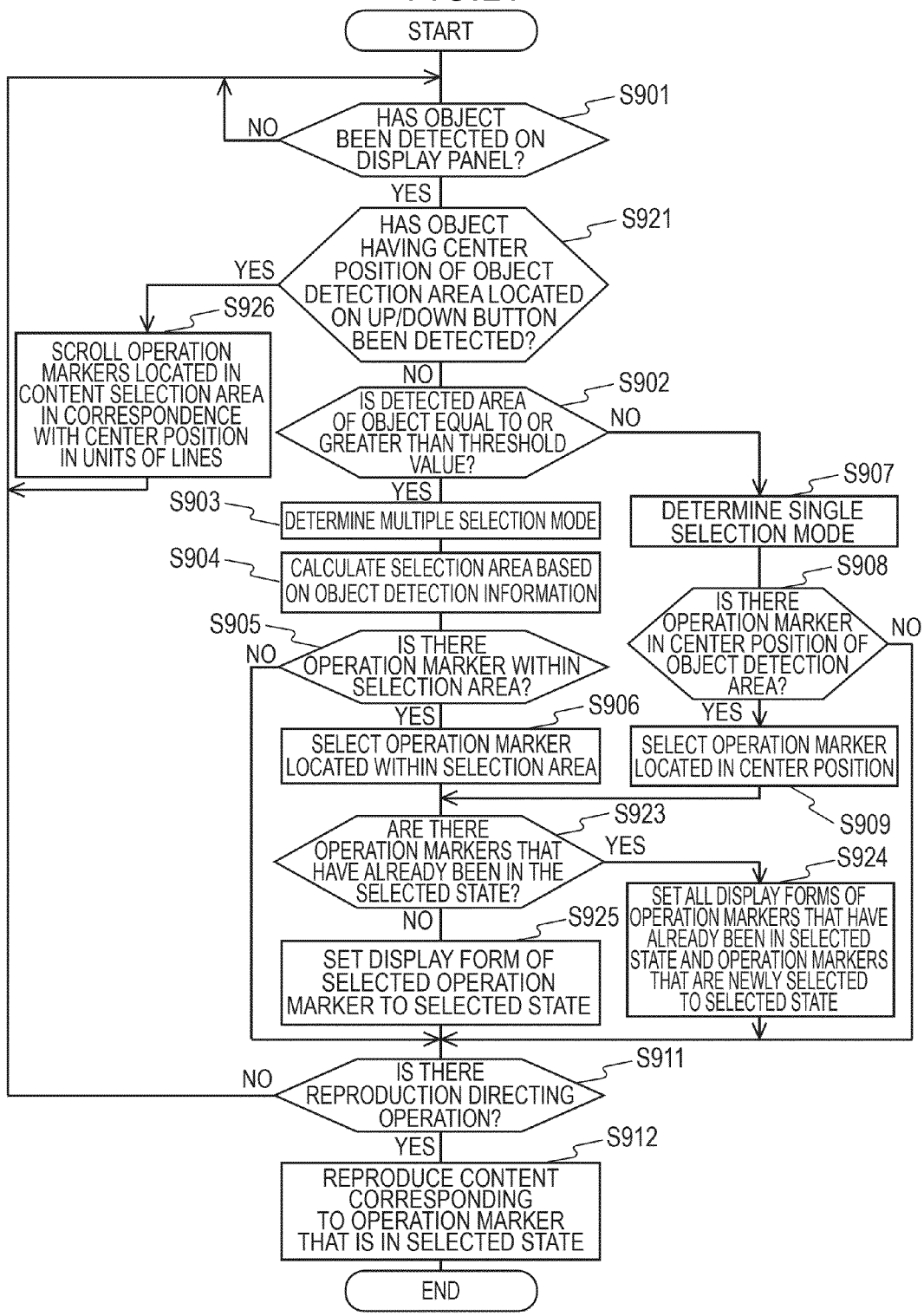
FIG. 21 is a flowchart showing the procedure of the operation marker selecting process performed by the imaging device according to the first embodiment of the present invention.

FIG. 21 is a flowchart showing the procedure of the operation marker selecting process performed by the imaging device 100 according to the first embodiment of the present invention. In this example, a case where the operation markers are scrolled in units of lines by using the up button 261 or the down button 262, and the operation marker selecting process for selecting a plurality of operation markers included in a plurality of screens is performed will be described as an example. This example is a modified example of the operation marker selecting process shown in FIG. 20. Thus, a same reference sign is assigned to a portion that is the same as that of the procedure shown in FIG. 20, and the description thereof is omitted here.

In a case where an object having the center coordinates of the object detection area of the detected object to be the position of the up button 261 or the down button 262 is detected (Step S921), the scroll process is performed in units of lines (Step S926). In other words, the display control unit 470 performs the scroll process in units of lines in accordance with the up button 261 or the down button 262 corresponding to the position of the center coordinates (Step S926). For example, in a case where an object having the center coordinates of the object detection area to be the position of the up button 261, the display control unit 470 displays operation markers by scrolling a plurality of operation markers displayed in the contents selection area 270 in units of lines to the upper side.

FIG. 22 is a flowchart showing the procedure of the operation marker selecting process performed by the imaging device 100 according to the first embodiment of the present invention. In this example, a case where the operation maker selecting process for selecting a plurality of operation markers included in a plurality of screens is performed by scrolling the operation markers in accordance with the amount of movement of the center coordinates of the object in an arbitrary area on the display panel 260 will be described as an example. This example is a modified example of the operation marker selecting process shown in FIG. 20. Thus, a same reference sign is assigned to a portion that is the same as that of the procedure shown in FIG. 20, and the description thereof is omitted here.

In a case where an object that is in proximity to or brought into contact with the display surface of the display panel 260 is detected (Step S901), it is determined whether the center coordinates of at least one object is moved by a predetermined distance in a predetermined time (Step S927). In a case where the center coordinates of at least one object is moved by a predetermined distance or more in a predetermined time (Step S927), the display control unit 470 performs the scroll process in accordance with the moving direction and the distance of the movement (Step S928). After this scroll process is performed (Step S928), the process proceeds to Step S902.

On the other hand, in a case where the center coordinates of all the objects are not moved by the predetermined distance or more in the predetermined time (Step S927), the process proceeds to Step S902.

Second Modified Example of Selection of Operation Marker

In the examples illustrated in FIGS. 17A to 19B, cases where a selection operation for selecting operation markers on a plurality of screens displayed in the contents selection area 270 is performed by using the up button, the down button, and the like are represented. However, for example, when the scroll operation and the selection operation for selecting the operation markers are performed by a same operation, the selection operation can be performed in a speedier manner. Hereinafter, another selection method for selecting the operation markers located on a plurality of screens will be described in detail with reference to the drawings.

Figure 23A:
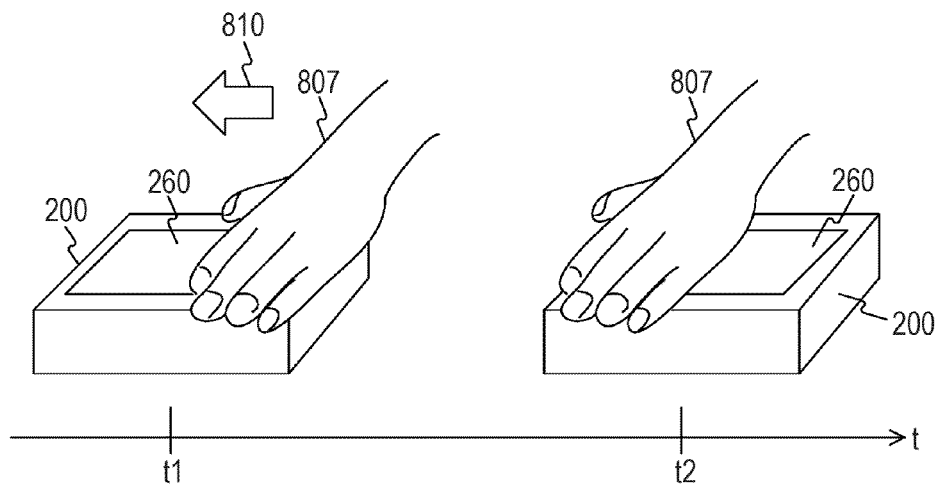
FIGS. 23A, 23B, and 23C are diagrams representing examples of an operation method and a display in a case where a selection operation is performed for a plurality of operation markers displayed on the display panel according to the first embodiment of the present invention.
Figure 23B:
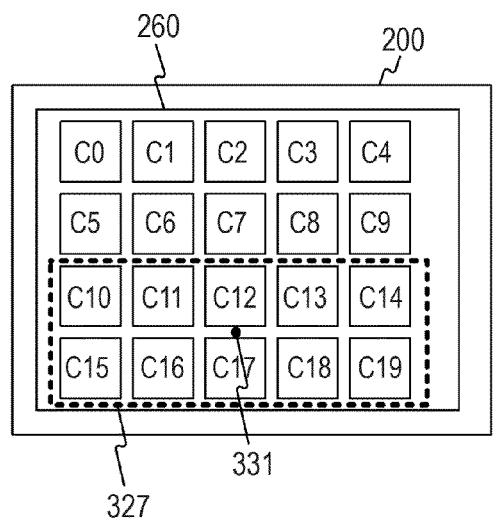
Figure 23C:
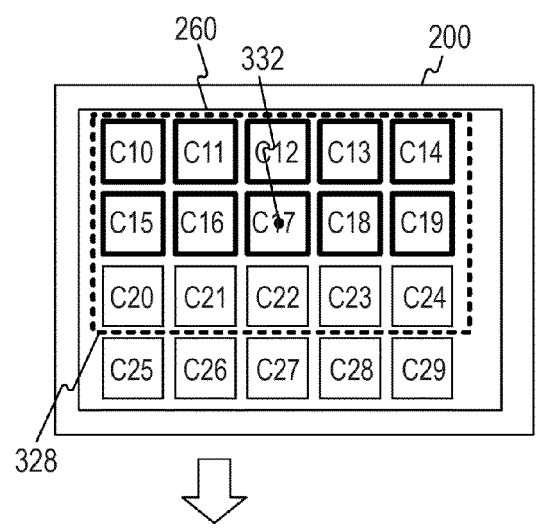

FIGS. 23A, 23B, and 23C are diagrams representing examples of an operation method and a display in a case where a selection operation is performed for a plurality of operation markers displayed on the display panel 260 according to the first embodiment of the present invention. FIG. 23A illustrates an example of a selection operation performed by a user for the plurality of operation markers displayed on the display panel 260. In particular, FIG. 23A represents a transition in a user operation performed from time t1 to time t2 on the time axis t. FIG. 23B illustrates an example of a display screen displayed on the display panel 260 right before a user's operation performed at time t1 shown in FIG. 23A. In addition, FIG. 23C illustrates an example of a display screen displayed on the display panel 260 right before a user's operation performed at time t2 shown in FIG. 23A. The example illustrated in FIGS. 23A to 23C is a modified example of the cases shown in FIGS. 17A to 19B. Thus, hereinafter, features that are different from those illustrated in FIGS. 17A to 19B will be primarily focused.

In this example, as shown in FIGS. 23B and 23C, only a plurality of operation markers is displayed on the display panel 260, and display of the up button 261, the down button 262, the reproduction directing button 263, and the like is omitted. In this example, a case where the operation markers displayed on the display panel 260 is scrolled in accordance with movement of the center coordinates of the selection area of the object detected on the display panel 260 is represented.

For example, at time t1, the left hand 807 is assumed to be disposed on the display panel 260 so as to select the operation markers C10 to C19 that are displayed on the display panel 260. In addition, in the state represented at time t1, a selection area 327 is calculated in accordance with a selection operation performed by using the left hand 807. As described above, in the state in which the left hand 807 is disposed, the left hand 807 moves on the display panel 260 in a direction denoted by an arrow 810. At time t2, the state after movement of the left hand 807 on the display panel 260 in the direction denoted by the arrow 810 is shown. In accordance with the movement, the center coordinates 331 of the selection area 327 calculated at time t1 are moved in the direction denoted by the arrow 810. Here, in the state shown at time t2, the left hand 807 is assumed to be disposed on the display panel 260 so as to select operation markers C10 to C24 that are displayed on the display panel 260. In addition, in the state shown at time t2, a selection area 328 is assumed to be calculated in accordance with the selection operation performed by using the left hand 807. In other words, the center coordinates 331 of the selection area 327 at time t1 represented in FIG. 23B are moved to the center coordinates 332 of the selection area 328 at time t2 represented in FIG. 23C in accordance with movement of the left hand 807. In accordance with the movement of the center coordinates of the selection area of the left hand 807, the operation markers displayed on the display panel 260 are scrolled. For example, the operation markers C0 to C19 shown in FIG. 23B are scrolled to the operation markers C10 to C29 shown in FIG. 23C.

As described above, by performing the selection operation and the movement operation for the display panel 260 by using the left hand 807, the operation markers C10 to C24 that are included in a plurality of screens can be selected in an easy manner. In other words, the selection process for operation markers and the scroll process for operation markers can be performed in an easy manner by one simple operation of moving the hand.

In this example, only a case where one scroll operation is performed is represented. However, similarly, this modified example may be applied to a case where the scroll operation is performed twice or more consecutively. In addition, in this example, a case where the scroll operation is performed with only a part of the display panel 260 being covered with the hand is described as an example. However, for example, in a case where a touch panel or the like that can detect the movement of a hand in the state in which the entire surface of display panel 260 is covered with the hand is used, this modified example may be applied to a case where the scroll operation is performed with the entire surface of the display panel 260 being covered with the hand.

Example of Operation of Imaging Device

Figure 24:
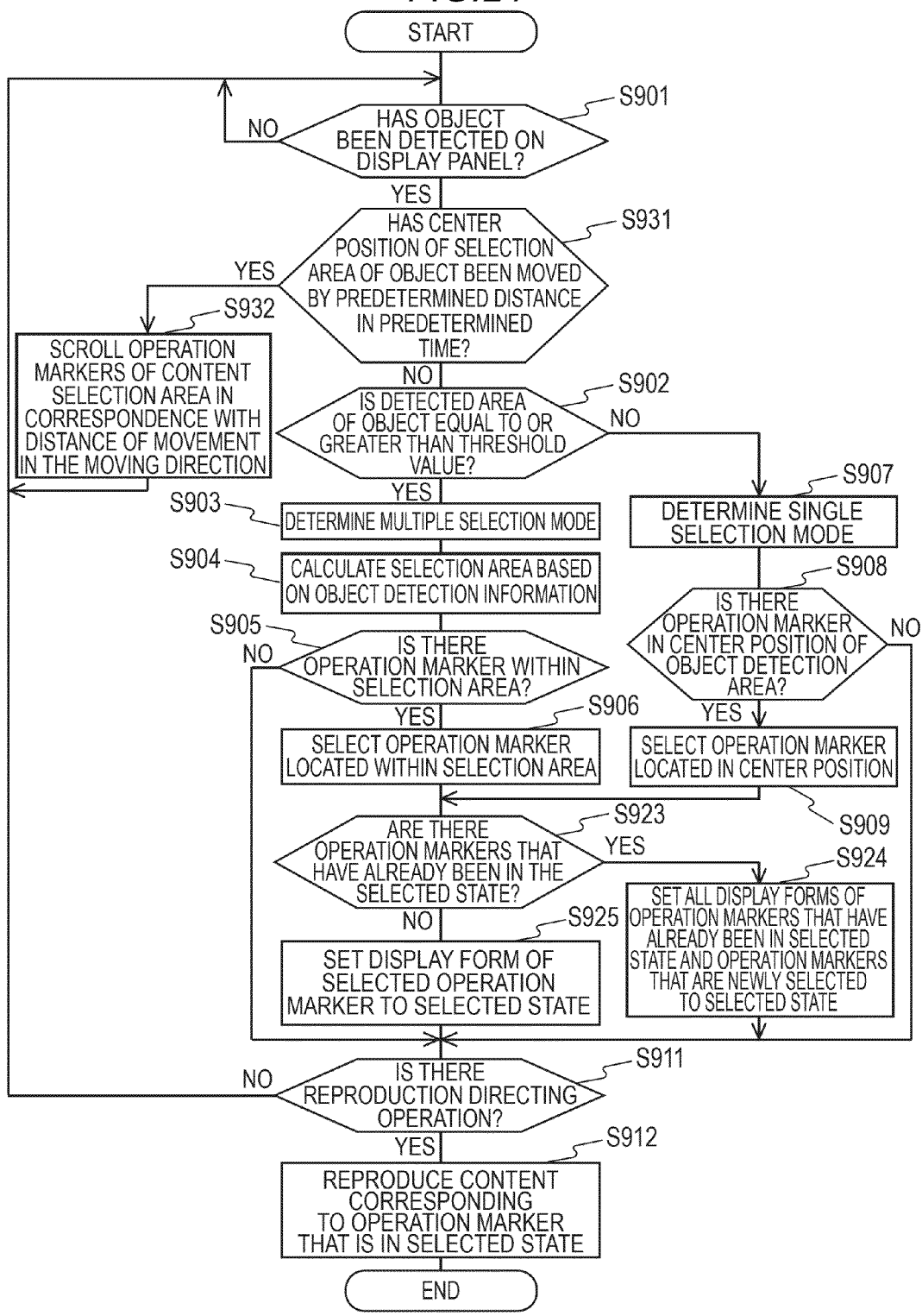
FIG. 24 is a flowchart showing the procedure of an operation marker selecting process performed by the imaging device according to the first embodiment of the present invention.

FIG. 24 is a flowchart showing the procedure of an operation marker selecting process performed by the imaging device 100 according to the first embodiment of the present invention. In this example, a case where an operation marker selecting operation for selecting a plurality of operation markers included in a plurality of screens is performed by scrolling the operation markers in accordance with the movement of an object that performs the selection operation for the operation markers will be described as an example. This example is a modified example of the operation marker selecting process represented in FIG. 22. Thus, a same reference sign is assigned to a portion that is the same as that of the procedure shown in FIG. 22, and the description thereof is omitted here.

In a case where an object that is in proximity to or brought into contact with the display surface of the display panel 260 is detected (Step S901), it is determined whether the center coordinates of the selection area calculated for the detected object are moved by a predetermined distance or more in a predetermined time (Step S931). In a case where the center coordinates of the selection area calculated for the detected object are moved by the predetermined distance or more in the predetermined time (Step S931), the display control unit 470 performs a scroll process in accordance with the moving direction and the distance of the movement (Step S932). After this scroll process is performed (Step S932), the process proceeds to Step S902.

On the other hand, in a case where the center coordinates of the selection area calculated for the detected object are not moved by the predetermined distance or more in the predetermined time (Step S931), the process proceeds to Step S902.

2. Second Embodiment

Example of Functional Configuration of Imaging Device

In the first embodiment of the present invention, an example in which the selection operation for selecting the operation markers displayed on the display panel 260 is performed is represented. Here, for example, a case where a release operation is performed for some operation markers of a plurality of operation markers that has been already in the selected state may be considered. For example, in the case where the release operation is performed, when a plurality of operation markers can be simultaneously released from the selected state, the selection operation can be performed in a speedier manner. Hereinafter, a selection method in which a release operation is performed for some operation markers out of the plurality of operation markers that have been already in the selected state will be described in detail with reference to the drawings. The functional configuration of the second embodiment of the present invention is approximately the same as that of the imaging device 100 according to the first embodiment of the present invention. Thus, hereinafter, features different from those of the imaging device 100 will be primarily focused.

The selection unit 450 shown in FIG. 4 selects or releases one or a plurality of operation markers from among a plurality of operation markers displayed on the content selection screen and outputs selection information for the selected operation markers to the display control unit 470. In particular, the selection unit 450 determines one or a plurality of operation markers to be processed in accordance with the selection mode determined by the selection mode determining unit 420 based on the object detection information output from the object detection section 411 and disposition information on the operation markers disposed on the contents selection screen. Then, the selection unit 450 determines whether the operation markers to be processed are in the selected state based on the stored contents of the selection information storing unit 460. When the operation markers to be processed are in the selected state, the selection is released. On the other hand, when the operation markers to be processed are not in the selected state, the selection unit 450 selects the operation markers. The method of selecting the operation markers will be described with reference to FIGS. 25A to 26C and the like.

Example of Selection and Release of Operation Markers

Figure 25A:
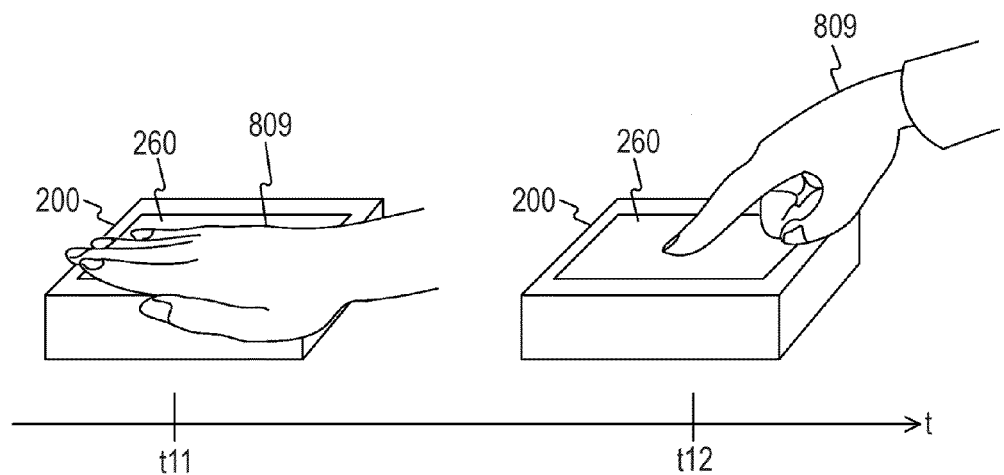
FIGS. 25A to 25C are diagrams illustrating examples of an operation method and a display for a case where a selection operation is performed for a plurality of operation markers displayed on the display panel according to a second embodiment of the present invention.
Figure 25B:
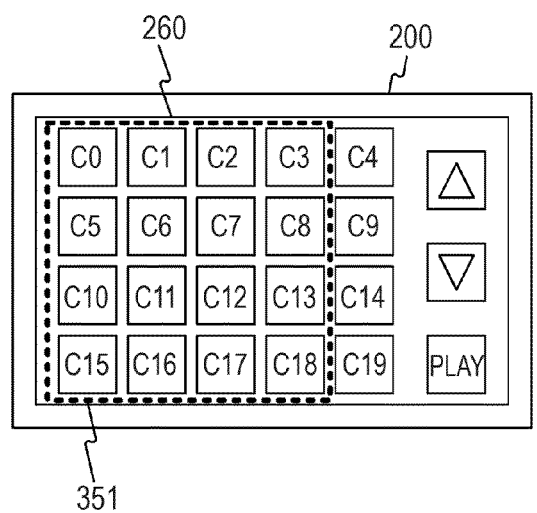

FIGS. 25A to 26C are diagrams illustrating examples of an operation method and an example of display for a case where a selection operation is performed for a plurality of operation markers displayed on the display panel 260 according to the second embodiment of the present invention. FIG. 25A illustrates an example of the selection operation performed by a user for the plurality of operation markers displayed on the display panel 260. In particular, FIG. 25A represents a transition in a user's operation performed from time t1 to time t21 on the time axis t. FIG. 25B illustrates a selection area 351 that is calculated based on a user's operation performed at time t1 shown in FIG. 25A. FIG. 25C illustrates a selection area 352 that is calculated based on a user's operation performed at time t12 shown in FIG. 25A.

Figure 25C:
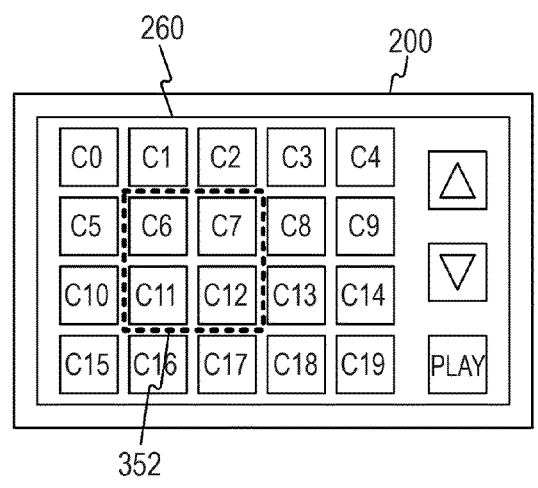
Figure 26A:
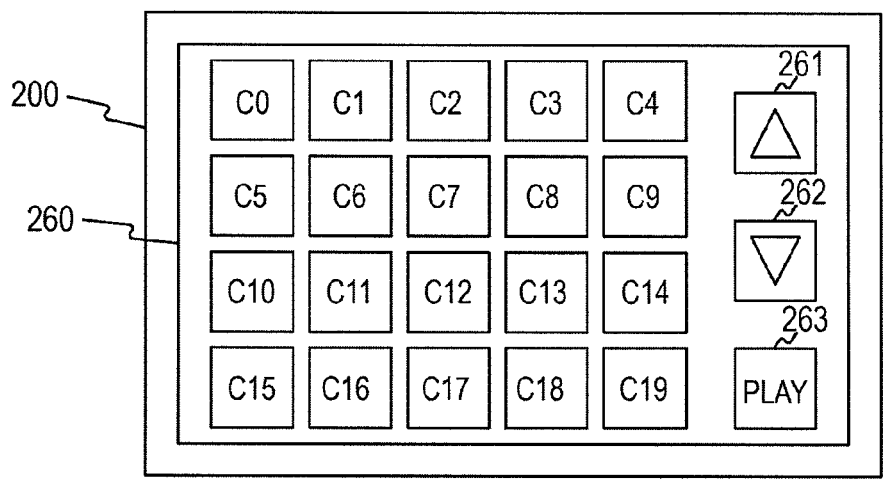
FIGS. 26A to 26C are diagrams illustrating examples of an operation method and a display for a case where a selection operation is performed for a plurality of operation markers displayed on the display panel according to the second embodiment of the present invention.
Figure 26B:
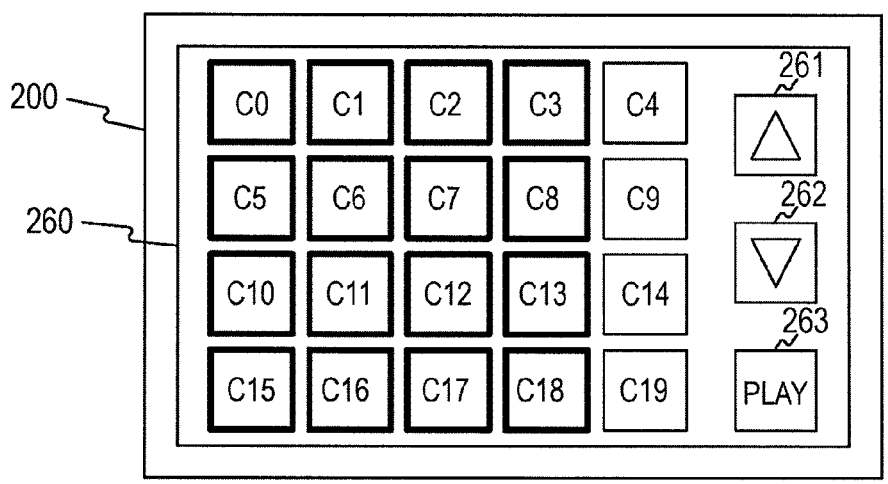
Figure 26C:
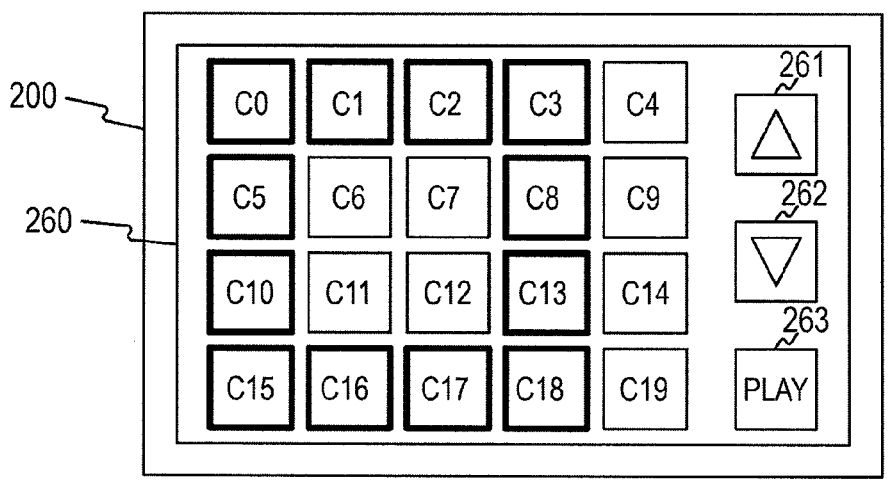

FIG. 26A represents an example of a display screen displayed on the display panel 260 right before the user's operation performed at time t1 shown in FIG. 25A. FIG. 26B represents an example of a display screen displayed on the display panel 260 right after the user's operation performed at time t1 shown in FIG. 25A. FIG. 26C represents an example of a display screen displayed on the display panel 260 right after the user's operation performed at time t12 shown in FIG. 25A. The example illustrated in FIGS. 25A to 26C is a modified example of the first embodiment of the present invention. Thus, hereinafter, features that are different from those of the first embodiment will be primarily focused.

For example, at time t1 shown in FIG. 25A, the right hand 809 is assumed to be disposed on the display panel 260 so as to select the operation markers C0 to C3, C5 to C8, C10 to C13, and C15 to C18 that are displayed on the display panel 260. In other words, at time t1, the selection area 351 is assumed to be calculated in accordance with the selection operation performed by using the right hand 809. After the right hand 809 is disposed as such, as illustrated in FIG. 26B, the display forms of the operation markers C0 to C3, C5 to C8, C10 to C13, and C15 to C18 that are selected based on the selection area 351 are changed and are displayed on the display panel 260.

Subsequently, for example, at time t12 shown in FIG. 25A, fingers of the right hand 809 are assumed to be disposed on the display panel 260 so as to select operation markers C6, C7, C11, and C12 that are displayed on the display panel 260. In other words, as illustrated in FIG. 25C, in the state at time t12, a selection area 352 is assumed to be calculated in accordance with the selection operation by using the fingers of the right hand 809. As described above, when the selection operation is performed for the operation markers that have been already in the selected state, the selection unit 450 determines one or a plurality of operation makers to be processed based on the selection mode determined by the selection mode determining unit 420. In other words, in a case where the multiple selection mode is determined by the selection mode determining unit 420, the selection unit 450 determines one or a plurality of operation markers to be processed. On the other hand, in a case where the single selection mode is determined by the selection mode determining unit 420, the selection unit 450 determines one operation marker to be processed. The method of selecting the operation markers to be processed is the same as that of the first embodiment, and thus a detailed description thereof is omitted here. Subsequently, the selection unit 450 determines whether the operation marker to be processed is in the selected state based on the stored contents of the selection information storing unit 460. When the operation marker is in the selected state, the selection unit 450 releases the selection. In this example, a case where the multiple selection mode is determined by the selection mode determining unit 420 will be described. For example, at time t11 shown in FIG. 25A, the operation markers C0 to C3, C5 to C8, C10 to C13, and C15 to C18 that are displayed on the display panel 260 are selected, and accordingly, the operation markers C6, C7, C11, and C12 to be processed are in the selected state. Accordingly, the selection unit 450 releases the selection of the operation markers C6, C7, C11, and C12 to be process.

Accordingly, at time t12, after the fingers of the right hand 809 are disposed, as shown in FIG. 26C, the display forms of the operation markers C6, C7, C11, and C12 of which the selected states are released based on the selection area 352 are changed and are displayed on the display panel 260. In other words, the display forms are changed such that the operation markers C0 to C3, C5, C8, C10, C13, and C15 to C18 are in the selected state, and operation markers are displayed on the display panel 260.

As described above, by performing the selection operation for the display panel 260, for example, as illustrated in FIG. 26C, even in a case where the operation markers are selected to be in a circular disposition, the operation markers can be selected in an easy manner by performing two selection operations only.

In this example, a case where operation markers of one page are selected or released will be described. However, for example, this embodiment can be applied to a case where operation markers of multiple pages are selected or released.

Example of Operation of Imaging Device

Figure 27:
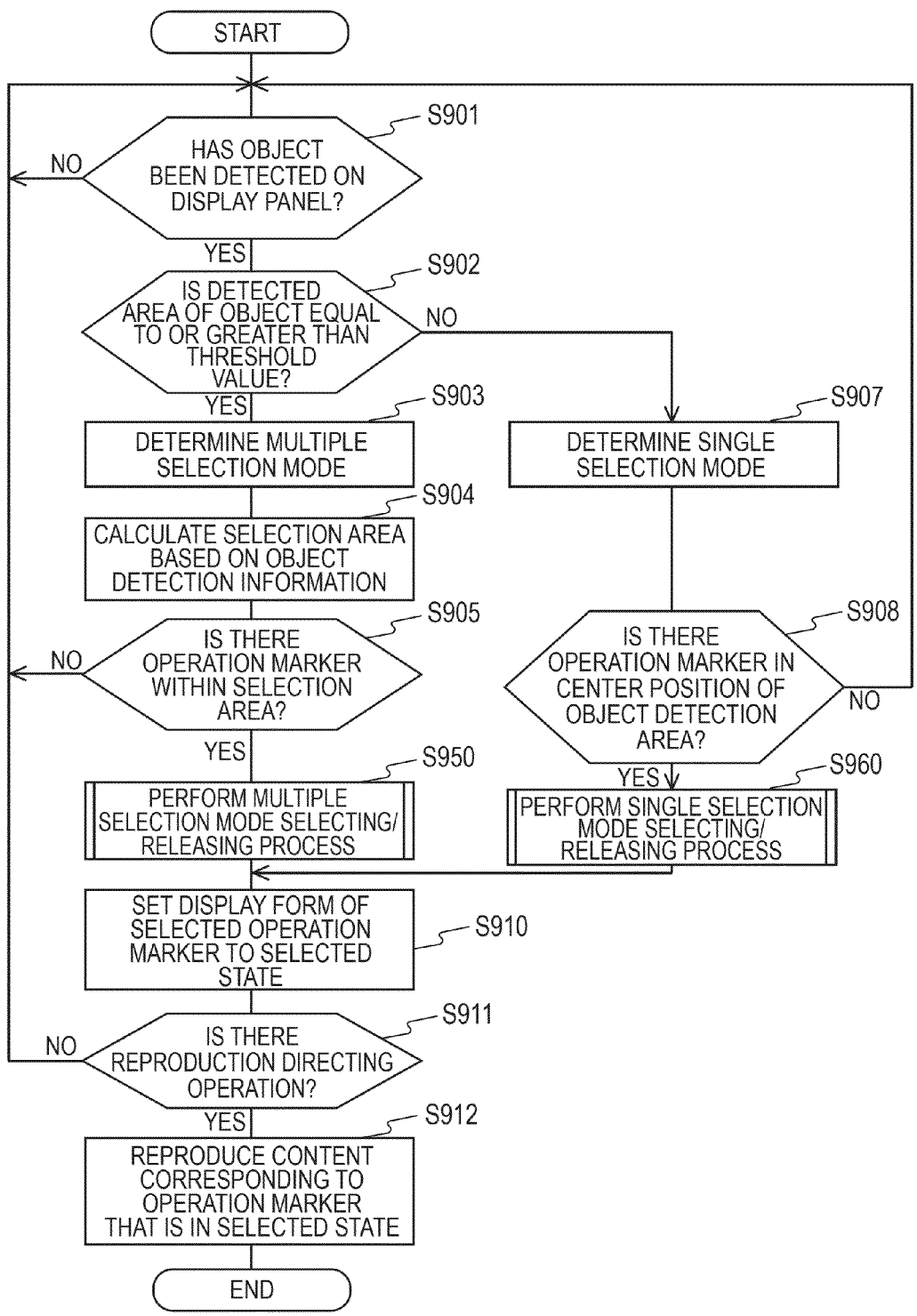
FIG. 27 is a flowchart showing the procedure of an operation marker selecting process performed by the imaging device according to the second embodiment of the present invention.

FIG. 27 is a flowchart showing the procedure of an operation marker selecting process performed by the imaging device 100 according to the second embodiment of the present invention. This example is a modified example of the operation marker selecting process shown in FIG. 15. Thus, a same reference sign is assigned to each portion that is the same as that of the procedure represented in FIG. 15, and the description thereof is omitted here.

In a case where the operation marker is located within the selection area that is calculated by the selection unit 450 (Step S905), the selection unit 450 performs a multiple selection mode selecting/releasing process (Step S950). The multiple selection mode selecting/releasing process will be described in detail with reference to FIG. 28.

In addition, in a case where an operation marker is located in the position of the center coordinates of the object detection area that is included in the object detection information generated for the detected object (Step S908), the selection unit 450 performs the single selection mode selecting/releasing process (Step S960). This single selection mode selecting/releasing process will be described in detail with reference to FIG. 29.

Figure 28:
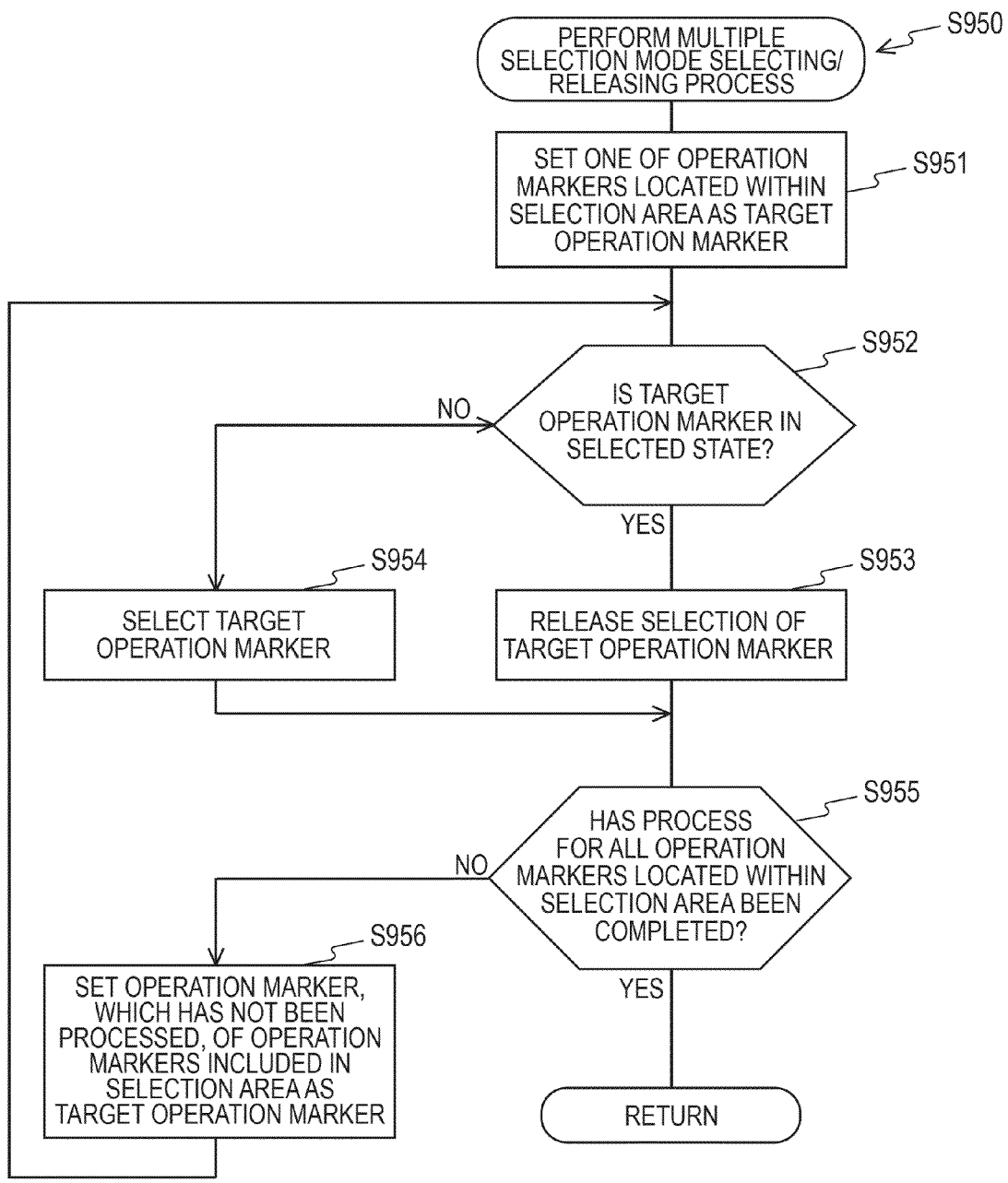
FIG. 28 is the flowchart showing the multiple selection mode selecting/releasing process of the operation marker selecting process performed by the imaging device according to the second embodiment of the present invention.

FIG. 28 is the flowchart showing the multiple selection mode selecting/releasing process (the process of Step S950 shown in FIG. 27) of the operation marker selecting process performed by the imaging device 100 according to the second embodiment of the present invention.

First, the selection unit 450 sets one of the operation markers located within the calculated selection area as a target operation marker (Step S951) and determines whether the target operation marker is in the selected state based on the stored contents of the selection information storing unit 460 (Step S952). In a case where the target operation marker is in the selected state (Step S952), the selection unit 450 releases the selection of the target operation marker and updates the stored contents of the selection information storing unit 460 based on the release operation (Step S953). On the other hand, in a case where the target operation marker is not in the selected state (Step S952), the selection unit 450 selects the target operation marker and updates the stored contents of the selection information storing unit 460 based on the selection operation (Step S954).

Subsequently, the selection unit 450 determines whether the selecting/releasing process is completed for all the operation markers located within the calculated selection area (Step S955). In a case where the selecting/releasing process is completed for all the operation markers that are located within the calculated selection area (Step S955), the selection unit 450 ends the multiple selection mode selecting/releasing process. On the other hand, in a case where the selecting/releasing process is not completed for all the operation markers (Step S955), the selection unit 450 sets an operation marker of the operation markers located within the calculated selection area that has not been processed as a target operation marker (Step S956), and the process returns back to Step S952.

Figure 29:
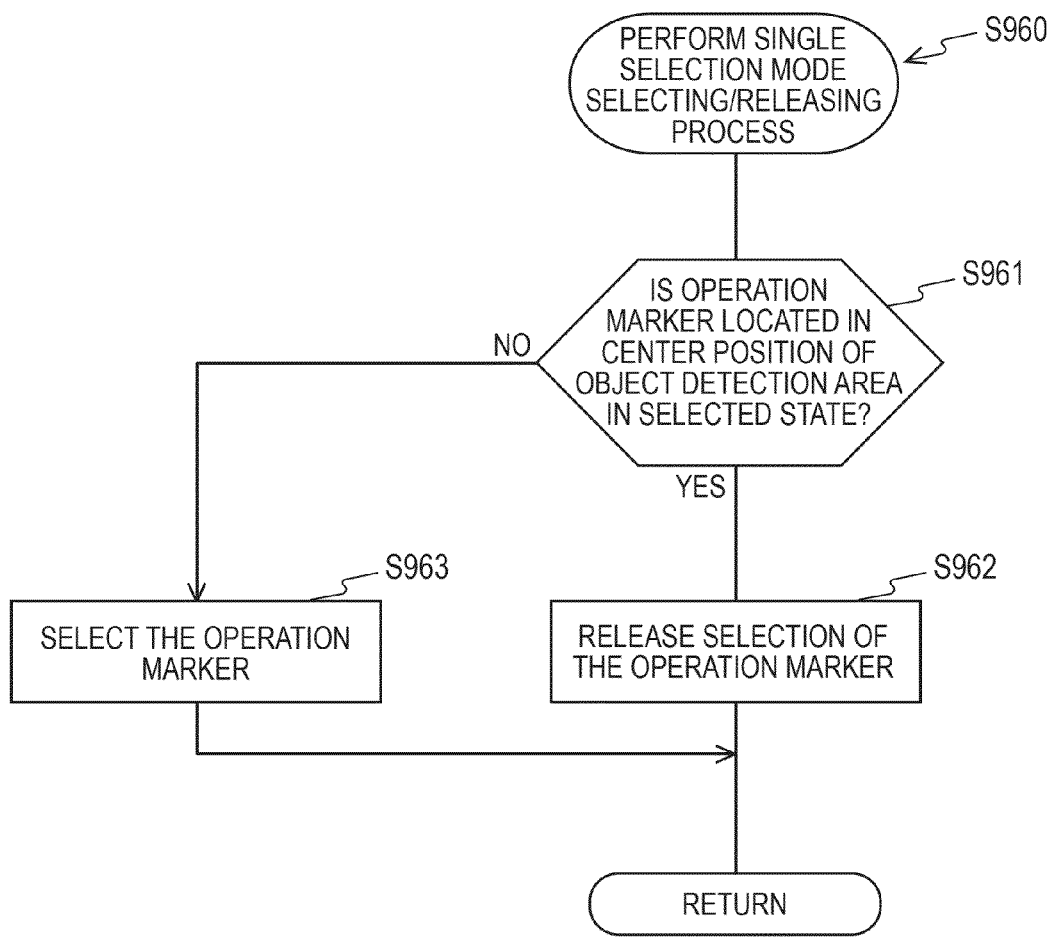
FIG. 29 is a flowchart showing a single selection mode selecting/releasing process of the operation marker selecting process performed by the imaging device according to the second embodiment of the present invention.

FIG. 29 is a flowchart showing a single selection mode selecting/releasing process (the process of Step S960 represented in FIG. 27) of the operation marker selecting process performed by the imaging device 100 according to the second embodiment.

First, the selection unit 450 determines whether an operation marker located in the position of the center coordinates included in the object detection information generated for the detected object is in the selected state based on the stored contents of the selection information storing unit 460 (Step S961). In a case where the operation marker located in the position of the center coordinates is in the selected state (Step S961), the selection unit 450 releases the selection of the operation marker and updates the stored contents of the selection information storing unit 460 (Step S962). On the other hand, in a case where the operation marker located in the position of the center coordinates is not in the selected state (Step S961), the selection unit 450 selects the operation marker and updates the stored contents of the selection information storing unit 460 based on the selection operation (Step S963).

Figure 30:
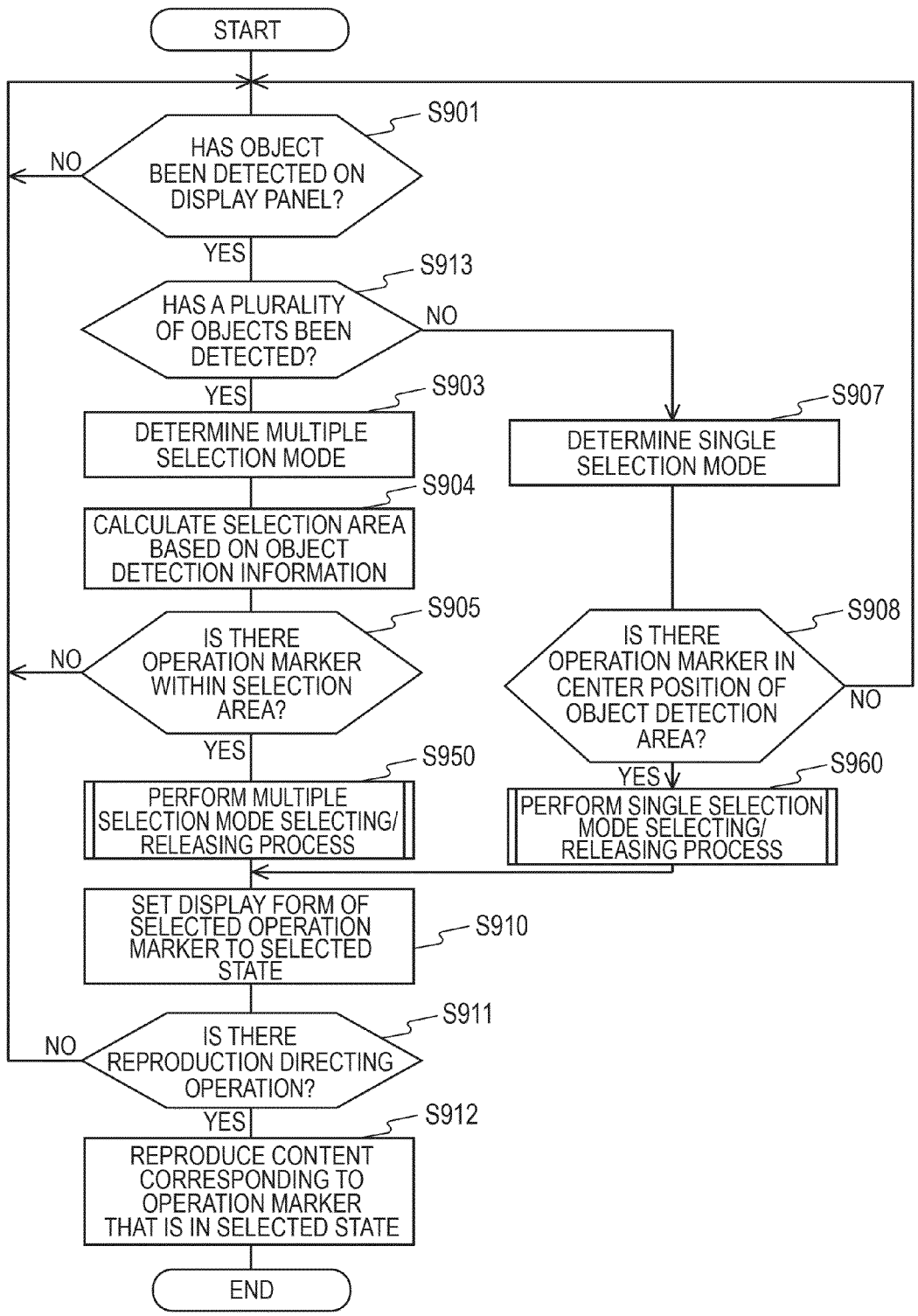
FIG. 30 is a flowchart showing the procedure of the operation marker selecting process performed by the imaging device according to the second embodiment of the present invention.

FIG. 30 is a flowchart showing the procedure of the operation marker selecting process performed by the imaging device 100 according to the second embodiment of the present invention. This example is a modified example of the operation marker selecting process shown in FIG. 16. Thus, a same reference sign is assigned to each portion that is the same as that of the procedure represented in FIG. 16, and the description thereof is omitted here.

In a case where the operation marker is located within the selection area that is calculated by the selection unit 450 (Step S905), the selection unit 450 performs the multiple selection mode selecting/releasing process (shown in FIG. 28) (Step S950).

In addition, in a case where the operation marker is located in the position of the center coordinates of the object detection area included in the object detection information that is generated for the detected object (Step S908), the selection unit 450 performs the single selection mode selecting/releasing process (shown in FIG. 29) (Step S960).

FIG. 31 is a flowchart showing the procedure of the operation marker selecting process performed by the imaging device 100 according to the second embodiment of the present invention. This example is a modified example of the operation marker selecting process shown in FIG. 20. Thus, a same reference sign is assigned to each portion that is the same as that of the procedure represented in FIG. 20, and the description thereof is omitted here.

In a case where the operation marker is located within the selection area that is calculated by the selection unit 450 (Step S905), the selection unit 450 performs the multiple selection mode selecting/releasing process (shown in FIG. 28) (Step S950).

In addition, in a case where the operation marker is located in the position of the center coordinates of the object detection area that is included in the object detection information generated for the detected object (Step S908), the selection unit 450 performs the single selection mode selecting/releasing process (shown in FIG. 29) (Step S960).

Subsequently, the selection unit 450 determines whether there is an operation marker, which has been in the selected state, other than the operation markers that are processing targets, based on the stored contents of the selection information storing unit 460 (Step S923). When there is the operation marker that has been in the selected state (Step S923), the selection unit 450 allows the operation marker, which has been already in the selected state, other then the operation markers that are the processing targets and the operation markers selected from among the operation markers that are the processing targets to be in the selected state. In addition, the selection unit 450 updates the contents of the selection information storing unit 460 based on the selection. Then, the display control unit 470 changes the display forms of all the operation markers that are selected by the selection unit 450 into the selected state (Step S924).

On the other hand, when there is not the operation marker that has been in the selected state (Step S923), the selection unit 450 allows the operation markers selected from among the operation markers that are the processing targets to be in the selected state and updates the stored contents of the selection information storing unit 460 based on the selection. Then, the display control unit 470 changes the display forms of the operation markers selected by the selection unit 450 into the selected state (Step S925).

In the second embodiment of the present invention, an example in which the operation marker selecting process is performed by scrolling the operation markers in units of pages is represented. However, for example, this embodiment can be applied to a case where the operation markers are scrolled in units of lines or the operation markers are scrolled in accordance with movement of an object on the display surface. In such a case, for example, for the operation markers that are included in both the selection areas before and after the scroll, the multiple selection mode selecting/releasing process and the single selection mode selecting/releasing process are not performed. Accordingly, the release of the operation marker due to the scroll operation, which is not intended by a user, can be prevented.

3. Third Embodiment

Example of Functional Configuration of Electronic Apparatus

In each of the above-described embodiments of the present invention, as an example of the electronic apparatus, the imaging device 100 is described. However, each of the above-described embodiments of the present invention can be applied to another electronic apparatuses having an input/output unit such as an optical-sensor touch panel. Hereinafter, another electronic apparatus having an input/output panel will be described in detail with reference to the drawings.

FIG. 32 is a block diagram showing an example of the functional configuration of an electronic apparatus 700 according to a third embodiment of the present invention. The electronic apparatus 700 includes a microcomputer 710, an input/output panel 720, an operation unit 730, a recording unit 740, and a USB (Universal Serial Bus) terminal 750. In addition, the electronic apparatus 700 includes a video decoder 760, an audio decoder 770, and an output terminal 780. The electronic apparatus 700, for example, is implemented by an electronic apparatus such as a portable media player that can reproduce contents such as music, a moving picture, and a still screen. Here, the microcomputer 710 corresponds to the microcomputer 150 shown in FIG. 1, the input/output panel 720 corresponds to the input/output panel 200 show in FIG. 1, the operation unit 730 corresponds to the operation unit 170 shown in FIG. 1, and the recording unit 740 corresponds to the recording unit 140 shown in FIG. 1.

The USB terminal 750 is an interface that is used for connecting the electronic apparatus 700 and another electronic apparatus to each other. Various types of information can be transmitted and received between the electronic apparatus 700 and another electronic apparatus connected to the USB terminal 750. For example, contents can be read out from another electronic apparatus that is connected to the USB terminal 750, and the read-out contents are recorded in the recording unit 740. In addition, for example, the USB terminal 750 controls output of the contents to another electronic apparatus connected to the USB terminal 750.

The video decoder 760 encodes image data (video data) by using a predetermined decoding method and outputs the encoded image data to the output terminal 780.

The audio decoder 770 decodes speech data by using a predetermined decoding method and outputs the decoded speech data to the output terminal 780.

The output terminal 780 outputs the image data output from the video decoder 760 and the speech data output from the audio decoder 770 to an external apparatus (for example, an output device 790) other than the electronic apparatus 700.

The output device 790 outputs the contents output from the electronic apparatus 700. For example, the output device 790 is implemented by a video reproduction device such as a television set that outputs a moving picture and speech as the contents.

For example, the electronic apparatus 700 is connected to the output device 790 through the output terminal 780 and outputs contents that are stored in the recording unit 740 or input from the USB terminal 750 to the output device 790. For example, the electronic apparatus 700 controls output of the contents to another electronic apparatus that is connected to the USB terminal 750. In addition, for example, the electronic apparatus 700 displays the contents that are stored in the recording unit 740 or are input from the USB terminal 750 on the input/output panel 720. When the contents as output targets are selected, a selection operation is performed for the input/output panel 720. The selection method is the same as the above-described selection method, and thus the description thereof is omitted here.

As described above, according to the embodiments of the present invention, in an electronic apparatus having an input/output unit such as a touch panel, a plurality of contents can be selected efficiently by utilizing a limited space of the touch panel. In addition, a plurality of contents can be simultaneously selected by performing an intuitive operation for the touch panel. Accordingly, a user's load at the time of selection of the plurality of contents can be reduced markedly. In other words, by performing a selection operation such as covering a content desired to be selected with a finger or a palm that can be easily intuitively understood, a plurality of contents can be selected in an easy manner. In addition, the number of steps from the start of a selection operation to the end of the selection operation for a case where a plurality of contents is selected can be decreased markedly, whereby a user's load can be reduced markedly.

In the embodiments of the present invention, a case where contents such as a moving picture or a still screen are selected is described as an example. However, for example, the embodiments of the present invention can be applied for selecting contents such as in-store information, tour information, local information, news, or weather forecasts. In addition, as an operation marker displayed on the touch panel, a search button that is user for searching for a hospital, a convenient store, or the like in a car navigation system or the like, an icon that is used for operating a predetermined function, a numeric pad that is used for inputting numerals, or the like may be used. In addition, the embodiments of the present invention can be applied to an electronic apparatus such as a game device, a cellular phone, a digital appliance, or a car navigation system in which a plurality of buttons is displayed on the touch panel and a desired button is selected from among the buttons.

The embodiments of the present invention represent only examples for implementing the present invention and have correspondence relationship with elements for defining the present invention. However, the present invention is not limited to the embodiments, and the embodiments may be variously changed therein without departing from the basic concept of the present invention.

In addition, the procedure processes described in the embodiments of the present invention may be perceived as a method having such a series of processes, a program used for executing the above-described series of the processes in a computer, or a recording medium that stores the program therein. As the recording medium, for example, a CD (Compact Disc), an MD (MiniDisc), a DVD (Digital Versatile Disk), a memory card, a Blu-ray Disc (registered trademark), or the like can be used.

The present application contains subject matter related to that disclosed in Japanese Priority Patent Application JP 2009-073266 filed in the Japan Patent Office on Mar. 25, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus comprising:
   an input/output unit configured to display a first display comprising first operation markers, which are used for performing an operation input, on a display surface and to detect a single object that is in proximity to or brought into contact with the display surface and to determine a first detection area representative of the single object that is in proximity to or brought into contact with the display surface;
   a selection mode determining unit configured to determine, based on a value of the first detection area for the single object, a selection mode that is either a multiple selection mode in which selection targets selected through detection of the single object are set to be a first plurality of the first operation markers or a single selection mode in which a selection target selected through detection of the single object is set to be one operation marker of the first operation markers, wherein the selection mode determining unit is further configured to compare the value of the detected first detection area with a reference value and determine the multiple selection mode or the single selection mode based at least in part on a result of the comparison;

a selection unit configured to select the one operation marker or the first plurality of operation markers from among the first operation markers displayed on the display surface based at least in part on the selection mode; and a display control unit configured to change display forms of the one operation marker or the first plurality of operation markers that are selected and displayed on the display surface into a display form indicating a selected state and to display at least some of the changed forms on the display surface.

2. The electronic apparatus according to claim 1, wherein the input/output unit is further configured to detect at least a second object and a second detection area representative of the second object that is also in proximity to or brought into contact with the display surface, and wherein the selection mode determining unit is further configured to compare a summed value of detected first and second detection areas with the reference value and determine the selection mode based at least in part on the result of the comparison.

3. The electronic apparatus according to claim 1,
wherein the selection mode determining unit is configured to determine the multiple selection mode in a case where the first detection area exceeds the reference value, and
wherein the selection mode determining unit is configured to determine the single selection mode in a case where the first detection does not exceed the reference value.

4. The electronic apparatus according to claim 1,
wherein the input/output unit is further configured to detect a number of the objects that are simultaneously in proximity to or brought into contact with the display surface, and
wherein the selection mode determining unit is further configured to compare the detected number of the objects with a reference value and determines the selection mode based at least in part on a result of the comparison.

5. The electronic apparatus according to claim 1,
wherein the object detecting unit is further configured to detect a position of the object, which is in proximity to or brought into contact with the display surface, on the display surface,
wherein the selection unit is configured to select the first plurality of operation markers based at least in part the detected position and the detection area of the object in a case where the multiple selection mode is determined, and
wherein the selection unit is configured to select the one operation marker based at least in part on the detected position of the object in a case where the single selection mode is determined.

6. The electronic apparatus according to claim 5, wherein the selection unit is configured to select the first plurality of operation markers based on a selection area that is specified by detected positions and detection areas for a plurality of objects that are in proximity to or brought into contact with the display surface, and wherein the multiple selection mode is determined.

7. The electronic apparatus according to claim 1,
wherein the selection unit is further configured to perform the selection of the one operation marker or the first plurality of operation markers each time an object that is in proximity to or brought into contact with the display surface is detected, and
wherein the display control unit is configured to change the display forms of operation markers that are newly selected and the operation markers that have been already selected from among the first operation markers displayed on the display surface into the display form indicating the selected state and display the operation markers that are in the selected state on the display surface.

8. The electronic apparatus according to claim 7, further comprising an operation reception unit configured to receive a movement operation for moving the selected plurality of the operation markers displayed on the display surface,
wherein the display control unit is further configured to change the display forms of the selected operation markers according to the received movement operation into the display form indicating the selected state and display the operation markers on the display surface.

9. The electronic apparatus according to claim 1, wherein the display control unit is further configured to move the selected one operation marker or first plurality of the operation markers displayed on the display surface in accordance with a movement of the detected object, change all the display forms of the operation markers newly selected based on the detection state of the object after the movement and the one operation marker or first plurality of operation markers that have been already selected from among the first operation markers displayed on the display surface after the movement into the display form indicating the selected state.

10. The electronic apparatus according to claim 1,
wherein the selection unit is further configured to release selection of the one operation marker or first plurality of operation markers in a case where the object that is in proximity to or brought into contact with the display surface is detected in a same detection area after the one operation marker or first plurality of operation markers are placed in the selected state, and
wherein the display control unit is further configured to change the display forms of the operation markers, of which the selection is released, to indicate a non-selected state.

11. The electronic apparatus according to claim 1, further comprising an output control unit to output a content,
wherein the display control unit is further configured to display a selected operation marker as the operation marker that represents the content, and
wherein the output control unit is configured to output the content corresponding to the selected operation marker.

12. The electronic apparatus according to claim 11,
wherein the content is an image content, and
wherein the display control unit is further configured to display a representative image of the content as the operation marker representing the content.

13. The electronic apparatus according to claim 1, wherein, while the object remains in proximity to or in contact with the display surface, the display control unit is further configured to:
scroll the first display to display second operation markers, not displayed in the first display, and at least one of the first plurality of operation markers or the one operation marker responsive to movement of the object across the display surface; and
change display forms of at least one of the second operation markers to indicate a selected state responsive to the selection mode determining unit and the selection unit determining that the at least one second operation marker is selected by the object.

14. An electronic apparatus comprising:
an input/output unit configured to display first operation markers, which are used for performing an operation input, on a display surface and to detect a single object that is in proximity to or brought into contact with the display surface for selecting one or more operation markers from among the first operation markers and to determine a first detection area representative of the single object; and
a selection mode determining unit configured to determine, based at least in part on a value of the first detection area for the single object, a selection mode that is either a multiple selection mode in which selection targets selected through detection of the single object are set to be a first plurality of the operation markers or a single selection mode in which a selection target selected through detection of the object is set to be one operation marker, wherein the selection mode determining unit is further configured to compare the value of the detected first detection area with a reference value and determine the multiple selection mode or the single selection mode based at least in part on a result of the comparison.

15. The apparatus of claim 14, further comprising optical elements and solid state imaging apparatus configured to obtain electronic images.

16. An electronic apparatus comprising:
an input/output unit configured to display first operation markers, which are used for performing an operation input, on a display surface and to detect a single object that is in proximity to or brought into contact with the display surface and to determine a first detection area representative of the single object;
a selection unit configured to compare a value of the first detection area to a predetermined reference value and select a first plurality of operation markers in a case where the first detection area exceeds the predetermined reference value or select one operation marker in a case where the first detection area does not exceed the predetermined reference value; and
a display control unit configured to change the display forms of the first plurality of operation markers or the one operation marker selected from among the first operation markers displayed on the display surface into a display form indicating a selected state and to display the selected operation markers on the display surface.

17. A display control method comprising the steps of:
detecting a single object that is in proximity to or brought into contact with a display surface on which first operation markers, which are used for performing an operation input, are displayed;
determining a first detection area representative of the single object;
selecting, based at least in part on a comparison of the first detection area with a reference value, a selection mode that is either a multiple selection mode in which a first plurality of the operation markers are identified as selection targets or a single selection mode in which one operation marker is identified as a selection target;
selecting the one operation marker or the first plurality of operation markers from among the first operation markers displayed on the display surface based at least in part on the identified selection target or selection targets; and
changing display forms of the one operation marker or the first plurality of operation markers that are selected from among the first operation markers displayed on the display surface into a display form indicating a selected state and displaying the selected one operation marker or the first plurality of operation markers on the display surface.

18. The display control method of claim 17, further comprising:
detecting at least a second object and a second detection area representative of the second object that is also in proximity to or brought into contact with the display surface;
comparing a summed value of detected first and second detection areas with the reference value; and
determining the selection mode based at least in part on a result of the comparison.

19. The display control method of claim 17, further comprising:
releasing selection of the one operation marker or first plurality of operation markers in a case where the object that is in proximity to or brought into contact with the display surface is detected in a same detection area after the one operation marker or first plurality of operation markers are placed in the selected state; and
changing the display forms of the operation markers, of which the selection is released, to indicate a non-selected state.

20. A manufactured memory device storing machine-readable instructions that, when executed by a machine, adapt the machine to perform the steps of:
detecting a single object that is in proximity to or brought into contact with a display surface on which first operation markers, which are used for performing an operation input, are displayed;
determining a first detection area representative of the single object;
selecting, based at least in part on a comparison of the first detection area with a reference value, a selection mode that is either a multiple selection mode in which a first plurality of the operation markers are identified as selection targets or a single selection mode in which one operation marker is identified as a selection target;
selecting the one operation marker or the first plurality of operation markers from among the first operation markers displayed on the display surface based at least in part on the identified selection target or selection targets; and
changing display forms of the one operation marker or the first plurality of operation markers that are selected from among the first operation markers displayed on the display surface into a display form indicating a selected state and displaying the selected one operation marker or the first plurality of operation markers on the display surface.

* * * * *